(12) United States Patent
Chang et al.

(10) Patent No.: US 10,007,383 B2
(45) Date of Patent: Jun. 26, 2018

(54) TOUCH SENSING METHOD, PROCESSOR AND SYSTEM

(71) Applicant: EGALAX_EMPIA TECHNOLOGY INC., Taipei (TW)

(72) Inventors: Chin-Fu Chang, Taipei (TW); Shang-Tai Yeh, Taipei (TW)

(73) Assignee: EGALAX_EMPIA TECHNOLOGY INC., Taipei (TW)

(*) Notice: Subject to any disclaimer, the term of this patent is extended or adjusted under 35 U.S.C. 154(b) by 848 days.

(21) Appl. No.: 14/016,525

(22) Filed: Sep. 3, 2013

(65) Prior Publication Data

US 2014/0062949 A1 Mar. 6, 2014

Related U.S. Application Data

(60) Provisional application No. 61/695,805, filed on Aug. 31, 2012.

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/045* (2013.01); *G06F 3/0416* (2013.01)

(58) Field of Classification Search
CPC ....................................................... G06F 3/041
See application file for complete search history.

(56) References Cited

U.S. PATENT DOCUMENTS

| | | | |
|---|---|---|---|
| 2004/0056845 A1* | 3/2004 | Harkcom | G06F 3/044 345/173 |
| 2010/0182278 A1* | 7/2010 | Li | G06F 3/0416 345/174 |
| 2010/0214253 A1* | 8/2010 | Wu | G06F 3/044 345/174 |

* cited by examiner

*Primary Examiner* — Jennifer Mehmood
*Assistant Examiner* — Carl Adams
(74) *Attorney, Agent, or Firm* — WPAT, PC

(57) ABSTRACT

The invention provides a touch sensing method. The touch sensing method comprises the following steps: obtaining a first 1-D sensing information, wherein the first 1-D sensing information comprises a plurality of first values; obtaining a second 1-D sensing information, wherein the second 1-D sensing information comprises a plurality of second values, wherein the positions of the first values respectively correspond to the positions of the second values, and the first 1-D sensing information is generated when no external conductive object approaches or touches; determining a plurality of first variations based on the differences between the first values and the corresponding second values; determining an average variation based on all or part of the first variations; and determining a plurality of second variations based on the differences between the first variations and the average variation.

18 Claims, 23 Drawing Sheets

TOUCH SENSING METHOD, PROCESSOR AND SYSTEM

CROSS REFERENCE TO RELATED APPLICATIONS

This application claims the benefit of U.S. Provisional Application No. 61/695,805, filed on Aug. 31, 2012, which is herein incorporated by reference for all intents and purposes.

BACKGROUND OF THE INVENTION

1. Field of the Invention

The present invention relates to a touch sensing method, processor and system for avoiding the noises from the environmental variation.

2. Description of the Prior Art

Touch displays are widely used in may electronic devices. One approach is to define a two dimensional (2D) touch area on a touch display with the use of a touch sensing panel, so as to obtain sensing information through scanning of horizontal and vertical axes on the touch panel in order to determine the touch or proximity of an external object such as a finger on the touch panel. A capacitive touch display is provided by U.S. Pat. No. 4,639,720, for example.

Sensing information can be converted into a plurality of continuous signal values by an analog-to-digital converter (ADC). The location of the touch or proximity of an external object on the touch panel can be determined by comparing the changes in signal values before and after the touch of the external object.

In general, a controller controlling the touch panel will first obtain the sensing information when there is no touch or proximity of any external object as the baseline value. For example, in a capacitive touch panel, each conductive strip corresponds to a respective baseline value. The controller compares subsequent sensing information with the baseline values to determine if there is a touch or proximity of an external object, and to further determine the location of the external object. For example, when there is no touch or proximity of an external object, the subsequent sensing information with respect to the baseline value will be a zero value or approaching a zero value. Whether or not there is a touch or proximity of an external object can be determined by checking whether the sensing information with respect to the baseline value is a zero value or approaching a zero value.

As shown in FIG. 1A, when an external object 12 (e.g. a finger) touches or approaches a sensing device 120 of a touch display 10, sensing information of sensors 140 on an axis (e.g. X-axis) are converted into signal values as shown in FIG. 1B, corresponding to the shape of a finger. The signal values displays a waveform or a finger profile. The location of the peak 14 on the finger profile represents the location of the touch or proximity of the finger.

Typically, 2D sensing information consists of a plurality of 1D sensing information. In other words, performing detections a number of times on the plurality of sensors is needed to generate the 2D sensing information, which will take a consider amount of time. When a high sampling frequency of touch locations is required, it becomes critical to reduce the time taken to generate the 2D sensing information. However, a large proportion of the 2D sensing information is irrelevant to touches, so continuously performing detections irrelevant to touches is time and power consuming. Thus, how to save time and power is a technically critical.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

The present invention provides a touch sensing method, processor and system for avoiding the noises from the property of the electronic component and the environmental variation.

A touch sensing method proposed by the present invention may include: obtaining a first 1D sensing information, wherein the first 1D sensing information comprises a plurality of first values; obtaining a second 1D sensing information, wherein the second 1D sensing information comprises a plurality of second values, wherein the locations of the first values corresponds to the locations of the second values respectively, and the first 1D sensing information represents no proximity or touch of any external conductive object; determining a plurality of first variations based on differences between the first values and the corresponding second values; determining an average variation based on part or all of the first variations; and determining a plurality of second variations based on differences between the first variations and the average variation.

The present invention provides a touch sensing method comprising: continuously obtaining a plurality of 1D sensing information; obtaining a plurality of average variations corresponding to the plurality of 1D sensing information, wherein an average variation corresponding to each 1D sensing information is obtained based on the following steps: continuously obtaining a 1D sensing information, wherein the 1D sensing information comprises a plurality of values; determining a base sensing information, wherein the base sensing information is determined based on the 1D sensing information when the 1D sensing information represents no proximity or touch of any external conductive object, wherein the values are a plurality of first values when the values are as the base sensing information, and the values are a plurality of second values when the values are not as the base sensing information; obtaining a plurality of first variations based on differences between the first values and the second values at the same locations of the 1D sensing information; and obtaining an average variation corresponding to the 1D sensing information based on part or all of the first variations; averaging the average variations corresponding to the plurality of 1D sensing information to obtain a 2D average variation; and obtaining a plurality of second variations of the plurality of 1D sensing information based on difference between the first variations and the 2D average variation of each 1D sensing information.

Accordingly, the present invention provides a touch processor, applied to a touch system including a touch screen which obtains a first 1D information and a second 1D sensing information of an electrode, wherein the first 1D information comprises a plurality of first values, and the second 1D sensing information comprises a plurality of second values, wherein the touch processor performs the following steps: determining a plurality of first variations based on differences between the first values and the corresponding second values, wherein the locations of the first values corresponds to the locations of the second values respectively, and the first 1D sensing information represents no proximity or touch of any external conductive object; determining an average variation based on part or all of the first variations; and determining a plurality of second variations based on differences between the first variations and the average variation.

The present invention provides a touch processor, applied to a touch system including a touch screen, wherein the touch screen continuously obtains 1D sensing information of each of a plurality of electrodes, and the touch processor performs the following steps: connecting to the touch screen so as to obtain a plurality of average variations and a plurality of second variations corresponding to the 1D sensing information, wherein the touch processor obtains a plurality of second variations and an average variation of each 1D sensing information based on the following steps: determining whether there is proximity or touch of any external conductive object based on the 1D sensing information of an electrode which are continuously obtained by the touch screen, wherein the 1D sensing information comprises a plurality of values; determining a base sensing information based on the 1D sensing information which represents no proximity or touch of any external conductive object, wherein the values are a plurality of first values when the values are as the base sensing information, and the values are a plurality of second values when the values are not as the base sensing information; obtaining a plurality of first variations based on differences between the first values and the second values at the same locations of the 1D sensing information; and obtaining an average variation corresponding to the 1D sensing information based on part or all of the first variations; averaging the average variations corresponding to the plurality of 1D sensing information to obtain a 2D average variation; and obtaining a plurality of second variations of the plurality of 1D sensing information based on differences between the first variations and the 2D average variation of each 1D sensing information.

The present invention provides a touch system, comprising: a touch screen, obtaining a first 1D sensing information and a second 1D sensing information of an electrode, wherein the first 1D sensing information comprises a plurality of first values, and the second 1D sensing information comprises a plurality of second values, wherein the locations of the first values respectively corresponds to the locations of the second values, and the first 1D sensing information represents no proximity and touch of any external conductive object; and a touch processor, connecting to the touch screen so as to perform the following steps: obtaining a plurality of first variations based on differences between the first values and the corresponding second value; and obtaining an average variation based on part or all of the first variations;

obtaining a plurality of second variations based on differences between the first variations and the average variation.

The present invention provides a touch system, comprising: a touch screen, continuously obtaining 1D sensing information of each of a plurality of electrodes; a touch processor, connecting to the touch screen so as to obtain a plurality of average variations and a plurality of second variations corresponding to the 1D sensing information, wherein the touch processor obtains a plurality of second variations and an average variation of each 1D sensing information based on the following steps:

determining whether there is proximity or touch of any external conductive object based on the 1D sensing information of an electrode which are continuously obtained by the touch screen, wherein the 1D sensing information comprises a plurality of values; determining a base sensing information based on the 1D sensing information which represents no proximity or touch of any external conductive object, wherein the values are a plurality of first values when the values are as the base sensing information, and the values are a plurality of second values when the values are not as the base sensing information; obtaining a plurality of first variations based on differences between the first values and the second values at the same locations of the 1D sensing information; and obtaining an average variation corresponding to the 1D sensing information based on part or all of the first variations; averaging the average variations corresponding to the plurality of 1D sensing information to obtain a 2D average variation; and obtaining a plurality of second variations of the plurality of 1D sensing information based on differences between the first variations and the 2D average variation of each 1D sensing information.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

Figure 1A:
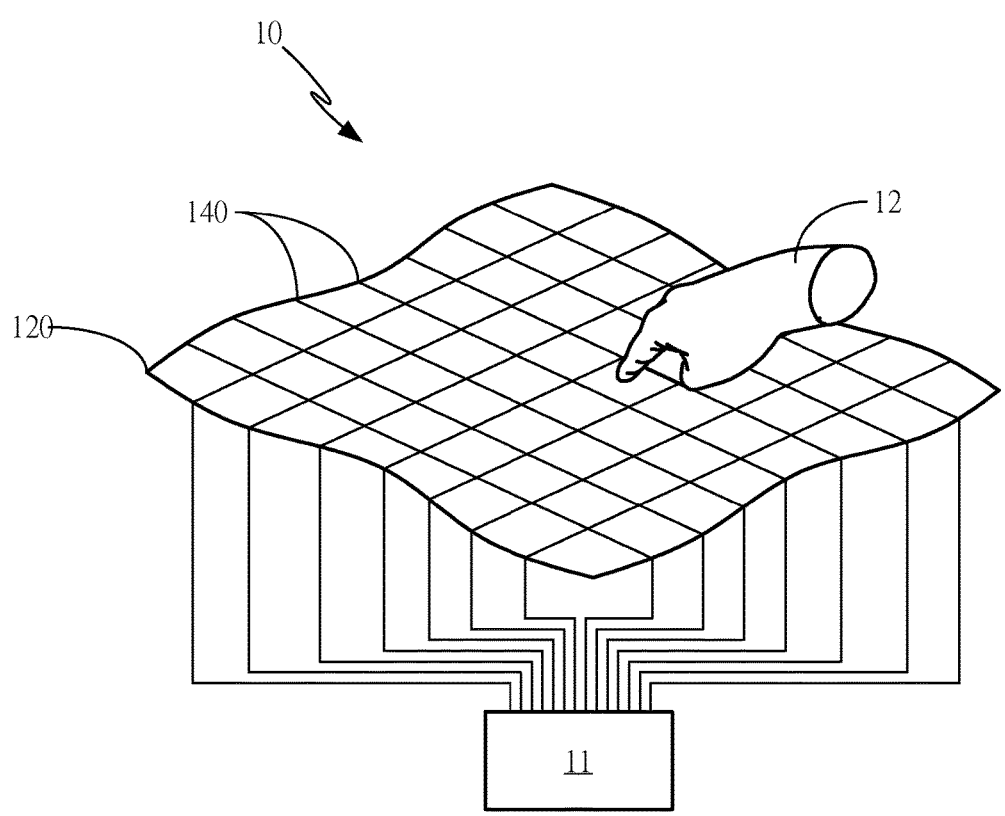
FIG. 1A is a schematic diagram of a prior-art touch device.

DETAILED DESCRIPTION OF THE
PREFERRED EMBODIMENTS

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Sensing Information

In the present invention, sensing information can be provided by a touch sensing device to represent the one-, two- or multiple-dimensional statues on the touch sensing device. The sensing information can be obtained from one or a plurality of sensors and converted into a plurality of continuous signal values by one or a plurality of Analog-to-digital converters (ADCs) to represent the quantities or changes in quantities of detected charges, currents, voltages, impedances or other electrical characteristics. The process of obtaining or transmitting sensing information can be carried out in turn, in sequence or in parallel, and the sensing information can be compounded into one or a plurality of signals as can be easily appreciated by one with ordinary skill in the art.

One with ordinary skill in the art can also appreciate that the sensing information described herein includes, but is not limited to, signals of the sensors, outcomes of signals of the sensors minus the baseline values (e.g. signals when no touch is present or initial signals), values of said outcomes of signals of the sensors minus the baseline values after being converted from analog to digital, said values after being converted into other ways of representations. In other words, sensing information may be in the status of signals, being converted from electrical signals or converted into electrical signals of recording on a storage medium (e.g. register, memory, disk, optical disk), including, but is not limited to, analog or digital form.

The sensing information can be provided by two 1D sensing information on different axes. The two 1D sensing information can be used to represent the sensing information on a first axis (e.g. vertical axis) and a second axis (e.g. horizontal axis) on the touch sensing device, and can be used for location detections on the first and second axes, respectively. They provide 1D locations on the first and second axes, respectively, or further constitute a 2D location. Moreover, the two 1D sensing information can also be used for triangulation to detect 2D locations on the touch sensing device based on the distances between sensors.

The sensing information can be provided by one 2D sensing information. The 2D sensing information is made up of a plurality of 1D sensing information on the same axis. One 2D sensing information can represent the signal distribution on a 2D plane. For example, a plurality of 1D sensing information on the vertical axis or a plurality of 1D sensing information on the horizontal axis may represent a signal matrix. Locations can be detected by methods such as watershed algorithm or other image processing techniques.

In an example of the present invention, a sensing area on a touch sensing device includes an overlapped range of a first 2D detection range detected by at least one first sensor and a second 2D detection range detected by at least one second sensor. One with ordinary skill in the art can also appreciate that the sensing area can be an overlapped range of three or more 2D sensing ranges.

For example, the detection range of a single sensor is a 2D detection range. For example, a CCD or CMOS sensor for performing camera-based optical detection or a piezoelectric sensor for performing surface acoustic detection obtains 1D sensing information from a 2D detection range. This 1D sensing information can be made up of information sensed at a plurality of continuous time points, wherein different time points correspond to different angles, locations or ranges. Moreover, this 1D sensing information may be generated based on an image obtained (e.g. from a CCD or CMOS sensor) within a time interval.

As another example, a 2D detection range can be made of the detections ranges of a plurality of sensors. For example, the detection range of each photoreceptor for infrared detection, line- or ribbon-shaped conductive strips for capacitive or resistive detection, or U-shaped coil for electromagnetic detection may be a fan- or strip-shaped detection range facing one axis. The detection ranges of a plurality of sensors arranged along the same axis on a line piece (straight or curved) may constitute a 2D detection range for that axis, such as a flat or arched square or fan-shaped detection range.

In a preferred example of the present invention, a sensing area on a touch sensing device includes a 2D range detected by a plurality of sensors on a first axis and a second axis. For example, in self-capacitive detection, a driving signal is provided to a plurality of first sensors, and the signals or changes of capacitive coupling of a first 2D detection range of these first sensors are sensed to obtain a first 1D sensing information. In addition, a driving signal is also provided to a plurality of second sensors, and the signals or changes of capacitive coupling of a second 2D detection range of these second sensors are sensed to obtain a second 1D sensing information.

In another example of the present invention, a sensing area on a touch sensitive device includes a 2D sensing information constituting a plurality of 1D sensing information from a plurality of sensors detecting a 2D range. For example, when a signal source sequentially applies a driving signal to a sensor on a first axis, a signal of at least one sensor is detected sequentially or signals of a plurality of sensors (all or some) are detected simultaneously on a second axis to obtain a 2D sensing information on that axis, wherein the sensor on the second axis is at least one adjacent sensor or at least one neighboring but not directly adjacent sensor. For example, in mutual-capacitive detection or analog matrix resistive detection, a plurality of sensors constitute a plurality of sensing places, each detecting a sensing information. For example, a plurality of first sensors (e.g. a plurality of first conductive strips) and a plurality of second sensors (e.g. a plurality of second conductive strips) overlap to form a plurality of overlapping areas. When a driving signal is sequentially applied to each first sensor, corresponding to each first sensor being driven by the driving signal, a signal or change in signal of at least one second sensor is sequentially detected or signals or changes in signals of a plurality of second sensors (all or some) are detected simultaneously on the second axis to obtain 1D sensing information corresponding to the first sensors. By congregating each 1D sensing information corresponding to a first-axial sensor, a 2D sensing information can be formed. In an example of the present invention, a 2D sensing information can be seen as an image.

One with ordinary skill in the art can appreciate that the present invention can be applied to a touch sensitive display, for example, a display having or equipped with a touch sensing device (or touch sensitive device) of said resistive, capacitive, surface acoustic, or other types of detection. Thus, the sensing information obtained based on the touch sensitive display or touch sensing device can be seen as touch sensitive information.

In an example of the present invention, a touch sensing device provides continuous signals at different time points, that is, a compound signal detected simultaneously from one or more sensors continuously. For example, the touch sensing device can be electromagnetic that continuously scans coils on the electromagnetic touch sensing device to emit electromagnetic waves. One or more sensors on an electromagnetic pen detect sensing information and continuously compound them into a signal, which is then converted, from analog to digital, into a plurality of signal values. Moreover, an electromagnetic pen may emit electromagnetic waves or reflects electromagnetic waves coming from the electromagnetic touch sensing device, while a plurality of sensors (coils) on the touch sensing device obtain sensing information.

Touch-Related Sensing Information

When an external object (e.g. a finger) touches or approaches a touch sensing device, corresponding electrical characteristic or changes will be generated by sensing information at an area corresponding to the touch or proximity of the object. The larger the electrical characteristic or change, the closer it is to the center (e.g. centroid, center of gravity, or center of geometry) of the external object. Continuous sensing information can be regarded as constituted by a plurality of continuous values, regardless whether it is digital or analog. The center of the external object may correspond to one value or between two values. In the present invention, a plurality of continuous values can be spatially or temporally continuous.

Figure 1B:
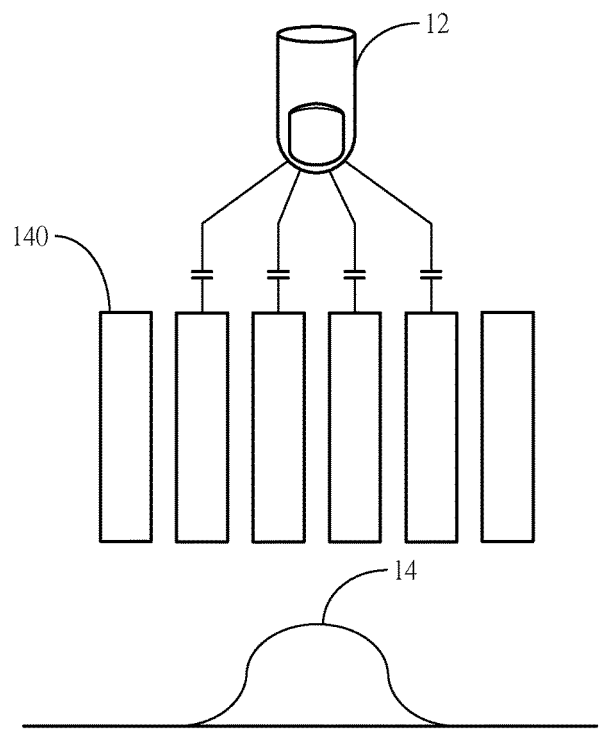
FIG. 1B is a schematic diagram of signal values.

A first type of 1D sensing information provided by the present invention is in the form of a plurality of continuous signal values, which can be signal values detected by a plurality of sensors in a time interval, by a single sensor in continuous time intervals or by a single sensor in a single time interval at different detecting locations. In the process of representing sensing information as signal values, signals from respective sensors, time intervals or locations are sequentially converted into signal values, or alternatively, part or all of sensing information is obtained first, and respective signal values are then analyzed therefrom. When an external object touches or draws near a sensing device, continuous signal values of a 1D sensing information can be those shown in FIG. 1B. Touch location corresponds to a peak 14 of the sensing information of the external object, wherein peak 14 may fall between two signal values. As described earlier, the present invention does not limit the form of the sensing information. Signal values can be another form of the signals of the sensors. For brevity of the description, the present invention below is described in the context of implementations of the signal values. One with ordinary skill in the art may appreciate the implementations of signals from the implementations of signal values.

A second type of 1D sensing information provided by the present invention is in the form of a plurality of continuous differences. Compared to the signal values just described, each difference is the difference of a pair of signal values, and the sensing information represented by a plurality of differences can be called differential sensing information. In the present invention, differential sensing information can be obtained directly during sensing, for example, simultaneously or continuously obtaining a plurality of signals, each difference being generated based on a differential signal corresponding to a pair of sensor, time intervals, or locations. The differential sensing information can be generated based on the original sensing information including a plurality of signal values generated previously. As described earlier, the present invention does not limit the form of sensing information. Differences can be another form of the differential signals. For brevity of the description, the present invention below is described in the context of implementations of the differences. One with ordinary skill in the art may appreciate the implementations of differential signals from the implementations of differences.

Figure 1C:
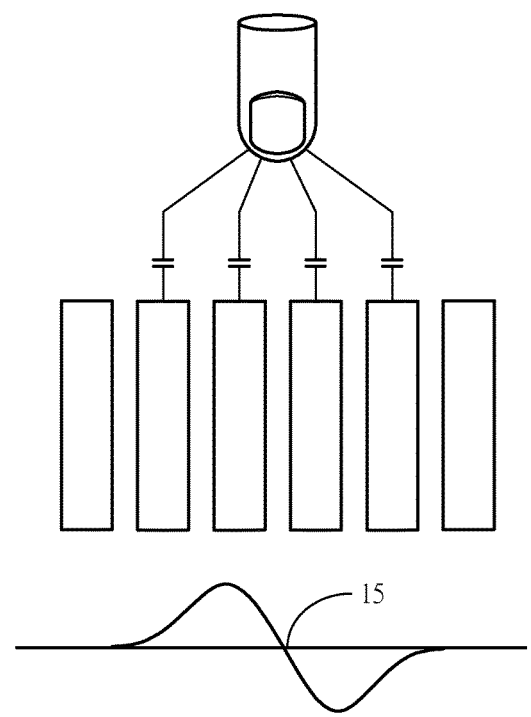
FIG. 1C is a schematic diagram of differences in accordance with the present invention.

In an example of the present invention, a difference can be the difference between a pair of adjacent or non-adjacent signal values, for example, the difference between a signal value and its immediately preceding signal value, or between a signal value and its following signal value. In another example of the present invention, the difference can be the difference between non-adjacent signal values. When an external object touches or draws close to the touch sensing device, continuous differences of 1D sensing information can be those shown in FIG. 1C, wherein the position of the external object corresponds to a zero-crossing 15 of the sensing information. Zero-crossing 15 may fall between two signal values. In an example of the present invention, on the touch sensing device, the corresponding location of each difference is in the middle of the locations corresponding to two signal values.

A third type of 1D sensing information provided by the present invention is in the form of a plurality of continuous dual differences. Compared to the signal values and differences above, each dual difference can be the sum or difference of the difference for a first pair of signal values and the difference for a second pair of signal values, that is, the sum or difference of the differences of two pairs of signal values. For example, two pairs of signal values include a first signal value, a second signal value, a third signal value, and a fourth signal value. The dual differences for these four signals are (second signal value−first signal value)+(third signal value−fourth signal value), (second signal value−first signal value)−(fourth signal value−third signal value), (first signal value−second signal value)+(fourth signal value−third signal value) or (first signal value−second signal value)−(third signal value−fourth signal value). In addition, sensing information represented by continuous dual differences can be called dual-differential sensing information. In the present invention, a dual difference is not limited to being generated after signal values or differences are generated, but instead when the sensing information is provided, the sum or difference between two pairs of signals that have been subtracted from one another has already been completed, providing a dual differential signal similar or equivalent to the sum or difference of the differences between two pair of signal values. As described earlier, the present invention does not limit the form of sensing information. Dual differences can be another form of the dual differential signals. For brevity of the description, the present invention below is described in the context of implementations of the dual differences. One with ordinary skill in the art may appreciate the implementations of dual differential signals from the implementations of dual differences.

Figure 1D:
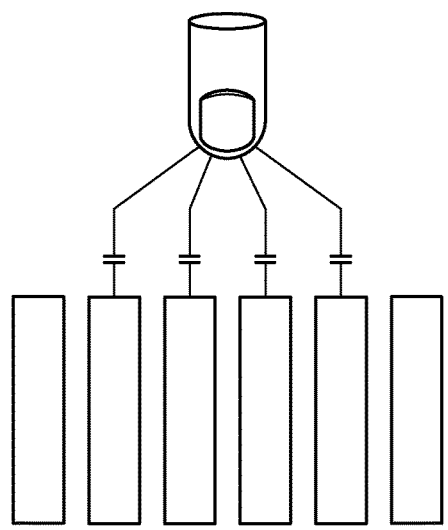
FIGS. 1D and 1E are schematic diagrams of dual differences in accordance with the present invention.
Figure 1D:
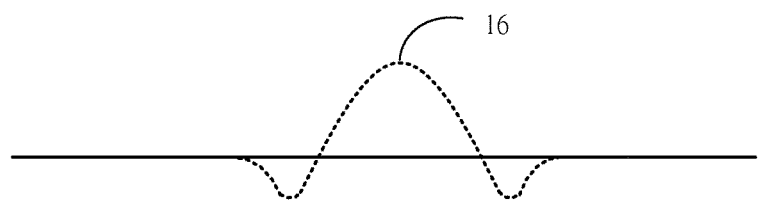
Figure 1E:
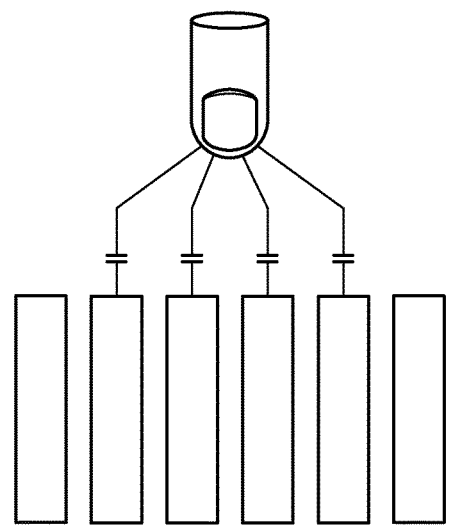
Figure 1E:
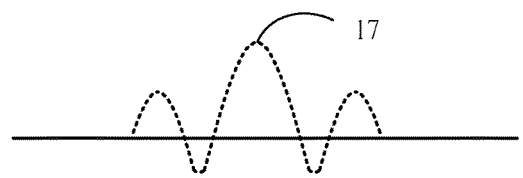

In an example of the present invention, when the external object touches or approaches the touch sensing device, two pairs of signal values are constituted by three adjacent or non-adjacent signal values. In an example of the present invention, the differences between the prior two signal values and the latter two signal values are a first difference and a second difference, respectively, and the dual difference is the difference between the first difference and the second difference, wherein the first difference and the second difference both can be the results of the preceding signal value minus the following signal value or the following signal value minus the preceding signal value. In another example of the present invention, the difference between the first two signal values and the difference between the last two signal values are a first difference and a second difference, respectively, and the dual difference is the sum of the first difference and the second difference, wherein one of the first difference and the second difference is the result of the preceding signal value minus the following signal value, whereas the other one of the first difference and the second difference is the result of the following signal value minus the preceding signal value. For example, two pairs of signal values include a first signal, a second signal, and a third signal. The dual differences for these three signal values are (second signal value–first signal value)+(second signal value–third signal value), (second signal value–first signal value)–(third signal value–second signal value), (first signal value–second signal value)+(third signal value–second signal value), or (first signal value–second signal value)–(second signal value–third signal value). When two pairs of signal values are constituted by three adjacent signal values, and an external object touches or approaches the touch sensing device, the continuous dual differences of 1D sensing information can be those shown in FIG. 1D, wherein the location of the external object corresponds to a middle peak 16 of the sensing information. Middle peak 16 may fall between two signal values. When two pairs of signal values are constituted by three non-adjacent signal values, and an external object touches or approaches the touch sensing device, the continuous dual differences of 1D sensing information can be those shown in FIG. 1E, wherein the location of the external object corresponds to a middle peak 17 of the sensing information. Middle peak 17 may fall between two signal values.

In the present invention, sensing information corresponding to respective sensors, time intervals or positions can be signals detected by the sensors. When the signals are analog, they can be converted into digital signal values by an ADC. Thus, the above difference can also be the value of the difference between a pair of signals, for example, value converted from a pair of signals subtracted via a differential amplifier. Similarly, the above dual difference can also be the value converted from two pairs of signals subtracted via a differential amplifier and then added (or subtracted) together. One with ordinary skill in the art can appreciate that the difference and dual difference described by the present invention do not only include being generated by signals or signal values, but also include temporary states of recording (electrical, magnetic or optical recording), signals or signal values during hardware or software implementations.

In other words, sensing information can be signals, differential signals (e.g. difference between a pair of signals), dual differential signals (e.g. sum or difference of two pairs of signals) on or between the sensors, and signal values, differences, dual differences (analog-to-digital converted signal values, differences or dual differences) are another form of representation. Signals and signal values, differential signals and differences, and dual differential signals and dual differences are representations of sensing information at different stages. In addition, for brevity of the description, touch-related sensing information mentioned herein broadly refers to sensing information corresponding to touch or proximity of an external object, such as original touch-related sensing information, differential touch-related sensing information and dual-differential touch-related sensing information.

One with ordinary skill in the art can appreciate that in the case of differences or dual differences, the zero-crossing is between at least one positive value and at least one negative value, that is, between a pair of positive and negative values. The difference or dual difference that corresponds to the touch or proximity of an external object may be a continuous alternating combination of at least one positive value and at least one negative value, wherein at least one zero value is interposed between the at least one positive value and at least one negative value. In most cases, the difference or dual difference that corresponds to the touch or proximity of the external object is a continuous alternating combination of multiple positive values and multiple negative values, wherein zero-crossings between positive and negative values may be at least a zero value or between two values.

In contrast, touch-related signal values include a plurality of continuous non-zero values, or a lone non-zero value which is not adjacent to other non-zero values. In some cases, a lone non-zero value not adjacent to other non-zero values may be generated by noise, which should be identified or neglected by thresholding or other types of mechanisms.

Since larger noise could generate a zero-crossing similar to the touch or proximity of an external object, thus in an example of the present invention, values that fall within a zero-value range will all be regarded as zero values. Difference or dual difference corresponding to the touch or proximity of an external object is a continuous alternating combination of multiple values above a positive threshold and multiple values below a negative threshold, wherein a zero-crossing between a value above the positive threshold and a value below a negative threshold may be at least one zero value or between two values.

In summary of the above, differential touch-related sensing information and dual-differential touch-related sensing information are continuous alternating combinations of at least one positive value and at least one negative value including a zero-crossing, wherein the zero-crossing can be at least one zero value or between the positive and negative values. In other words, in the differential touch-related sensing information and dual-differential touch-related sensing information, a plurality of continuous zero values between positive and negative values are regarded as zero-crossings, or one of the zero values is regarded as a zero-crossing.

In an example of the present invention, touch-related sensing information is set to begin with at least a positive or a negative value, and from there a continuous alternating combination of at least one positive value and at least one negative value including a zero-crossing is searched, wherein the zero-crossing may be at least one zero value or between positive and negative values. In differential touch-related sensing information, the alternating combinations of at least one positive value and at least one negative value occurs symmetrically, and in dual-differential touch-related sensing information, the alternating combinations of at least one positive value and at least one negative value do not occur symmetrically. In another example of the present invention, touch-related sensing information are continuous non-zero values, e.g. a plurality of continuous non-zero signal values.

The at least one positive value above can be regarded as a positive-value set including at least one positive value. Similarly, the at least one negative value above can be regarded as a negative-value set including at least one negative value. Thus, the above alternating combination can be a combination of two sets: a positive-value set and a negative-value set, or a combination of three or more sets with alternating positive-value and negative-value sets. In an example of the present invention, at least one zero value may exist between zero, one, or multiple positive-value and negative-value sets.

System Framework

In order to more clearly illustrate how sensing information of the present invention is generated, the present invention uses a capacitive touch sensing device as an example, and one with ordinary skill in the art can readily recognize other applications such as in resistive, infrared, surface acoustic wave, or optical touch sensing devices.

Figure 1F:
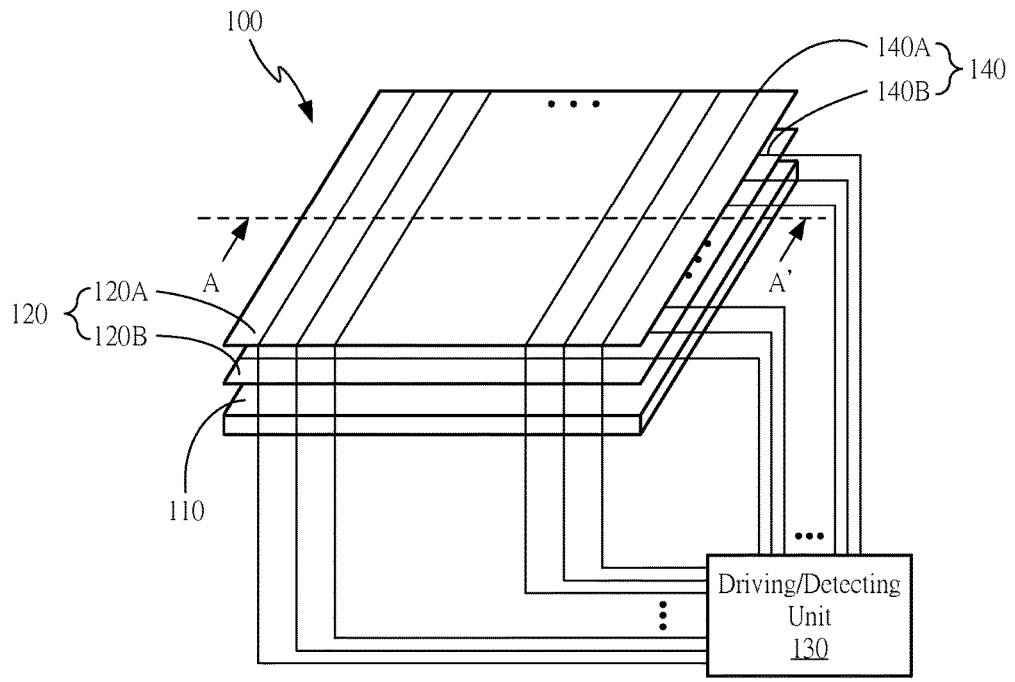
FIG. 1F is a structural schematic diagram of a sensing device in accordance with the present invention.

Referring to FIG. 1F, the present invention provides a position detecting device 100, which includes a sensing device 120 and a driving/detecting unit 130. The sensing device 120 has a sensing layer. In an example of the present invention, the sensing layer can include a first sensing layer 120A and a second sensing layer 120B. First and second sensing layers 120A and 120B each has a plurality of sensors 140, wherein the first sensors 140A of the first sensing layer 120A cross upon the second sensors 140B of the second sensing layer 120B. In another example of the present invention, the first and the second sensors 140A and 140B are disposed in a co-planar sensing layer. The driving/detecting unit 130 produces sensing information based on signals of the sensors 140. In the case of self-capacitive detection, for example, the sensors 140 that are driven are sensed. In the case of mutual-capacitive detection, some of the sensors 140 that are not directly driven by the driving/detecting unit 130 are sensed. In addition, the sensing device 120 can be disposed on a display 110. An optional shielding layer (not shown) can be interposed between the sensing device 120 and the display 110.

Figure 1G:
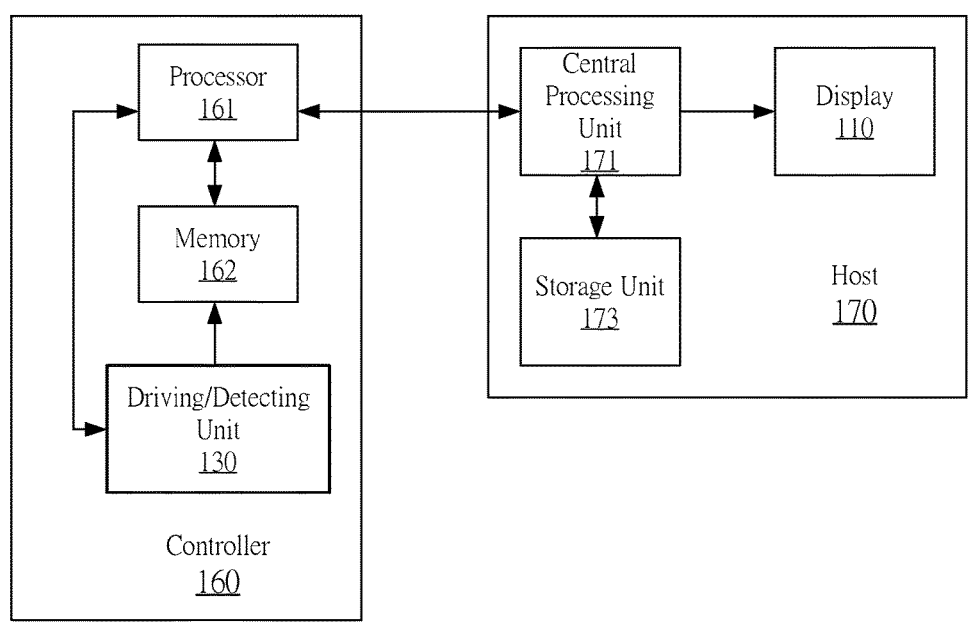
FIG. 1G is a functional block diagram of a computing system in accordance with the present invention.

The position detecting device 100 of the present invention can be applied to a computing system as shown in FIG. 1G, which includes a controller 160 and a host 170. The controller includes the driving/detecting unit 130 to operatively couple the sensing device 120 (not shown). In addition, the controller 160 can include a processor 161 for controlling the driving/detecting unit 130 in generating sensing information. Sensing information can be stored in a memory 162 and accessible by the processor 161. Moreover, the host 170 constitutes the main body of the computing system, mainly includes a central processing unit 171, a storage unit 173 that can be accessed by the central processing unit 171, and a display 110 for displaying the results of operations.

In another example of the present invention, there is a transmission interface between the controller 160 and the host 170. The controlling unit transmits data to the host via the transmission interface. One with ordinary skill in the art can appreciate that the transmission interface may include, but not limited to, UART, USB, I²C, Bluetooth, Wi-Fi wireless or wired transmission interfaces. In an example of the present invention, data transmitted can be positions (e.g. coordinates), identification results (e.g. gesture codes), commands, sensing information or other information provided by the controller 160.

In an example of the present invention, sensing information can be initial sensing information generated under the control of the processor 161, and position analysis is carried out by the host 170, such as position analysis, gesture identification, command identification etc. In another example of the present invention, sensing information can be analyzed by the processor 161 first before forwarding a determined position, gesture or command etc. to the host 170. The present invention is not limited to this example, and one with ordinary skill in the art can readily recognize other interactions between the controller 160 and the host 170.

In the present invention, sensors can consist of a plurality of conductive sheets and connecting wires, such as a set of rhombic or square conductive sheets connected together by connecting wires. Structurally, conductive sheets of the first sensors 140A and the second sensors 140B may be arranged in different or the same planes. For example, an insulating or piezoresistive layer can be interposed between the first and the second sensing layers 120A and 120B, wherein the piezoresistive layer is made from anisotropic conductive gel. Moreover, for example, conductive sheets of the first sensors 140A and the second sensors 140B are substantially arranged in the same plane, with the wires of the first sensors 140A bridging over the wires of the second sensors 140B. In addition, pads can be disposed between the wires of the first sensors 140A and the second sensors 140B. These pads can be made of insulating or piezoresistive materials.

Thus, in an example of the present invention, each sensor is responsible for a sensing range. There are a plurality of sensors, including a plurality of first sensors and a plurality of second sensors. The sensing ranges of these first sensors are parallel to each other, while the sensing ranges of these second sensors are parallel to each other. The parallel sensing ranges of the first and second sensors intersect to form an intersecting matrix. For example, the first and second sensors are two lines of infrared receivers arranged horizontally and vertically for sensing horizontal scanning ranges and vertical scanning ranges, respectively. The horizontal and vertical scanning ranges form an intersecting matrix. Also for example, the horizontal and vertical scanning ranges are implemented by several lines of intersecting capacitive or resistive sensors.

Conversion of Touch Sensitive Information

The signal values, differences and dual differences of the sensing information can be converted into one another. In a first conversion method provided by the present invention, continuous signal values are converted into continuous differences; each difference being the difference between a pair of adjacent or non-adjacent signal values.

In a second conversion method provided by the present invention, continuous signal values are converted into continuous dual differences; each dual difference being the sum or the difference of the difference between two pairs of signal values.

In a third conversion method provided by the present invention, continuous differences are converted into continuous signal values; each difference is added to all the preceding or following differences to obtain a corresponding signal value, thereby constructing continuous signal values.

In a fourth conversion method provided by the present invention, continuous differences are converted into continuous dual differences; each dual difference is the sum or difference of a pair of adjacent or non-adjacent differences.

In a fifth conversion method provided by the present invention, continuous dual differences are converted into continuous differences; each dual difference is added to all the preceding or following dual differences to obtain a corresponding difference, thereby constructing continuous differences.

In a sixth conversion method provided by the present invention, continuous dual differences are converted into continuous signal values. In an example of the present invention, each dual difference is added to all the preceding dual differences to obtain a corresponding difference, thereby constructing continuous differences, and thereafter each difference subtracts all the following differences to generate a corresponding signal value, thereby constructing continuous signal values. In another example of the present invention, each dual difference subtracts all the preceding dual differences to obtain a corresponding difference, thereby constructing continuous differences, and thereafter each difference is added to all the following differences to generate a corresponding signal value, thereby constructing continuous signal values.

Adding all the preceding or following differences or dual differences to generate a corresponding signal value or difference is performed by forward or backward cumulative summing or subtracting.

These conversion methods may include, but are not limited to, the conversion of 1D sensing information, one with ordinary skill in the art can appreciate that the above conversion methods can be applied to 2D sensing information or 3D (or even higher dimensional) sensing information. In addition, one with ordinary skill in the art can appreciate that the above conversion methods can be performed by said controller 160 or host 170.

Accordingly, in an example of the present invention, a first form of sensing information (e.g. 1D or 2D sensing information) detected is converted into sensing information for position analysis. In another example of the present invention, a first form of sensing information is converted into a second form of sensing information, and then the second form of sensing information is converted into sensing information for position analysis, for example, continuous dual difference is converted to continuous signal values.

One Dimensional Position Analysis

A first type of position analysis provided by the present invention involves analyzing the position of a zero-crossing from a plurality of differences in sensing information as the corresponding position of an external object. One with ordinary skill in the art can recognize that position analysis may include, but is not limited to, the determination of the touch or proximity of an object, that is, determination of a corresponding position of an external object may include, but is not limited to, the touch or proximity of the object.

In an example of the present invention, a pair of neighboring differences including a positive and a negative value is searched, that is, a pair of positive and negative values beside a zero-crossing, and then the position of the zero-crossing in this pair of neighboring differences is then determined, for example, a slope is determined based on this pair of neighboring differences to infer the position of the zero-crossing. In addition, the order in which the positive and negative values appear can be used in conjunction with the zero-crossing between neighboring differences to determine the position of the zero-crossing. Said pair of neighboring differences can be directly adjacent to each other, or not adjacent and with at least one zero value between them. In addition, a pair of neighboring differences with a predetermined order of arrangement can be searched for, for example, a pair of neighboring differences with a positive value appearing first and followed by a negative value is searched for.

In another example of the present invention, a threshold is used for determining the starting position of the zero-crossing search. From there, a pair of neighboring differences including a positive and a negative value is searched for, and then the position of a zero-crossing is determined based on the found pair of neighboring differences. One with ordinary skill in the art can appreciate that in the case that sensing information is represented by differences, when the sensing information corresponding to the touch or proximity of an external object is above a positive threshold or below a negative threshold, the search using these threshold values may include, but is not limited to, the determination of the touch or proximity of the external object. In other words, during the processing of scanning the sensing information, whenever a sensing information is above a positive threshold or below a negative threshold, then there is a zero-crossing in the sensing information that corresponds to a touch or proximity of an external object.

For example, a threshold generates binary values corresponding to positive differences. For example, a difference smaller than a threshold (e.g. positive threshold) is represented by 0 or a false value, and a difference larger than the threshold is represented by 1 or a true value, and the position of the "1" (or the true value) in adjacent differences 10 (or true and then false values) is regarded as the starting position for a backward search of a zero-crossing. Similarly, a difference larger than a threshold (e.g. negative threshold) is represented by 0 or a false value, and a difference smaller than the threshold is represented by 1 or a true value, and the position of the "1" (or the true value) in adjacent differences 01 (or false and then true values) is regarded as the starting position for a forward search of a zero-crossing.

Figure 4A:
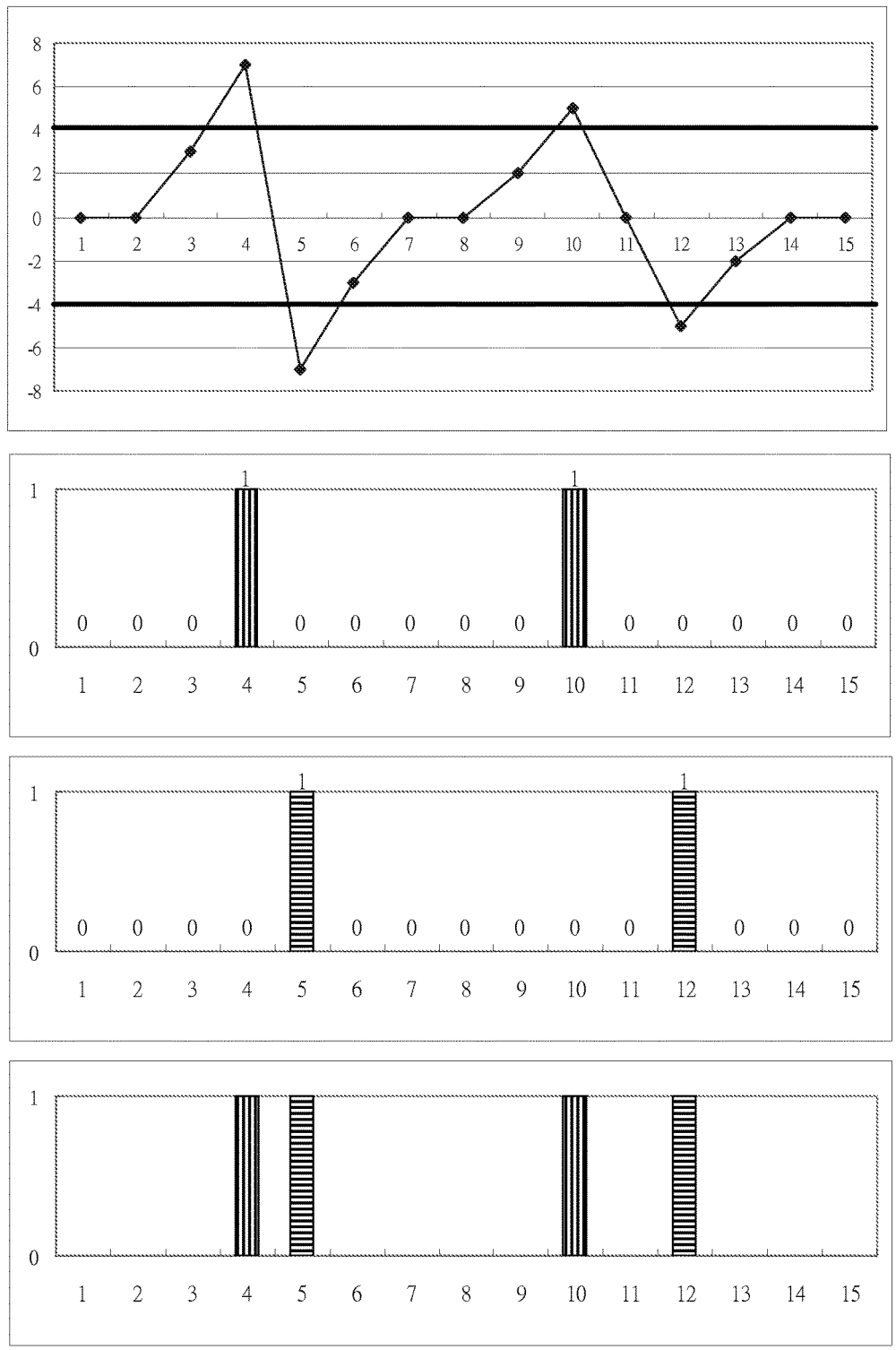
FIG. 4A is a schematic diagram showing binary difference detection location in accordance with the present invention.

For example, Table 1 and FIG. 4A are examples of using a threshold for determining the touch or proximity of an external object.

TABLE 1

| Index | Signal Value | Difference | First Binary Difference (T1 = 4) | Second Binary Difference (T2 = −4) |
|---|---|---|---|---|
| 1 | 0 | 0 | 0 | 0 |
| 2 | 0 | 0 | 0 | 0 |
| 3 | 0 | 3 | 0 | 3 |
| 4 | 3 | 7 | 1 | 0 |
| 5 | 10 | −7 | 0 | 1 |
| 6 | 3 | −3 | 0 | 0 |
| 7 | 0 | 0 | 0 | 0 |
| 8 | 0 | 0 | 0 | 0 |
| 9 | 0 | 2 | 0 | 0 |
| 10 | 2 | 5 | 1 | 0 |
| 11 | 7 | 0 | 0 | 0 |
| 12 | 7 | −5 | 0 | 1 |

TABLE 1-continued

| Index | Signal Value | Difference | First Binary Difference (T1 = 4) | Second Binary Difference (T2 = −4) |
|---|---|---|---|---|
| 13 | 2 | −2 | 0 | 0 |
| 14 | 0 | 0 | 0 | 0 |
| 15 | 0 | 0 | 0 | 0 |

This example includes signal values or differences of 15 sensors and the results of determination using a positive threshold T1 (e.g. 4) and a negative threshold T2 (e.g. −4). In the results found using the positive threshold, the starting positions are at the 4th and 10th differences, that is, the position of the "1" in adjacent differences 10. In FIG. 4A, vertical-stripe bars are used to represent two instances of touch or proximity of external objects. Similarly, in the results found using the negative threshold, the starting positions are at the 5th and 12th differences, that is, the position of the "1" in adjacent differences 01. In the diagram, horizontal-stripe bars are used to represent two instances of touch or proximity of external objects. One with skill the art can appreciate that the number of starting position corresponds to the number of instances of touch or proximity of external objects. The present invention does not limit to only two instances of touch or proximity of external objects, but there can be just one or more than two.

In another example of the present invention, an interval for a zero-crossing is determined using a first threshold and a second threshold, which may include, but not limited to, touch or proximity of an external object, and then the position of the zero-crossing is searched within this interval. For example, a first threshold produces binary values corresponding to positive differences, for example, a difference smaller than the first threshold is represented by 0 or a false value, and a difference larger than the first threshold is represented by 1 or a true value, and the position of the "1" in adjacent differences 10 is regarded as the starting position. In addition, a second threshold produces binary values corresponding to negative differences, for example, a difference larger than the second threshold is represented by 0 or a false value, and a difference smaller than the second threshold is represented by 1 or a true value, and the position of the "1" in adjacent differences 01 is regarded as the end position. Moreover, the starting and end positions are paired to form intervals for searching zero-crossings. In an example of the present invention, a slope is used to determine the zero-crossing between a starting position (e.g. position of "1" in 10) and an end position (e.g. position of "1" in 01). One with ordinary skill in the art can appreciate that the starting and end positions are interchangeable. One with ordinary skill in the art can appreciate that touch-related sensing information can be determined by regarding the location of "1" in 01 as the starting position and the location of "1" in 10 as the end position.

Take again the example shown in FIG. 4A and Table 1, after pairing, a first search interval is between the 4th and 5th differences, and a second search interval is between the 10th and 12th differences.

One with ordinary skill in the art can appreciate that positive and negative thresholding can be performed simultaneously (or in parallel). Interval pairing can be carried out by pairing a determined starting position with an end position that determined immediately afterwards.

In an example of the present invention, thresholds can be generated by sensing information. For example, a threshold value can be determined by multiplying the maximum of the absolute values of all the differences by a ratio (e.g. a ratio smaller than one, such as 0.9), or a positive threshold value can be determined by multiplying the maximum of all the positive differences by a ratio, or a negative threshold value can be determined by multiplying the minimum of all the negative differences by a ratio. In other words, a threshold value can be static or dynamic. Thus, when the absolute value of a threshold is relatively large, it is possible that an external object is determined in the scanning using the positive thresholding but not in the scanning using the negative thresholding, or vice versa. A larger threshold value is favorable for noise or ghost-point filtering, while a smaller threshold value is favorable for avoiding miss of real touch or for determining proximity of external objects.

From the above, it is clear that, corresponding to the same touch or proximity of an object, regardless of a backward search from a starting position identified using a positive threshold value or a forward search from a starting position identified using a negative threshold value, the same zero-crossing will be found. Thus, in an example of the present invention, starting positions are found by scanning using the positive and negative thresholds, and zero-crossings are searched from the starting positions, and the number of external touch or proximity is determined based on the number of zero-crossings found, and then the positions of the zero-crossings are further determined. When the values at both sides of a zero-crossing that corresponds to an external touch or proximity are first positive and then negative, the search for zero-crossing is backward from the starting position when using positive thresholding, whereas the search for zero-crossing is forward from the starting position when using negative thresholding, and vice versa. In addition, an external touch or proximity may not always exhibit starting positions in both positive and negative thresholdings.

A second type of position analysis provided by the present invention involves analyzing the position of centroid (position of center of gravity or weighted average position) based on a plurality of signal values or dual differences in sensing information as the corresponding position of an external object.

Figure 4B:
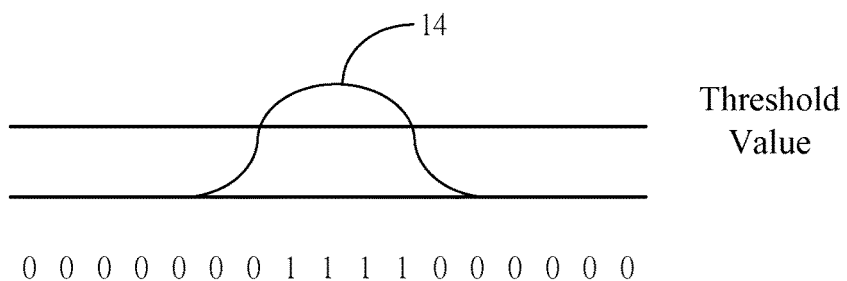
FIGS. 4B to 4D are schematic diagrams showing an example for detecting a centroid location in accordance with the present invention.
Figure 4C:
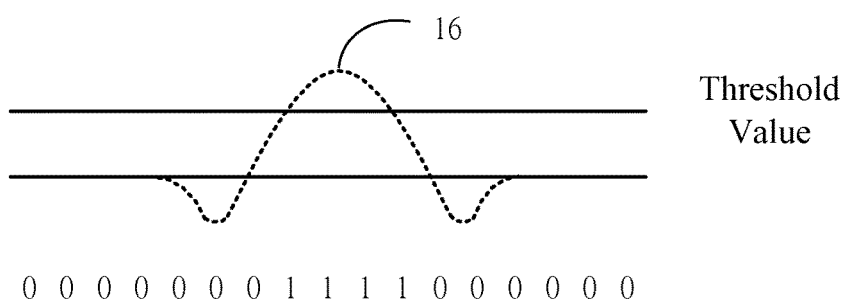
Figure 4D:
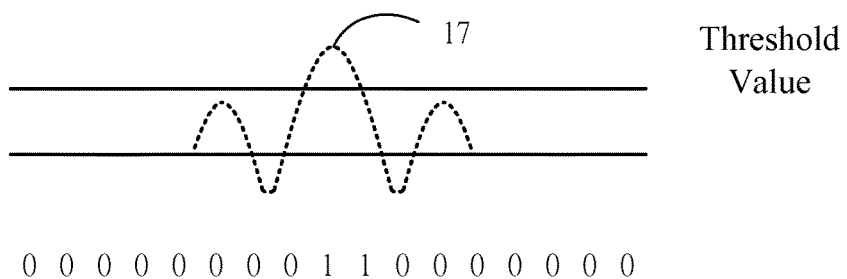

In an example of the present invention, a threshold value is used to determine the signal values or dual differences for determining centroid position. As shown in FIGS. 4B and 4D, a threshold can generate binary values corresponding to signal values or dual differences. For example, a signal value or dual difference smaller than a threshold is represented by 0 or a false value, and a signal value or dual difference larger than the threshold is represented by 1 or a true value. In this example, a signal value or dual difference represented by 1 or a true value is used in determining centroid position. One with ordinary skill in the art can appreciate other ways for determining the signal values or dual differences for determining centroid position using a threshold. For example, a signal value or dual difference represented by 1 or a true value, as well as a plurality of signal values or dual differences at either side thereof, are used in determining centroid position. As another example, in a continuous series of adjacent signal values or dual differences represented by 1's or true values, a number (i) of and a number (j) of signal values or dual differences before and after a signal value or dual difference that is at the center of the series are taken, respectively, to determine the centroid position.

In another example of the present invention, continuous signal values or dual differences are converted into continuous differences to identify the center signal value or dual difference that corresponds to a zero-crossing, and i and j signal values or dual differences before and after this center signal value or dual difference are used for determining the centroid position.

In another example of the present invention, a zero-crossing is determined by continuous differences, and the continuous differences are converted into continuous signal values or dual differences, and then the center signal value or dual difference that corresponds to the zero-crossing is identified, thereafter, i and j signal values or dual differences before and after this center signal value or dual difference are used for determining the centroid position.

Assuming that using i and j signal values respectively before and after the nth signal value as a centroid calculation range, the centroid position can be determined based on each signal value $C_k$ and its position in the centroid calculation range as follows:

$$C_{centroid} = \frac{\sum_{k=n-i}^{n+j} X_k C_k}{\sum_{k=n-i}^{n+j} C_k}$$

wherein $X_k$ can be a 1D coordinate (e.g. X or Y coordinate) or 2D coordinates (e.g. (X, Y)).

Assuming the difference between the k−1th signal value and the kth signal value is $D_k$, and the kth dual difference is $DD_k = D_{k-1} - D_k = (C_k - C_{k-1}) - (C_{k+1} - C_k) = 2C_k - C_{k-1} + C_{k+1}$, and assuming using i and j signal values respectively before and after the nth dual difference $DD_n$ as a centroid calculation range, the centroid position can be determined based on each dual difference $DD_k$ in the centroid calculation range as follows:

$$DD_{centroid} = \frac{\sum_{k=n-i}^{n+j} X_k DD_k}{\sum_{k=n-i}^{n+j} DD_k}$$

wherein $X_k$ can be a 1D coordinate (e.g. X or Y coordinate) or 2D coordinates (e.g. (X, Y)). One with ordinary skill in the art can similarly appreciate the calculation for centroid position when the kth dual difference is $DD_k = (C_k - C_{k-2}) - (C_{k+2} - C_k) = 2C_k - C_{k-2} + C_{k+2}$. This will not be described further.

In another example of the present invention, signal values or dual differences used for determining centroid position are obtained by first subtracting by a base value. For example, this base value can be the average of all signal values or dual differences, the average of a plurality of signal values or dual differences at either sides of the signal values or dual differences used for centroid position determination, or the average of a plurality of signal values or dual differences not used for centroid position determination that are adjacent to either sides of the signal values or dual differences used for centroid position determination. One with ordinary skill in the art can recognize other ways of determining the base value. For example, the base value can be determined based on a first ratio of at least one signal value or dual difference at one side and a second ratio of at least one signal value or dual difference at the other side.

Take the average the ith signal value $C_{n-i}$ and the jth signal value $I_{n+j}$ respectively preceding and following the nth signal value as the base value $C_{base(i,j)}$ $$\left(C_{base(i,j)} = \frac{C_{n-i} + C_{n+j}}{2}\right),$$

and using i and j signal values respectively preceding and following the nth signal value as a centroid calculation range, the centroid position can be determined based on each signal value $C_k$ minus the base value $C_{base(i,j)}$ (i.e. a signal value for calculation ($C_k - C_{base(i,j)}$)) in the centroid calculation range as follows:

$$C_{base(i,j)} = \frac{C_{n-i} + C_{n+j}}{2}$$

$$C_k - C_{base(i,j)} = \frac{2C_k - C_{n-i} - C_{n+j}}{2} = \frac{(C_k - C_{n-i})}{2} + \frac{(C_k - C_{n+j})}{2}$$

$$C_{cnetroid} = \frac{\sum_{k=n-i}^{n-i \le k \le n+j} X_k \left(\frac{2C_k - C_{n-i} - C_{n+j}}{2}\right)}{\sum_{k=n-i}^{n-i \le k \le n+j} \frac{2C_k - C_{n-i} - C_{n+j}}{2}} = \frac{\sum_{k=n-i}^{n-i \le k \le n+j} X_k (2C_k - C_{n-i} - C_{n+j})}{\sum_{k=n-i}^{n-i \le k \le n+j} (2C_k - C_{n-i} - C_{n+j})}$$

wherein $X_k$ can be a 1D coordinate (e.g. X or Y coordinate) or 2D coordinates (e.g. (X, Y)).

Accordingly, a third type of position analysis provided by the present invention involves analyzing the position of the centroid (position of center of gravity or weighted average position) based on a plurality of differences in sensing information as the corresponding position of an external object.

Assuming the difference between the k−1th signal value $C_k$ and the kth signal value $C_k$ is $D_k$.

$$(C_k - C_{n-i}) = D_{n-(i-1)} + D_{n-(i-2)} + \ldots + D_k$$

$$(C_k - C_{n+j}) = -(D_{k+1} + D_{k+2} + \ldots + D_{n+j})$$

$$C_k - C_{base(i,j)} = \frac{2C_k - C_{n-i} - C_{n+j}}{2}$$

$$= \frac{(D_{n-(i-1)} + D_{n-(i-2)} + \ldots + D_k) - (D_{k+1} + D_{k+2} + \ldots + D_{n+j})}{2}$$

$$C_k - C_{base(i,j)} = \frac{\sum_{s=n-(i-1)}^{k} D_s - \sum_{s=k+1}^{n+j} D_s}{2}$$

$$C_{cnetroid} = \frac{\sum_{s=n-i}^{n-i \le k \le n+j} X_s \left(\frac{\sum_{s=n-(i-1)}^{k} D_s - \sum_{s=k+1}^{n+j} D_s}{2}\right)}{\sum_{s=n-i}^{n-i \le k \le n+j} \frac{\sum_{s=n-(i-1)}^{k} - \sum_{s=k+1}^{n+j} D_s}{2}} =$$

-continued $$\frac{\sum_{s=n-i}^{n-i\leq k\leq n+j} X_k \left( \sum_{s=n-(i-1)}^{k} D_s - \sum_{s=k+1}^{n+j} D_s \right)}{\sum_{s=n-i}^{n-i\leq k\leq n+j} \left( \sum_{s=n-(i-1)}^{k} D_s - \sum_{s=k+1}^{n+j} D_s \right)}$$

Accordingly, the centroid position $C_{centroid}$ can be calculated based on the differences between the signal values, wherein the differences in the centroid calculation range are $D_{n-(i-1)}, D_{n-(i-2)}, \ldots, D_k, D_{k+1}, \ldots, D_{n+j}, D_{n+(j+1)}$. In other words, the centroid position $C_{centroid}$ can be calculated based on the differences in the centroid calculation range.

As an example, assuming one signal value preceding and following the nth signal value are taken for determining the centroid position, differences in the centroid calculation range can be used to calculate it. This is proven as follows:

$$D_{n-1} = C_{n-1} - C_{n-2}$$

$$D_n = C_n - C_{n-1}$$

$$D_{n+1} = C_{n+1} - C_n$$

$$D_{n+2} = C_{n+2} - C_{n+1}$$

$$C_{base(2,2)} = \frac{C_{n-2} + C_{n+2}}{2}$$

$$C_{n-1} - C_{base(2,2)} = \frac{2C_{n-1} - C_{n-2} - C_{n+2}}{2} = \frac{D_{n-1} - D_n - D_{n+1} - D_{n+2}}{2}$$

$$C_n - C_{base(2,2)} = \frac{2C_n - C_{n-2} - C_{n+2}}{2} = \frac{C_{n-1} + D_n - D_{n+1} - D_{n+2}}{2}$$

$$C_{n+1} - C_{base(2,2)} = \frac{2C_{n+1} - C_{n-2} - C_{n+2}}{2} = \frac{D_{n-1} + D_n + D_{n+1} - D_{n+2}}{2}$$

$$C_{centroid} = \frac{X_{n-1}(C_{n-1} - C_{base(2,2)}) + X_n(C_n - C_{base(2,2)}) + X_{n+1}(C_{n+1} - C_{base(2,2)})}{(C_{n-1} - C_{base(2,2)}) + (C_n - C_{base(2,2)}) + (C_{n+1} - C_{base(2,2)})}$$

$$C_{centroid} = \frac{\begin{pmatrix} X_{n-1}(D_{n-1} - D_n - D_{n+1} - D_{n+2}) + \\ X_n(D_{n-1} + D_n - D_{n+1} - D_{n+2}) + \\ X_{n+1}(D_{n-1} + D_n + D_{n-1} - D_{n-2}) \end{pmatrix}}{\begin{pmatrix} (D_{n-1} - D_n - D_{n+1} - D_{n+2}) + \\ (D_{n-1} + D_n - D_{n+1} - D_{n+2}) + \\ (D_{n-1} + D_n + D_{n+1} - D_{n+2}) \end{pmatrix}}$$

One with ordinary skill in the art can recognize that taking i and j signal values, differences or dual differences respectively preceding and following the nth signal value as the centroid calculation range can be applied to determine the signal value, difference or dual difference on the centroid position, and vice versa.

From the above description, it can be seen that the present invention performs position detection by analyzing sensing information that may include, but not limited to, initially obtained signal values, differences, or dual differences, and signal values, differences, or dual differences converted from initially obtained sensing information. By analyzing 1D or 2D sensing information on two different axes (e.g. X and Y axes) that corresponds to the same object, that is, by performing 1D or 2D position analysis on two different axes, the positions (or coordinates) of the external object on these two axes can be obtained, and thus a 2D position (or 2D coordinates) can be constructed.

One with ordinary skill in the art can appreciate that operations of the above 1D position analysis can be performed by said controller 160 or host 170.

Two Dimensional Position Analysis 2D sensing information can be comprised of a plurality of 1D sensing information, wherein each 1D sensing information includes sensing information that corresponds to a plurality of first 1D positions, and each 1D sensing information corresponds to a second 1D position. Thus, 2D position analysis can at least include 1D position analysis on a plurality of 1D touch sensitive information, that is, 2D position analysis can at least include a plurality of 1D position analysis.

In addition, in a first example of the present invention, a first 1D centroid position of any external object on each 1D sensing information is a 2D position (e.g. 2D coordinates (first 1D centroid position, second 1D position of the 1D sensing information)), and can be used to calculate a 2D centroid position of the object (or center of geometry), wherein the weighted value of each 1D centroid position can be a signal value or dual difference of the external object on the corresponding 1D sensing information (e.g. one or the average or an interpolation of two signal values or dual differences closest to the 1D centroid position on the 1D sensing information), or sum of signal values or dual differences of the external object on the corresponding 1D sensing information.

Thus, 2D position analysis may include performing 1D position analysis on each 1D sensing information, and analyzing a 2D centroid position of each external object based on at least one 2D position that corresponds to each external object.

In addition, in a second example of the present invention, 2D position analysis may include performing 1D position analysis on a plurality of 1D sensing information on a first axis (or a first dimension), respectively, and based on at least one 1D position corresponding to each external object on the first axis, analyzing a first 1D centroid position of each external object on the first axis. Similarly, 2D position analysis may further include performing 1D position analysis on a plurality of 1D sensing information on a second axis (or a second dimension), respectively, and based on at least one 1D position corresponding to each external object on the second axis, analyzing a second 1D centroid position of each external object on the second axis. By pairing the first 1D centroid position on the first axis with the second 1D centroid position on the second axis for each external object, a 2D position for each external object can be obtained.

In other words, 2D position analysis may include performing 1D position analysis on 2D sensing information on two different axes (e.g. 2D sensing information on the first axis and 2D sensing information on the second axis) to obtain a 2D position for each external object.

In addition, in a third example of the present invention, 2D position analysis may include analyzing a 1D centroid position corresponding to each external object from a plurality of 1D sensing information on a first axis, and based on a 2D position corresponding to each 1D sensing information, determining a 2D position of each 1D centroid position that corresponds to each external object on the first axis. 2D position analysis may further include analyzing a 1D centroid position corresponding to each external object from a plurality of 1D sensing information on a second axis, and based on a 2D position corresponding to each 1D sensing information, determining a 2D position of each 1D centroid position that corresponds to each external object on the second axis. 2D position analysis may further include analyzing a 2D centroid position based on the 2D positions of all 1D centroid positions on the first and second axes that correspond to each external object.

One with ordinary skill in the art can appreciate that 2D sensing information can be used to determine the position of each external object by image processing, for example, using watershed or other image processing techniques. As another example, watershed algorithm can be used to analyze the position of each watershed, and then the centroid position is calculated using sensing information close to each watershed position to obtain a more accurate position.

In a fourth example of the present invention, a plurality of 1D sensing information initially obtained are represented by signal values or dual differences, which construct an image (or matrix) formed of a 2D sensing information. Watershed algorithm or other image processing techniques can be used for position analysis. Alternatively, a "connected component" algorithm can be used, which analyzes connected portions in the image to determine the image of each external object, and further determines the position or the type of the object, such as a finger, a palm or a pen.

In a fifth example of the present invention, a plurality of 1D sensing information initially obtained are represented by differences, which are then converted into signal values or dual differences, which in turn construct an image (or matrix) formed of a 2D sensing information. Watershed algorithm or other image processing techniques can be used for position analysis.

In a sixth example of the present invention, a plurality of 1D sensing information initially obtained are represented by differences. By performing position analysis on each 1D sensing information, the position of each zero-crossing, as well as the signal value or dual difference on the position of each zero-crossing can be determined, thereby constructing an image (or matrix) formed of a 2D sensing information. Watershed algorithm or other image processing techniques can be used for position analysis.

The dual difference at a zero-crossing point can be generated by two directly adjacent differences, for example, a zero-crossing is between the k−1th difference and the kth difference, and the dual difference at this zero-crossing point is $DD_k = D_{k-1} - D_k$. The signal value at a zero-crossing point can be generated after converting all differences representing the 1D sensing information into signal values, or generated based on a plurality of differences closest to the zero-crossing. For example, a zero-crossing is closest to the nth signal value, and the average of ith signal value $C_{n-i}$ and the jth signal value $I_{n+j}$ preceding and following the nth signal value is taken as the base value $C_{base(i,j)}$ $$C_n - C_{base(i,j)} = \frac{2C_n - C_{n-i} - C_{n+j}}{2}$$
$$= \frac{(D_{n-(i-1)} + D_{n-(i-2)} + \ldots + D_n) - (D_{n+1} + D_{n+2} + \ldots + D_{n+j})}{2}.$$

and $$\left(C_{base(i,j)} = \frac{C_{n-i} + C_{n+j}}{2}\right),$$

is taken as the signal value, then $$C_n - C_{base(i,j)} = \frac{2C_n - C_{n-i} - C_{n+j}}{2}$$

In other words, the signal value at zero-crossing can be determined from the (n−(i−1))th difference to the (n+j)th difference.

In a seventh example of the present invention, a plurality of 1D sensing information initially obtained are represented by signal values and dual differences and are then converted to differences. By performing analysis on each 1D sensing information, the position of each zero-crossing is determined. In conjunction with the signal value or dual difference on each zero-crossing position, an image (or matrix) formed of a 2D sensing information can be constructed. Watershed algorithm or other image processing techniques can be used for position analysis.

In an eighth example of the present invention, when or in the process of obtaining 2D sensing information on the first axis, 1D sensing information on the second axis is also obtained. After performing position analysis on the position of the 2D sensing information on the first axis, the 1D position or 2D position of each external object on the first axis can be obtained. In addition, after performing position analysis on the position of the 1D sensing information on the second axis, the 1D position of each external object on the second axis can be obtained. The 1D position on the second axis can be paired up with the 1D position on the first axis to form a 2D position, or can be used to replace or correct the position on the second axis in the 2D position on the first axis.

One with ordinary skill in the art can appreciate that the operations of the above 2D position analysis can be performed by said controller 160 or host 170. In addition, in an example of the present invention, the 1D distance or 2D distance between each 1D centroid position corresponding to the same touch or approach and at least one other 1D centroid position corresponding to the same touch or approach is within a certain threshold. In another example of the present invention, the weighted value of each 1D centroid position corresponding to the same touch or approach is greater than a certain threshold.

In the following description, a touch-related sensing information can be a touch-related sensing information or one of several touch-related sensing information in a sensing information. Operations related to touch-related sensing information can be applied not only to specific touch-related sensing information, but also to all touch-related sensing information of the present invention.

Figure 5A:
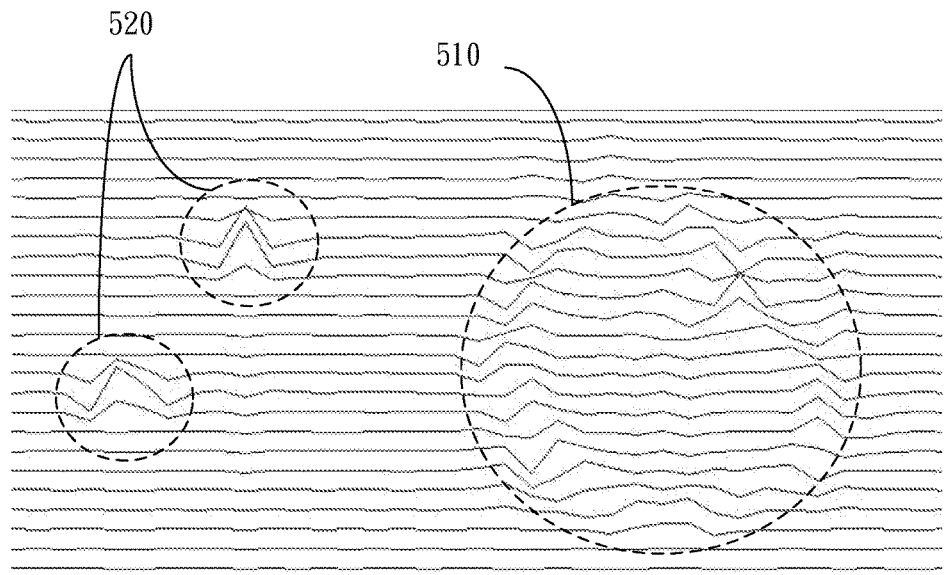
FIGS. 5A and 5B are schematic diagrams showing basins and valleys in accordance with the present invention.
Figure 5B:
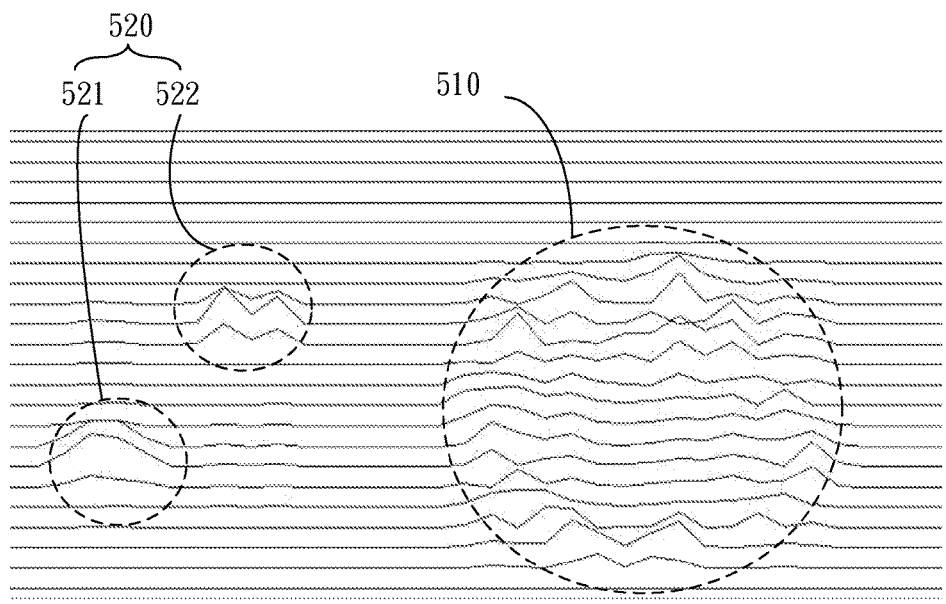

In addition, for convenient description, in numerous diagrams and descriptions of the present invention, explanations are given in terms of positive values. One with ordinary skill in the art can appreciate that same principles are applicable to sensing information after its positive and negative values are swapped. The 2D sensing information described by the present invention can be a partial sensing information having inner low values within outer high values, as shown by a basin 510 in FIGS. 5A and 5B. In an example of the present invention, a 2D sensing information includes a plurality of dual differences, when an external object touches a large area, in the corresponding touch-related sensing information, locations closer to the center of the area will exhibit depressions (smaller values) relative to surrounding higher locations (larger values). In another example of the present invention, a 2D sensing information includes a plurality of differences in which all negative values are converted into positive values, when the area touched by an external object is larger than a certain degree, in the corresponding touch-related sensing information, locations closer to the center of the area will exhibit depressions (smaller values) relative to surrounding higher locations (larger values).

If they are viewed as topographic relief, a partial sensing information having lower inner values within higher external values may seem like a valley or a basin area in the 2D sensing information, including higher and lower places surrounding a valley or basin. For example, it can be a valley surrounded by one or more mountains, e.g. a basin surrounded by mountains or a canyon, or a mountain or a plateau with a depressed top. Sensing information having inner low values within outer high values can be one or more openings, e.g. a canyon opens at both ends. In a 2D sensing information that includes a plurality of dual differences, a touch-related sensing information may also include a trench surrounding a valley.

In contrast to partial sensing information having inner low values within outer high values is partial sensing information with inner high values within outer low values, for example, it may look like a hill or a plateau with one peak (such as a single-peak hill 521) or more peaks (such as two-peak hill 522). Each peak is a partial sensing information with inner high values within outer low values, wherein the peak are higher locations (larger values) relative to other surrounding lower locations (smaller values), as illustrated by hills 520 shown in FIGS. 5A and 5B. In an example of the present invention, a hill with several peaks corresponds to several neighboring partial sensing information having inner low values within outer high values.

For example, in a 2D sensing information that includes a plurality of signal values, a touch-related sensing information that contains a partial sensing information with inner high values within outer low values is a hill (a smaller range) or a plateau (a larger range). Similarly, a 2D sensing information that includes a plurality of dual differences or in which all negative differences have been converted into positive values can also include a hill or a plateau.

In an example of the present invention, partial sensing information with inner low values within outer high values and partial sensing information with inner high values within outer low values are touch-related sensing information. In another example of the present invention, a plateau is regarded as a larger hill, and a basin is regarded as a valley without or has fewer openings. In yet another example of the present invention, touch-related sensing information that is either a valley (or a basin) or a hill, or either a hill or a valley (or a basin).

Moreover, when a 2D sensing information is a 2D sensing information including a plurality of differences in which all negative values are converted into positive values, two adjacent sensing information having lower high values within outer low values are regarded as on the same touch-related sensing information.

In the following descriptions, a basin is used to represent partial sensing information with inner low values within outer high values, and a hill is used to represent partial sensing information with inner high values within outer low values for the sake of convenience, and the present invention is not limited to these aspects. One with ordinary skill in the art can appreciate other aspects of partial sensing information with inner low values within outer high values and partial sensing information with inner high values within outer low values.

Figure 6A:
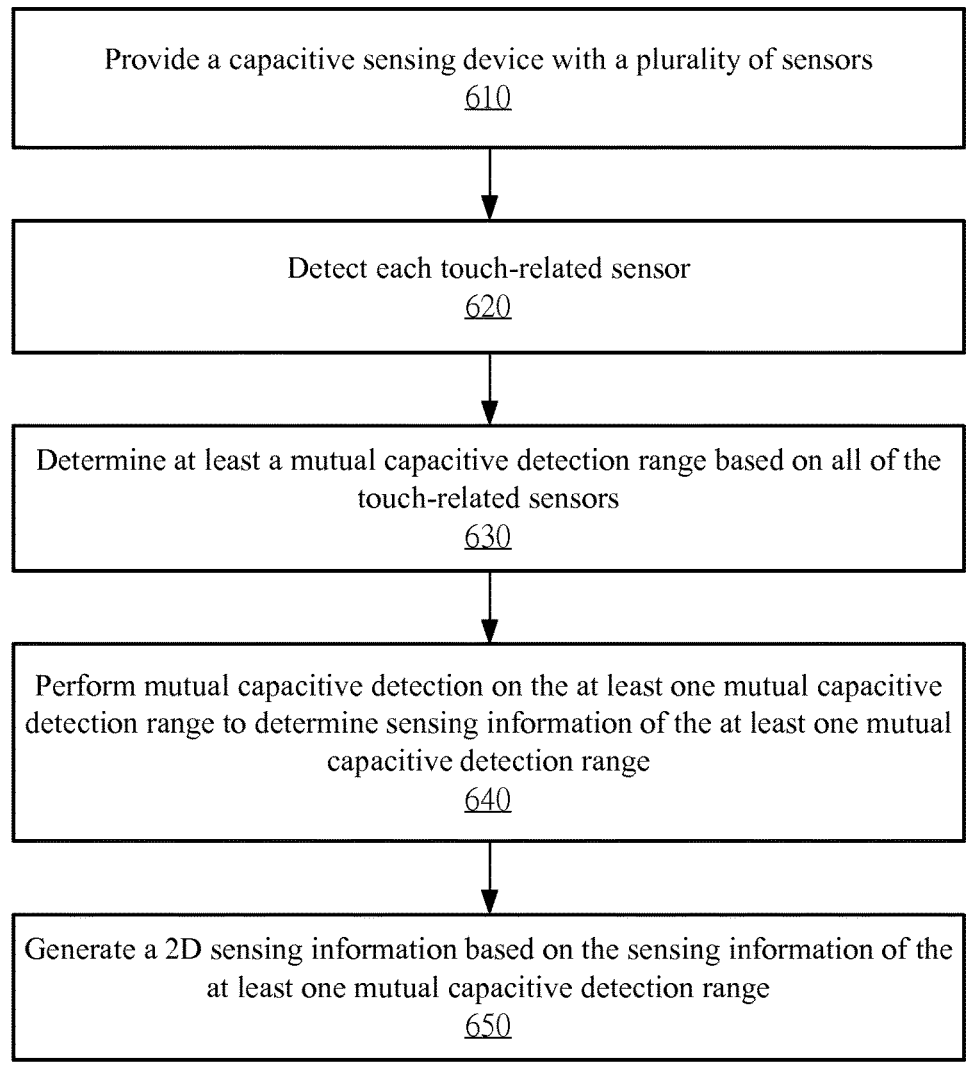
FIGS. 6A and 6B are flowcharts illustrating a method for capacitive position detection in accordance with a first embodiment of the present invention.

In a first embodiment of the present invention, a method for capacitive position detection is provided as shown in FIG. 6A. First, in step 610, a capacitive sensing device with a plurality of sensors is provided, wherein these sensors include a plurality of first sensors and a plurality of second sensors, and these first and second sensors intersect at a plurality of intersections. Next, in step 620, each touch-related sensor is detected. Next, in step 630, at least a mutual capacitive detection range is determined based on all of the touch-related sensors. Then, in step 640, mutual capacitive detection is carried out on the at least one mutual capacitive detection range to determine sensing information of the at least one mutual capacitive detection range. Then, in step 650, a 2D sensing information is generated based on the sensing information of the at least one mutual capacitive detection range.

In step 620, the touch-related sensors can be determined by self-capacitive detection. For example, self-capacitive detection is performed on all of the first sensors to determine touch-related first sensors. Similarly, touch-related second sensors can be determined. Alternatively, the touch-related sensors can be determined by mutual-capacitive detection. For example, while all of the first sensors are simultaneously driven by a driving signal, signals of the second sensors are detected sequentially or simultaneously to determine touch-related second sensors. In addition, while all of the first sensors are simultaneously driven by a driving signal, signals of the first sensors can also be detected sequentially or simultaneously to determine touch-related first sensors.

Figure 6B:
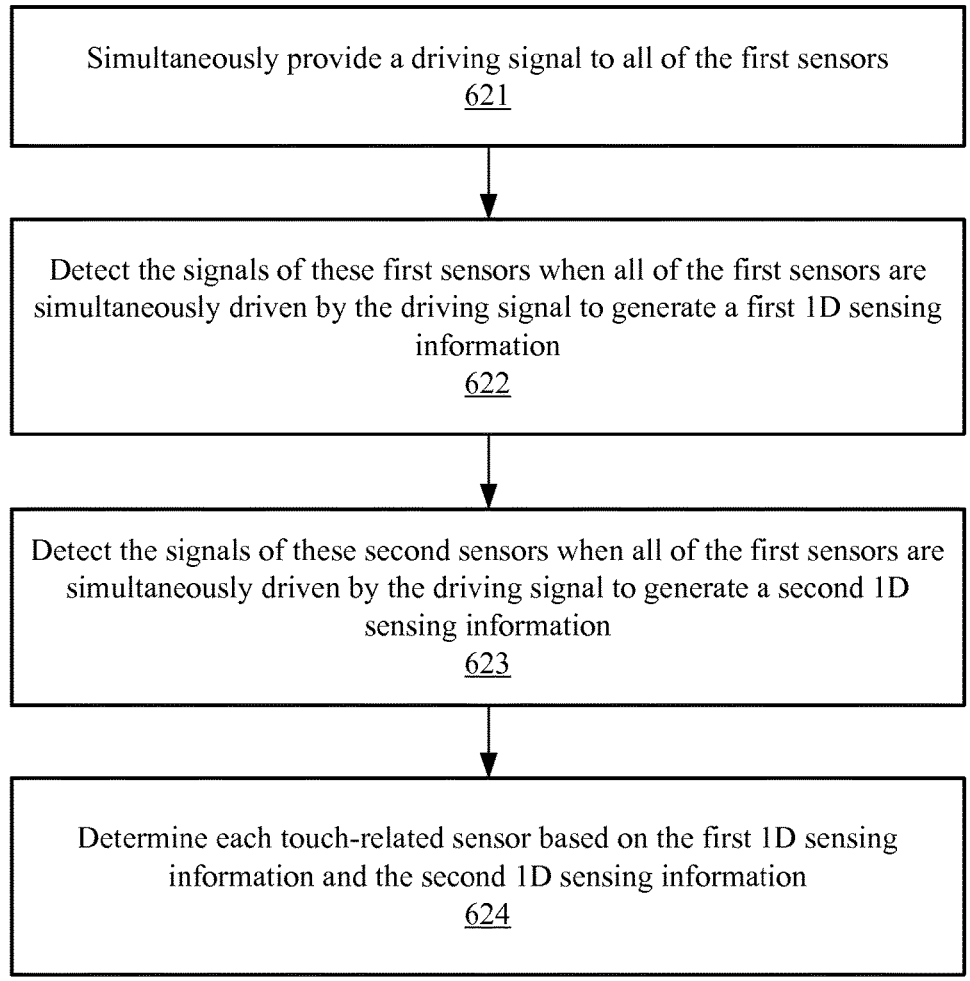

The detection of each touch-related sensor can be as shown in FIG. 6B. First, in step 621, a driving signal is simultaneously provided to all of the first sensors. Next, in steps 622 and 623, when all of the first sensors are simultaneously driven by the driving signal, the signals of these first sensors are detected to generate a first 1D sensing information, and the signals of these second sensors are detected to generate a second 1D sensing information. Then, in step 624, each touch-related sensor is determined based on the first 1D sensing information and the second 1D sensing information.

A 1D sensing information can be determined from the signals of all the first sensors or signals of all the second sensors. By determining each touch-related sensing information on the 1D sensing information, a touch-related sensor corresponding to each touch-related sensing information can be determined. For example, a touch-related sensing information such as one shown in FIG. 1B, 1C, 1D or 1E can be determined on the 1D sensing information, and in turn a touch-related sensor is determined.

In an example of the present invention, the touch-related sensors may include sensors corresponding to several zero values at either side of the touch-related sensing information. For example, when the values of the sensing information are signal values, the touch-related sensors may include one sensor at either side; when the values of the sensing information are differences, the touch-related sensors may include two sensors at either side; or when the values of the sensing information are dual differences, the touch-related sensors may include three sensors at either side.

In step 630, the mutual-capacitive detection range may be the intersections on all the touch-related first sensors or the second sensors, or the intersections of all the touch-related sensors. For example, the intersections between all touch-related first sensors and all touch-related second sensors are used as the mutual-capacitive detection range.

Moreover, in step 640, the driving signal can be provided sequentially to each touch-related first sensor. When each touch-related first sensor is driven by the driving signal, the signal of each touch-related second sensor or the signals of all second sensors is/are detected to determine the sensing information of at least one mutual-capacitive detection range.

In contrast to the sensing information corresponding to at least one mutual-capacitive detection range, in the 2D sensing information described in step 650, the sensing information not corresponding to at least one mutual-capacitive detection range can be represented by a zero value or a predetermined value. Accordingly, the present invention can generate a 2D sensing information across all intersections without need to detect the signals of all the intersections.

In addition, the present invention may further include analyzing the partial sensing information or 2D sensing information to determine each touch-related sensing information, wherein the determining at least includes determining each touch-related sensing information having inner low values within outer high values, for example, a valley- or basin-type touch-related sensing information. The determining may also include determining each touch-related sensing information having inner high values within outer low values, for example, a hill-type touch-related sensing information.

When the 2D sensing information is a 2D differential sensing information, that is, when each value of the sensing information corresponding to the at least one mutual-capacitive detection range is generated based on the signals of a pair of sensors, all negatives values can be converted into positive values, or all positive values into negative values, before said determining. In a preferred example of the present invention, all negative values are converted into positive values. Moreover, each value of the sensing information corresponding to the at least one mutual-capacitive detection range is generated based on the signals of three sensors, such as a 2D dual-differential sensing information.

In the present invention, a 2D sensing information can be signal values, differences, or dual differences, and the sensing information of the mutual-capacitive detection range may be signal values, differences, or dual differences different from the 2D sensing information. Similarly, the first 1D sensing information and/or the second 1D sensing information used for detecting each touch-related sensor may be different from the sensing information of the mutual-capacitive detection range. One with ordinary skill in the art can, based on the previous descriptions, appreciate the conversions between the 2D sensing information, the sensing information of the mutual-capacitive detection range, the first 1D sensing information, and/or the second 1D sensing information.

For example, the first 1D sensing information and/or the second 1D sensing information can be composed of a plurality of signal values, and the sensing information of the mutual-capacitive detection range can be composed of a plurality of differences, and the mutual-capacitive detection range part in the 2D sensing information is composed of dual differences, while the rest are indicted by zero values.

In a preferred mode of the present invention, the first 1D sensing information and/or the second 1D sensing information are 1D differential sensing information, and the mutual-capacitive detection range part in the 2D sensing information is composed of dual differences, while the rest are indicted by zero values. The first 1D sensing information and/or the second 1D sensing information can be generated as shown in FIG. 6B. Since all the first sensors are driven simultaneously, interference of water stains or conductive impurities on the sensing device can be avoided. The mutual-capacitive detection range is determined under the circumstance that the interference of water stains or conductive impurities on the sensing device is reduced, so during mutual-capacitive detection, the range affected by the interference of water stains or conductive impurities on the sensing device is also reduced to as small as possible, minimizing the effect of the interference. If mutual-capacitive detection is simply performed on all intersections, then the interference of water stains or conductive impurities on the sensing device will encompass all places where there are water stains and conductive impurities.

The first 1D sensing information and the second 1D sensing information can be obtained through self-capacitive detection on the first sensors and the second sensors, respectively. When self-capacitive detection is carried out on the first sensors, the driving signal is simultaneously provided to these first sensors, and when self-capacitive detection is carried out on the second sensors, the driving signal is simultaneously provided to these second sensors. In this way, the interference of water stains or conductive impurities on the sensing device can also be reduced. However, compared to the approach shown in FIG. 6B, it requires more power, and requires driving twice, so it will take longer, too. Simply put, in the approaches shown in FIG. 6, the detections of the signals of the first sensors and the second sensors can be carried out at the same time. Of course, the detections of the signals of the first sensors and the second sensors can be carried out in turn, but this would take more time.

The operations of FIGS. 6A and 6B can be performed by the controller 160; relevant details have already been disclosed above and will not be further described. In addition, descriptions with respect to the driving and/or detection of these first sensors can equally be applied to the second sensors.

Figure 7A:
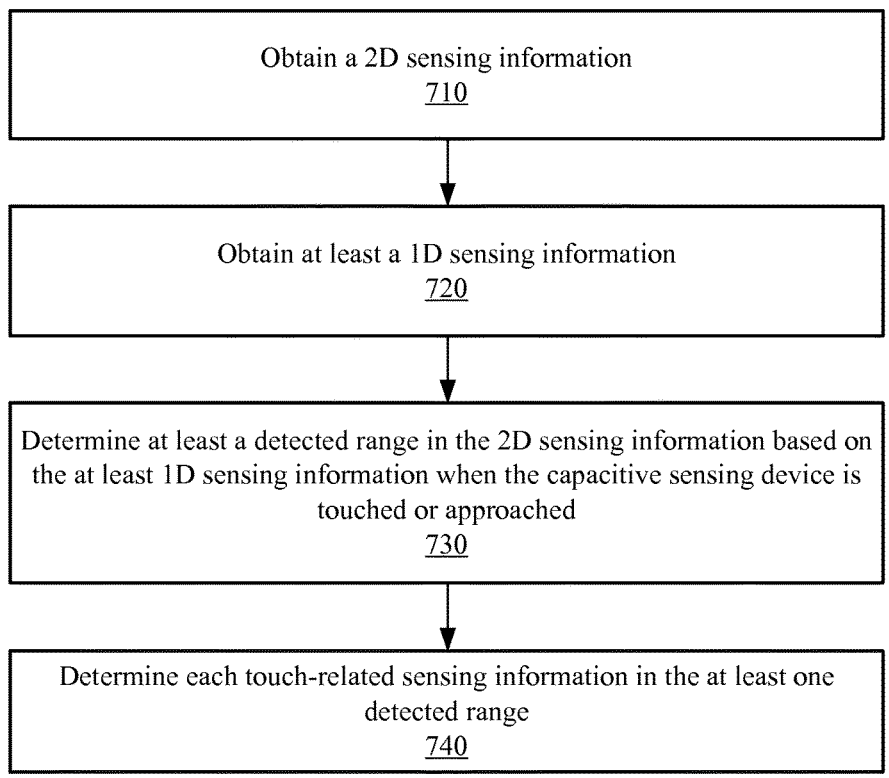
FIGS. 7A and 7B are flowcharts illustrating a method for analyzing 2D differential sensing information in accordance with a second embodiment of the present invention.

In a second embodiment of the present invention, a method for capacitive position detection is provided as shown in FIG. 7A. First, in step 710, a 2D sensing information is obtained. Next, in step 720, at least a 1D sensing information is obtained. Then, in step 730, when the capacitive sensing device is touched or approached, at least a detected range in the 2D sensing information is determined based on the at least 1D sensing information. Thereafter, in step 740, each touch-related sensing information is determined in the at least one detected range.

The plurality of 1D sensing information above can be obtained by a capacitive sensing device. The capacitive sensing device includes a plurality of sensors. These sensors include a plurality of first sensors and a plurality of second sensors, wherein the first and second sensors intersect at a plurality of intersections. Moreover, steps 710 and 720 above can be performed by the controller 160. In addition, steps 730 and 740 above can be performed by the controller 160 or the host 170.

In an example of the present invention, the 2D sensing information is obtained by mutual-capacitive detection, and 1D sensing information are derived from the 2D sensing information. For example, a second 1D sensing information is generated based on the sum of all the values of each first 1D sensing information, that is, each value of the second 1D sensing information is generated based on the sum or difference of all values of one of these first sensing information. Also, for example, each value of each first 1D sensing information is generated based on one, two or three of these sensors, so each value corresponds to a 1D position, and each value of the derived 1D sensing information is generated based on sum or difference of all values corresponding to the same 1D position in the 2D sensing information. In other words, the 1D sensing information corresponding to these first sensors and/or these second sensors can be obtained just by performing mutual-capacitive detection, which can be used to determine touch-related sensing information in the 1D sensing information, or further used to determine touch-related sensors.

In another example of the present invention, the 1D sensing information corresponding to these first sensors and/or the second sensors can be generated through self-capacitive detection. As shown in steps 610 to 630 above, all sensors on a first axis are driven by a driving signal, and the signals of all the sensors on the first axis are detected to generate 1D sensing information corresponding to all of the sensors on the first axis. Moreover, when all sensors on a first axis are driven by a driving signal, the signals of all the sensors on the second axis are also detected to generate 1D sensing information corresponding to all of the sensors on the second axis. Also, for example, the 1D sensing information corresponding to all the sensors on the first axis can be generated by performing self-capacitive detection on all the sensors on the first axis. Likewise, the 1D sensing information corresponding to all the sensors on the second axis can be generated by performing self-capacitive detection on all the sensors on the second axis.

The first and second axes can be one and the other of horizontal and vertical axes, respectively. The sensors on the first and the second axes can be one group or the other group of these first sensors and these second sensors.

Figure 7B:
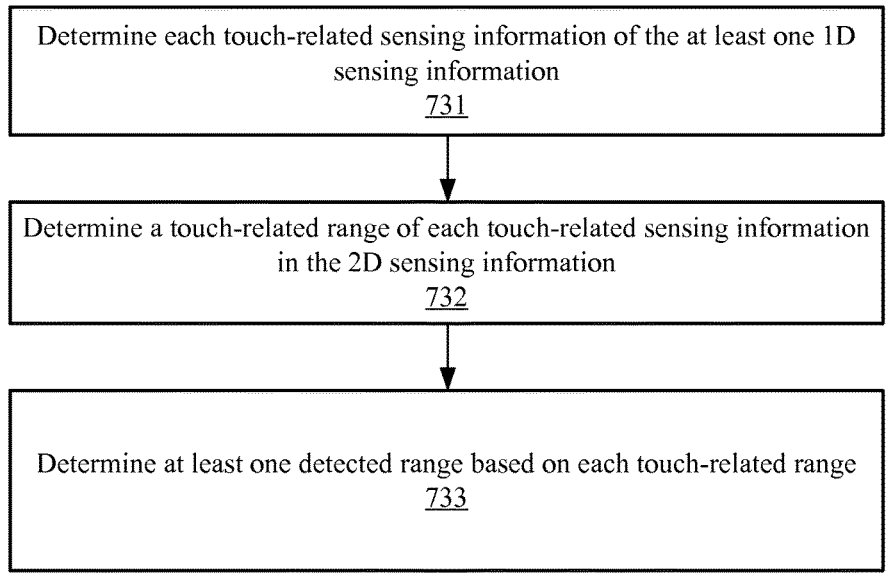

The determining of at least one detected range can be as shown in FIG. 7B. First, in step 731, each touch-related sensing information of the at least one 1D sensing information is determined. Next, in step 732, a touch-related range of each touch-related sensing information in the 2D sensing information is determined. Then, in step 733, at least one detected range is determined based on each touch-related range.

In addition, the at least one detected range can be the intersection or the union of all touch-related ranges. Furthermore, each value of the at least one 1D sensing information corresponds to a range on the 2D sensing information, and each touch-related range is the range corresponding to all the values of the corresponding touch-related sensing information.

In summary of the above, it can be seen that the signals of sensors can generate a plurality of continuous signal values. Congregating the differences between each signal and its preceding signal or between each signal and its following signal may produce a plurality of continuous differential signals or differences. Further, congregating the differences between each differential signal or value and its preceding differential signal or value or between each differential signal or value and its following differential signal or value may produce a plurality of continuous dual-differential signals or dual-differences.

In addition, congregation of the sum of each difference and all the preceding differences or the sum of each difference and all the following differences may be converted into a plurality of continuous signal values. Similarly, congregation of the sum of each dual-difference and all the preceding dual-differences or the sum of each dual-difference and all the following dual-differences may be converted into a plurality of continuous differences. Of course, converting a plurality of continuous dual-differences into a plurality of continuous differences and then converting them into a plurality of continuous signal values can be regarded as converting a plurality of continuous dual-differences into a plurality of continuous signal values.

In the process of converting dual-differences into differences, noise values hidden in each dual-difference will also be summed up, the latter the differences the more noise values are added, creating an incremental deviation. If signal values are converted from dual-differences, such an incremental deviation will be more noticeable.

A typical capacitive touch sensor has a plurality of conductive strips (sensors), including a plurality of first conductive strips arranged in parallel along a first axis and a plurality of second conductive strips arranged in parallel along a second axis. The first and second conductive strips intersect at a plurality of intersections. One of the first and second axes can be a horizontal axis corresponding to the abscissa, while the other of the first and second axes can be a vertical axis corresponding to the ordinate. Thus, each intersection corresponds to a two-dimensional coordinate.

In mutual capacitive detection, conductive strips arranged in parallel with one of the first and second axes are used as driving conductive strips, and conductive strips arranged in parallel with the other one of the first and second axes are used as sensing conductive strips. When each driving conductive strip is provided with a driving signal (AC signal), the sensing conductive strips provide capacitive coupling signals generated between them and the driving conductive strip. The capacitive coupling signals generates a plurality of signal values, a plurality of differences, or a plurality of dual-differences, forming a 1D (one-dimensional) sensing information corresponding to the driven conductive strip. Congregating and sequentially arranging the 1D sensing information corresponding to each driving conductive strip may constitute a 2D sensing information. The 2D sensing information can be regarded as an image, wherein each value in the 2D sensing information can be regarded as a pixel in the image.

When an external object (e.g. a finger) approaches or touches the capacitive touch sensor, a portion of the 1D sensing information generates sensing information including a plurality of non-zero values corresponding to the external object. In the 2D sensing information, sensing information corresponding to the same external object will cluster together, forming a group of sensing information corresponding to the same external object. In an example of the present invention, values with a certain zero-value range including zero are regarded as zero values.

Therefore, image segmentation is performed on the image (2D sensing information) having sensing information corresponding to external objects to distinguish each group of sensing information corresponding to the external objects. Common approaches of image segmentation include a watershed algorithm and an connected-component method. Once each group of sensing information corresponding to an external object is determined, a location representing each external object (or each approach or touch) can then be calculated.

In view of the traditional image segmentation approach that requires a large number of computations, the present invention provides a line piece segmentation method. The line piece segmentation method proposed by the present invention segments each 1D sensing information into continuous values (e.g. signal values, differences or dual-differences) corresponding to each external object, each group of continuous values is regarded as a line piece. Assuming that the 1D sensing information is along the first axis, line pieces corresponding to the same external object will overlap along the second axis in the image (2D sensing information). Therefore, line pieces corresponding to the same external object can be determined according to the overlapping relationship between line pieces, thereby distinguishing line pieces corresponding to each external object. For example, if the ratio of overlapping between a line piece and another line piece exceeds a threshold value, say 50%, then these line pieces are regarded as corresponding to the same external object. Alternatively, if the distance between the centroid location of a line piece and the centroid location of another line piece is less than a threshold value, these line pieces can be regarded as corresponding to the same external object. In an example of the present invention, calculation of the centroid location is performed from signal values. For example, when the 1D sensing information are differences or dual-differences, the centroid location of a line piece is determined by converting the range of the line piece into signal values, and then the centroid location thereof is calculated. As another example, extensions on either side of a line piece in the sensing information corresponding to the external object not belonging to any other line pieces are converted into signal values. Since the distance relationship between centroid locations is calculated from line pieces, it can be regarded as the overlapping relationship between the lines pieces.

In a third embodiment of the present invention, an image of signal values is segmented into line pieces based on a predefined condition. This predefined condition may specify a line piece as a plurality of continuous non-zero values, or one or a plurality of continuous values exceeding a threshold.

In a second embodiment of the present invention, a predefined condition is used for segmenting an image of differences into line pieces. The predefined condition may specify a line piece as a group of continuous positive values with an adjacent group of continuous negative values, wherein there is no zero values between the continuous positive values and the continuous negative values, or there can be at least one zero value. Furthermore, the predefined condition may specify a line piece as beginning with a value greater than a positive threshold and ending with a value smaller than a negative threshold.

In an example of the present invention, differences are indicated by continuous positive values with adjacent continuous negative values, and a line piece begins with a value greater than a positive threshold and ends with a value smaller than a negative threshold. Each line piece includes a zero crossing between adjacent positive and negative values. There can be at least one zero value or no zero value between the adjacent positive and negative values. When the area of touch or approach of an external object is large, there may be several zero values between the adjacent positive and negative values. A negative value adjacent a positive value in the present invention may be a negative value that is closest to the positive value. When the values in a line piece include positive values followed by negative values, the zero crossing in this line piece is situated between the preceding positive value and the following negative value. One with ordinary skill in the art can appreciate that when the image of differences is flipped, differences are indicated by continuous negative values with adjacent continuous positive values, and a line piece begins with a value smaller than a negative threshold and ends with a value greater than a positive threshold.

In a third embodiment of the present invention, a predefined condition is used to segment an image of dual-differences into line pieces. The sensing information corresponding to the same external object in the dual-differences may be a plurality of continuous values with negative values appearing first, then positive values, and finally negative values. Thus, the predefined condition may specify a line piece with a value greater than a positive threshold, or starting from a value greater than a positive threshold and extending to negative values preceding and following the positive value, or including all positive values in the sensing information corresponding to the same external object and extending forward and backward to negative values from the ends of these positive values, respectively. For example, the extension may be to include all preceding and following negative values in the sensing information corresponding to the same external object, or to extend forward to the smallest negative value and backward to the smallest negative value in the sensing information corresponding to the same external object.

One with ordinary skill in the art may appreciate that when the image of dual-differences described above is flipped, the sensing information corresponding to the same external object in the dual-differences may be a plurality of continuous values with positive values appearing first, then negative values, and finally positive values. Thus, the predefined condition may specify a line piece with a value smaller than a negative threshold, or starting from a value smaller than a negative threshold and extending to positive values preceding and following the negative value, or including all negative values in the sensing information corresponding to the same external object and extending forward and backward to positive values from the ends of these negative values, respectively. For example, the extension may be to include all preceding and following positive values in the sensing information corresponding to the same external object, or to extend forward to the largest positive value and backward to the largest positive value in the sensing information corresponding to the same external object.

In the descriptions above, line pieces having overlapping relationship in 1D sensing information arranged in parallel adjacent to each other belong to a group corresponding to the same external object. When external objects are in parallel with the driving conductive strips (i.e. when the external objects are arranged perpendicular to the sensing conductive strips), it is easy to distinguish between different groups. However, if external objects are in parallel with the sensing conductive strips (i.e. when the external objects are arranged perpendicular to the driving conductive strips), they may be mistaken as belong to the same group if they are too close to each other.

In order to address this issue, the present invention proposes group segmentation based on the mass values of the line pieces.

In other words, the present invention further includes calculating the mass of each line piece arranged in parallel with the driving conductive strips in a group to form a plurality of continuous mass values. In addition, line pieces are categorized into different groups based on a turning point in the mass values, wherein the turning point is when the mass value changes from decreasing to increasing. For example, a turning point is found when the current mass value is smaller than the preceding mass value and the following mass, and the line pieces before this turning point and the line pieces after the turning point are categorized into different groups, wherein the line piece at the turning point may belong to the same group as those before the turning point, or belong to the same group as those after the turning point.

In addition, an example of the present invention further includes determining whether the amount of decrease at the decreasing side of the turning point, the amount of increase at the increasing side of the turning point, or both the amount of increase and the amount of decrease is/are greater than a threshold. The turning point is used for segmenting only when the amount of increase and/or the amount of decrease are/is greater than the threshold. Thus, at least two masses at one side of a plurality of continuous masses corresponding to each external object are arranged in an increasing order, and at least two masses at the other side of a plurality of continuous masses corresponding to each external object are arranged in an decreasing order. There is at least one turning point between the side where at least two masses are in an increasing order and the other side where at least two masses are in a decreasing order. For example, there exists a turning point with values changing from increasing to decreasing, or three turning points including a first turning point with values changing from increasing to decreasing, a first turning point with values changing from decreasing to increasing, and a second turning point with values changing from increasing to decreasing, wherein for the first turning point with values changing from decreasing to increasing, the amount of decrease at the decreasing side of this turning point, the amount of increase at the increasing side of this turning point, or both the amount of increase and the amount of decrease is/are not greater than the threshold, so no segmentation is done. One with ordinary skill in the art can appreciate other numbers of turning points (e.g. 5, 7, etc); they will not be further described.

The determining of a turning point with values changing from decreasing to increase may include first identifying the turning point then determining whether the amount of decrease at the decreasing side of the turning point, the amount of increase at the increasing side of the turning point, or both the amount of increase and the amount of decrease is/are greater than a threshold. Alternatively, two or more continuous masses with an amount of increase greater than a threshold can be first determined, and then the turning point with values changing from decreasing to increase is identified. Although in the descriptions of the present invention, positive values are used for illustration, but signal inversion is a common knowledge of this art. One with ordinary skill in the art can appreciate the corresponding determination and relationships after signal inversion based on the descriptions of the present invention, and thus they will not be further illustrated.

In the descriptions above, mass can be calculated from the signal values of the line pieces. For example, the line pieces of differential or dual-differences are converted into signal values before calculating the mass values. In addition, mass can be calculated from the absolute value of all the values within the line pieces.

Furthermore, mass can be calculated from a range including the line piece. The range including the line piece can be just the line piece itself or the line piece as well as adjacent non-zero values, for example. The range including the line piece does not include any other line pieces apart from the line piece itself.

Based on the above, the present invention proposes a method for image segmentation. First, an image is obtained, which includes a 2D sensing information consists of a plurality of 1D sensing information, and each 1D sensing information is arranged in parallel with a first axis, and each 1D sensing information represents a plurality of values arranged in parallel with a second axis. For example, a 1D sensing information is generated by the signals of the second conductive strips mentioned above. Thus, the image can be obtained by mutual-capacitive detection, and when at least one adjacent first conductive strip in a plurality of first conductive strips arranged along the first axis is provided with a driving signal, the plurality of values arranged in parallel with the second axis are generated based on the plurality of second conductive strips arranged along the second axis. In an example of the present invention, the first and second axes are perpendicular to each other. One with ordinary skill in the art can appreciate that the first and the second axes can cross each other at a different angle greater than 0.

Next, each line piece corresponding to touch or proximity of an external conductive object in each 1D sensing information is determined, wherein the values of each line piece change according to the touch or proximity of at least one external conductive object. Then, image segmentation is performed based on overlapping relationships between adjacent line pieces to obtain each group corresponding to the touch or proximity of at least one external conductive object.

In an example of the present invention, the overlapping relationships include: each line piece in the same group and at least one other line piece in the same group are in the adjacent 1D sensing information, and the ratio of overlapping or the number of values that are overlapped by the line piece and the at least one other line piece in the same group exceeds a threshold. In another example of the present invention, the method further includes determining the centroid location of a line piece, and the overlapping relationships include: each line piece in the same group and at least one other line piece in the same group are in the adjacent 1D sensing information, and the distance between the centroid location and the centroid location of at least one other line piece corresponding to the same external conductive object is within a threshold. In an example of the present invention, a centroid location is calculated by dividing the sum of the product of each value in a line piece multiplied by the corresponding coordinates of each value with the sum of all values.

Each line piece is selected from one of the following groups: all the values in each line piece are greater than a positive threshold and in a first increasing then decreasing order; and all the values in each line piece are less than a negative threshold and in a first decreasing then increasing order.

The 1D sensing information can be composed of differences or dual differences. In other words, each value can be generated based on two or three adjacent second conductive strips. When at least one external conductive object touches or draws near the touch sensor, the 1D sensing information composed of differences or dual differences will have changes at corresponding line pieces, wherein there is at least one zero crossing. Thus, corresponding to the touch or proximity of a single external conductive object and when each value is a difference, each line piece is a combination of a set of at least one positive value and an adjacent set of at least one negative value, for example, a combination or a set of at least one positive value or continuous positive values and an adjacent set of at least one negative value or continuous negative values. In addition, in an example of the present invention, at least one positive value in the continuous positive values is greater than a positive threshold, and at least one negative value in the continuous negative values is less than a negative threshold.

For example, each line piece includes only one zero crossing, which is between continuously arranged at least one positive value and continuously arranged at least one negative value, and there is no other value or only at least one zero value between the continuously arranged at least one positive value and the continuously arranged at least one negative value, wherein when the number of the continuously arranged at least one positive value is greater than 3, their values are in a first increasing then decreasing order; and when the number of the continuously arranged at least one negative value is greater than 3, their values are in a first decreasing then increasing order.

The above image is obtained by mutual-capacitive detection, and when at least one adjacent first conductive strip in a plurality of first conductive strips arranged along the first axis is provided with a driving signal, each 1D sensing information is generated based on the plurality of second conductive strips arranged along the second axis.

Each value above is generated based on two adjacent second conductive strips, and each line piece is a combination of a set of at least one positive value or continuous positive values and an adjacent set of at least one negative value or continuous negative values, wherein at least one positive value in the continuous positive values is greater than a positive threshold, and at least one negative value in the continuous negative values is greater than a negative threshold.

Alternatively, each value above is generated based on three adjacent second conductive strips, and each line piece is a combination of continuous adjacent at least one negative value, at least one positive value, and at least one negative value, respectively, or continuous adjacent at least one positive value, at least one negative value, and at least one positive value, respectively.

In the above combination of continuous adjacent at least one negative value, at least one positive value, and at least one negative value, at least one positive value in the at least one positive value is greater than a positive threshold, and in the continuous adjacent at least one positive value, at least one negative value, and at least one positive value, at least one negative value in the at least one negative value is greater than a negative threshold.

The above determining each line piece corresponding to touch or proximity of an external conductive object in each 1D sensing information includes extending forward and backward from a value greater than a positive threshold to at least one negative value, or extending forward and backward from a value less than a negative threshold to at least one positive value.

It has already been noted before that sensing information corresponding to the same external conductive object in dual differences can be a plurality of continuous values with a negative value appearing first, then a positive value and finally a negative value. Therefore, a predefined condition may specify a value is to be greater than a positive threshold, or a value greater than a positive threshold and extending forward and backward to at least one negative value, or all positive values in the sensing information corresponding to the same external conductive object extending forward and backward to at least one negative value. For example, in sensing information corresponding to the same external conductive object, extending forward and backward to continuous all negative values, or in sensing information corresponding to the same external conductive object, extending forward to the smallest negative value and extending backward to the smallest negative value.

One with ordinary skill in the art can appreciate that after the above dual-differential image is flipped, the sensing information in the dual differences corresponding to the same external conductive object can be a plurality of continuous values with a positive value appearing first, then a negative value and finally a positive value. Therefore, a predefined condition may specify a value is to be less than a negative threshold, or a value less than a positive threshold and extending forward and backward to at least one positive value, or all negative values in the sensing information corresponding to the same external conductive object extending forward and backward to at least one positive value. For example, in sensing information corresponding to the same external conductive object, extending forward and backward to continuous all positive values, or in sensing information corresponding to the same external conductive object, extending forward to the largest positive value and extending backward to the largest positive value.

For example, each line piece includes only two zero crossings, which are located between continuously arranged at least one positive value and continuously arranged at least one negative value, and there is no other value or only at least one zero value between the continuously arranged at least one positive value and the continuously arranged at least one negative value, wherein when the number of the continuously arranged at least one positive value is greater than 3, their values are in a first increasing then decreasing order; and when the number of the continuously arranged at least one negative value is greater than 3, their values are in a first decreasing then increasing order.

According to the above, the present invention provides a device for image segmentation, which includes: a touch screen including: a plurality of first conductive strips arranged in a first axis, and a plurality of second conductive strips arranged in a second axis, wherein the first conductive strips and the second conductive strips intersect at a plurality of intersections; a detecting circuit for obtaining an image that includes a 2D sensing information composed of a plurality of 1D sensing information, each 1D sensing information being arranged in parallel to the first axis, and each 1D sensing information representing a plurality of values arranged in parallel to the second axis; and a processor for determining each line piece corresponding to touch or proximity of an external conductive object in each 1D sensing information, wherein the values of each time piece change according to the touch or proximity of at least one external conductive object; and for performing image segmentation based on overlapping relationships between adjacent line pieces in said line pieces to obtain each group corresponding to the touch or proximity of at least one external conductive object, wherein each line piece in the same group and at least one other line piece in the same group are in the adjacent 1D sensing information, and the ratio of overlapping or the number of values that are overlapped by the line piece and the at least one other line piece in the same group exceeds a threshold, or the distance between the centroid locations of the line pieces is within a threshold.

In summary of the above, when the 1D sensing information is composed of differences or dual differences, each line piece is an alternating combination of a set of at least one positive value or continuous positive values and a set of at least one negative value or continuous negative values. In addition, 1D sensing information can also be the original signal values. For example, each line piece is selected from one of the following groups: all the values in each line piece are greater than a positive threshold and in a first increasing then decreasing order; and all the values in each line piece are less than a negative threshold and in a first decreasing then increasing order. According to the above, the present invention provides a method for image segmentation. First, an image is obtained, and each line piece corresponding to touch or proximity of an external conductive object in each 1D sensing information is determined, wherein the values of each line piece change according to the touch or proximity of at least one external conductive object.

Next, the image is segmented into groups, each group corresponding to the touch or proximity of at least one external conductive object, and including a plurality of line pieces in a plurality of 1D sensing information continuously arranged in parallel, wherein each line piece has a plurality of values continuously arranged in parallel. In other words, each group spans across a plurality of 1D sensing information, and each line piece is in one of the plurality of continuous 1D sensing information.

Then, the mass of each line piece of at least one group is calculated, wherein the masses in the same group are continuously arranged in the second axis, wherein the mass of each line piece is calculated based on the plurality of values of each line piece.

Thereafter, line pieces corresponding to the touch or proximity of each external conductive object are determined based on the calculated masses of each group, wherein the masses corresponding to the same external conductive object are arranged continuously, at least two masses at one side of the plurality of masses corresponding to each external conductive object are arranged in an increasing order, and at least two masses at the other side of the plurality of masses corresponding to each external conductive object are arranged in an decreasing order. Corresponding to different external objects, there are peaks corresponding to individual objects in the plurality of masses. In contrast to peaks, the lowest value between two peaks is a valley. Thus, valleys can be used to segment masses corresponding to different external objects, and in turn obtain line pieces corresponding to masses that correspond to different external objects. Since the values of the line piece corresponding to the valley may include signals belonging to two different external objects, thus in an example of the present invention, the line piece that corresponds to a valley may belong to different external objects at the same time. In contrast, in another example of the present invention, the line piece that corresponds to a valley belongs to only one external object. Regardless of whether the line piece that corresponds to a valley belongs to one or two external objects, in a best mode of the present invention, the plurality of masses corresponding to each external conductive object are in a first increasing then decreasing order. In other words, except for touches at the boundary of the touch screen, if the masses corresponding to an external conductive object only appear in an increasing or decreasing order, then misjudgment of the location of the external object may occur.

In steps above, each group corresponding to the touch or proximity of at least one external conductive object can be obtained, including: determining each line piece corresponding to touch or proximity of an external conductive object in each 1D sensing information, wherein the values of each line piece change according to the touch or proximity of at least one external conductive object; and performing image segmentation based on overlapping relationships between adjacent line pieces in said line pieces to obtain each group corresponding to the touch or proximity of at least one external conductive object, wherein each line piece in the same group and at least one other line piece in the same group are in adjacent 1D sensing information, and the ratio of overlapping or the number of values that are overlapped by the line piece and the at least one other line piece in the same group exceeds a threshold, or the distance between the centroid locations of the line pieces is within a threshold. Moreover, each group corresponding to the touch or proximity of at least one external conductive object can be obtained by methods such as watershed algorithm, connected-component method, or regional growth method; the present invention is not limited as such. Other details of the present invention have already been disclosed hereinabove, and will not be further illustrated.

Each line piece above is selected from one of the following groups: all the values in each line piece are greater than a positive threshold and in a first increasing then decreasing order; and all the values in each line piece are less than a negative threshold and in a first decreasing then increasing order.

Each line piece includes only one zero crossing, which is between continuously arranged at least one positive value and continuously arranged at least one negative value, and there is no other value or only at least one zero value between the continuously arranged at least one positive value and the continuously arranged at least one negative value, wherein when the number of the continuously arranged at least one positive value is greater than 3, their values are in a first increasing then decreasing order; and when the number of the continuously arranged at least one negative value is greater than 3, their values are in a first decreasing then increasing order.

Alternatively, each line piece includes only two zero crossings, which are located between continuously arranged at least one positive value and continuously arranged at least one negative value, and there is no other value or only at least one zero value between the continuously arranged at least one positive value and the continuously arranged at least one negative value, wherein when the number of the continuously arranged at least one positive value is greater than 3, their values are in a first increasing then decreasing order; and when the number of the continuously arranged at least one negative value is greater than 3, their values are in a first decreasing then increasing order.

In the present invention, the line pieces may be determined when each 1D sensing information is obtained, and the number of line pieces in each calculated group is greater than a threshold. For example, the line pieces are determined before the next 1D sensing information is obtained. In other words, the determining of the line pieces is performed during the process of obtaining the complete image. Therefore, in an example of the present invention, only the location and value of each line piece are recorded, values outside the line pieces are ignored or set to a predetermined value (e.g. a zero value). As such, storage space or the amounts of data transmission and processing can be saved. Similarly, the overlapping relationships between line pieces can be looked at while segmenting into groups, thereby saving time. One with ordinary skill in the art that the determining of the line pieces can be performed after the complete image is obtained.

The above image is obtained by mutual-capacitive detection, and when at least one adjacent first conductive strip in a plurality of first conductive strips arranged along the first axis is provided with a driving signal, each 1D sensing information is generated based on the plurality of second conductive strips arranged along the second axis.

Each value above is generated based on two adjacent second conductive strips, and each line piece is a combination of a set of at least one positive value or continuous positive values and an adjacent set of at least one negative value or continuous negative values, wherein at least one positive value in the continuous positive values is greater than a positive threshold, and at least one negative value in the continuous negative values is greater than a negative threshold.

Alternatively, each value above is generated based on three adjacent second conductive strips, and each line piece is a combination of continuous adjacent at least one negative value, at least one positive value, and at least one negative value, respectively, or continuous adjacent at least one positive value, at least one negative value, and at least one positive value, respectively.

In the above combination of continuous adjacent at least one negative value, at least one positive value, and at least one negative value, at least one positive value in the at least one positive value is greater than a positive threshold, and in the continuous adjacent at least one positive value, at least one negative value, and at least one positive value, at least one negative value in the at least one negative value is greater than a negative threshold.

The above determining each line piece corresponding to touch or proximity of an external conductive object in each 1D sensing information includes extending forward and backward from a value greater than a positive threshold to at least one negative value, or extending forward and backward from a value less than a negative threshold to at least one positive value.

According to the above, the present invention provides a device for image segmentation, which includes: a touch screen including: a plurality of first conductive strips arranged in a first axis, and a plurality of second conductive strips arranged in a second axis, wherein the first conductive strips and the second conductive strips intersect at a plurality of intersections; a detecting circuit for obtaining an image that includes a 2D sensing information composed of a plurality of 1D sensing information, each 1D sensing information being arranged in parallel to the first axis, and each 1D sensing information representing a plurality of values arranged in parallel to the second axis; and a processor for segmenting the image into groups corresponding to touch or proximity of at least one external object, each group including a plurality of line pieces in a plurality of 1D sensing information continuously arranged in parallel, wherein each line piece has a plurality of values continuously arranged in parallel; calculating the mass of each line piece of at least one group, wherein the masses in the same group are continuously arranged in the second axis, wherein the mass of each line piece is calculated based on the plurality of values of each line piece; and determining line pieces corresponding to the touch or proximity of each external conductive object based on the calculated masses of each group, wherein the masses corresponding to the same external conductive object are arranged continuously, at least two masses at one side of the plurality of masses corresponding to each external conductive object are arranged in an increasing order, and at least two masses at the other side of the plurality of masses corresponding to each external conductive object are arranged in an decreasing order.

Even if no external conductive object approaches or touches a touch screen, the obtained 1D sensing information still includes the values of the initial signals which are not zero due to the property of the electronic component. In addition, because different environments will interfere with the touch screen, the 1D sensing information further includes the noises from the environments such that the initial signals will change with the environments.

Figure 8A:
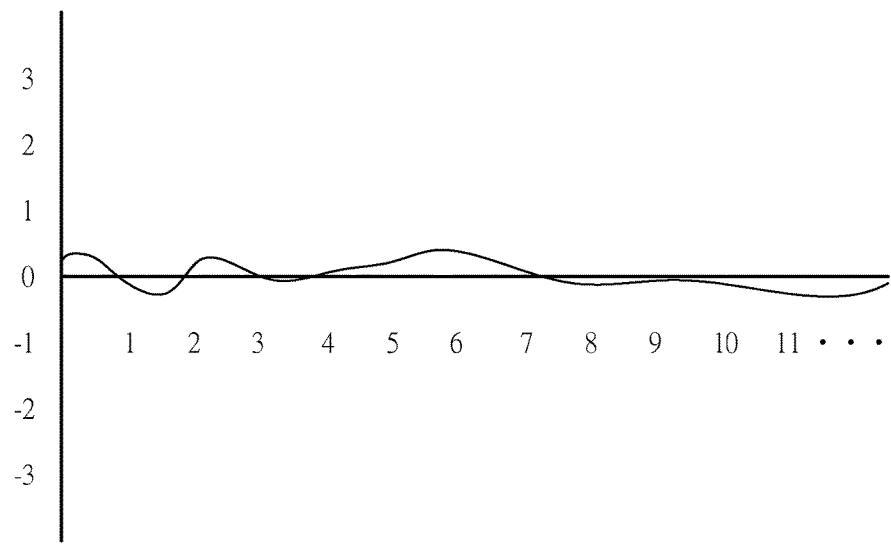
FIGS. 8A to 8E are sensing diagrams illustrating that no external conductive object approaches or touches a touch screen in accordance with a third embodiment of the present invention.

Please refer to FIG. 8A, which depicts a sensing diagram that no external conductive object approaches or touches a touch screen according to an embodiment of the present invention. At first, if the touch screen is not interfered by the environment, the property of the electronic component can only be considered. When no external conductive object approaches or touches the touch screen, the obtained 1D sensing information would includes the initial signals which are non-zero values. The horizontal axis of FIG. 8A represents the coordinate of each sensing place in a 1D sensing information, and the vertical axis of FIG. 8A represents the initial signal at each sensing place in the 1D sensing information. Obviously, not all initial signals at the sensing places are zero values, wherein the initial signals at the sensing places are interfered by the property of the electronic component so as to include different non-zero values.

Figure 8B:
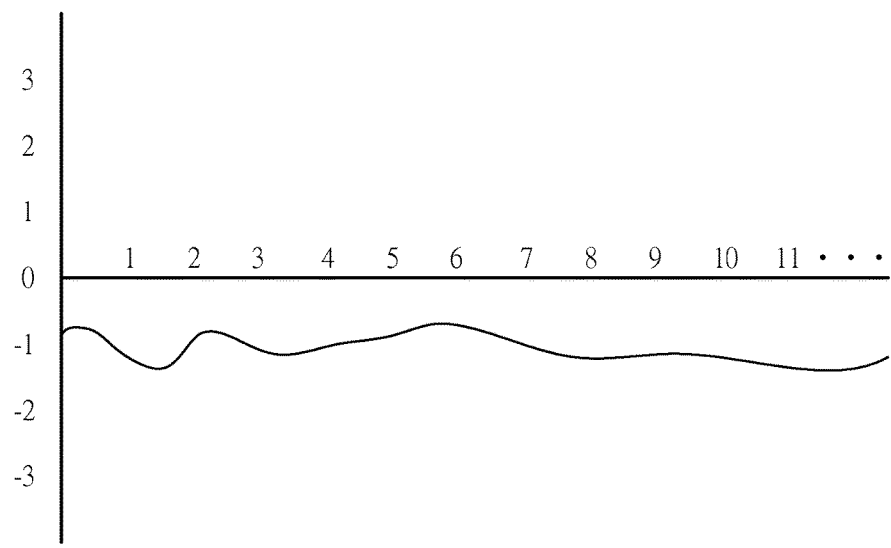

Please refer to 8B, which depicts a sensing diagram that no external conductive object approaches or touches a touch screen in a first environment according to an embodiment of the present invention. When the touch screen is in a first environment, and no external conductive object approaches or touches the touch screen, the fore-mentioned initial signals of the obtained 1D sensing information will change due to the first environment. As shown in FIG. 8B, the initial signal at each sensing place is interfered by the first environment so as to shift to negative direction. If an external conductive object approaches or touches the touch screen in the meanwhile, the value of the peak corresponding to the touch location could be offset by the negative shift such that the touch could not be determined correctly.

Figure 8C:
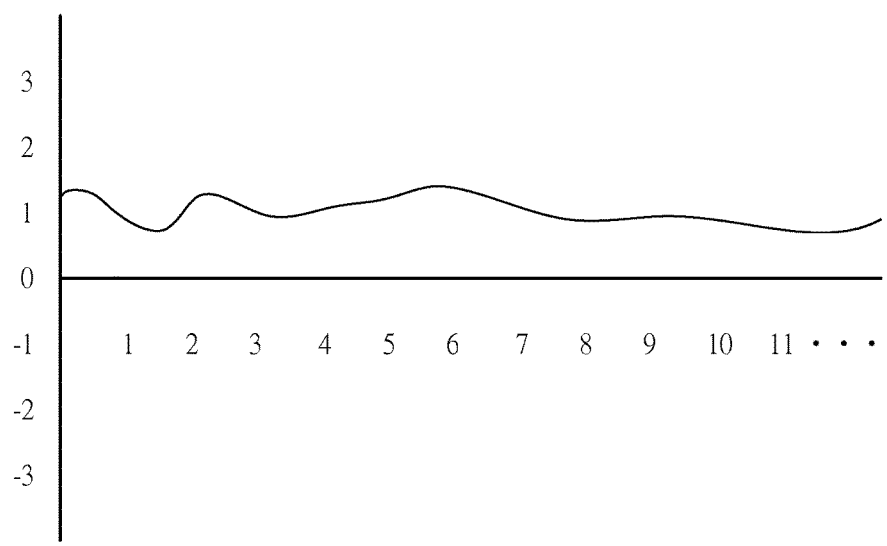

Please refer to 8C, which depicts a sensing diagram that no external conductive object approaches or touches a touch screen in a second environment according to an embodiment of the present invention. When the touch screen is in the second environment, and no external conductive object approaches or touches the touch screen, the fore-mentioned initial signals of the obtained 1D sensing information will change due to the second environment. As shown in FIG. 8C, the initial signal at each sensing place is interfered by the second environment so as to shift to positive direction. Obviously, even if no external conductive object approaches or touches the touch screen, the values at many sensing places still exceeds a touch threshold such that many touch events are misjudged. Thus, if the 1D sensing information which is obtained in the first environment or the second environment is determined based on the fore-mentioned steps, it is possible that the initial signals including too high or too low values cause the misjudgment.

Figure 8D:
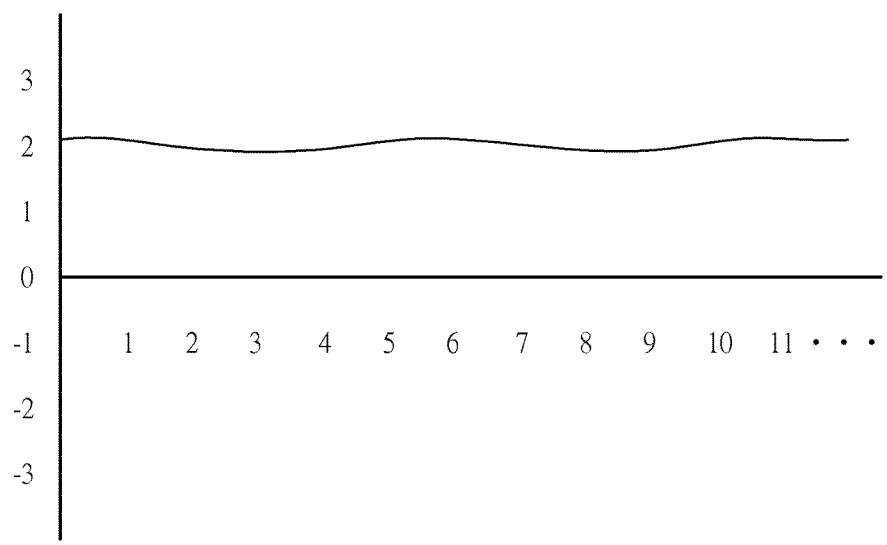
Figure 8E:
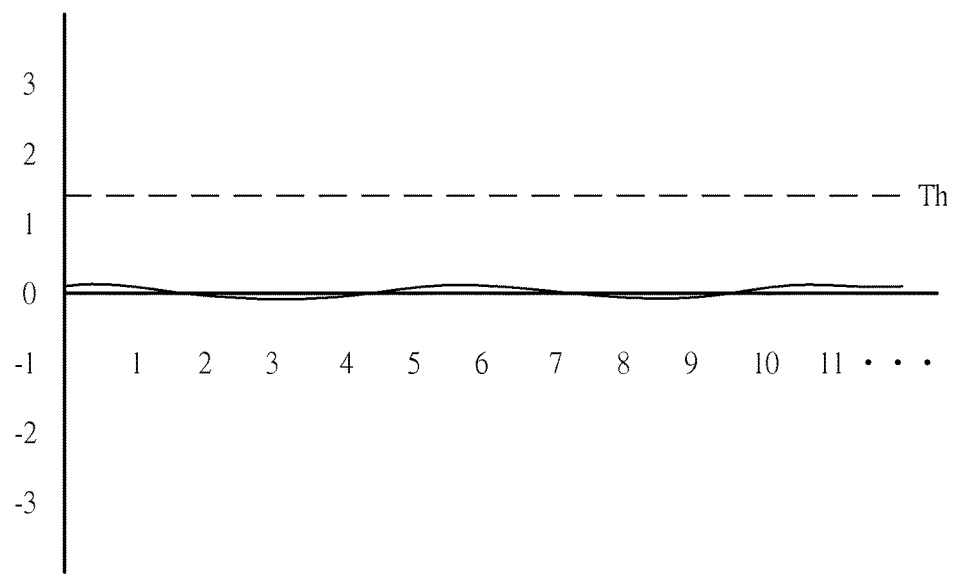

For avoiding the misjudgment, the noises from the property of the electronic component and the change of the environments must be removed from the signal at each sensing place in the 1D sensing information, which is obtained after the environments change, so as to obtain a correct touch related sensing information. At first, a 1D sensing information, which is obtained in the first environment when no external conductive object approaches or touches a touch screen (as shown in FIG. 8B), is defined as a base sensing information, wherein the value at each sensing place is defined as a first value. Then, when the touch screen is in a second environment and no external conductive object approaches or touches the touch screen, the value at each sensing place is defined as a second value, as shown in FIG. 8C. Then, at each sensing place, the first value is removed from the second value so as to obtain the shift value at each sensing place caused by the change between environments, wherein the shift values are defined as a plurality of first variations. Please refer to FIG. 8D, which depicts a sensing diagram that no external conductive object approaches or touches a touch screen in the change between environments according to an embodiment of the present invention. In the embodiment, all first variations are positive. In other words, the value of the signal at each sensing place shifts to the positive direction when the touch screen is moved from the first environment to the second environment. For normalizing the obtained 1D sensing information, the fore-mentioned first variations are averaged to obtain an average variation, and then the average variation is removed from the first variation at each sensing place to respectively obtain the second variation at each sensing place. Please refer to FIG. 8E, which depicts a sensing diagram of the second values when no external conductive object approaches or touches a touch screen. As shown in FIG. 8E, the second variation at each sensing place shifts to the value near the vertical axis (zero value). Thus, as shown in FIG. 8E, no external conductive object approaches or touches the touch screen.

Figure 8F:
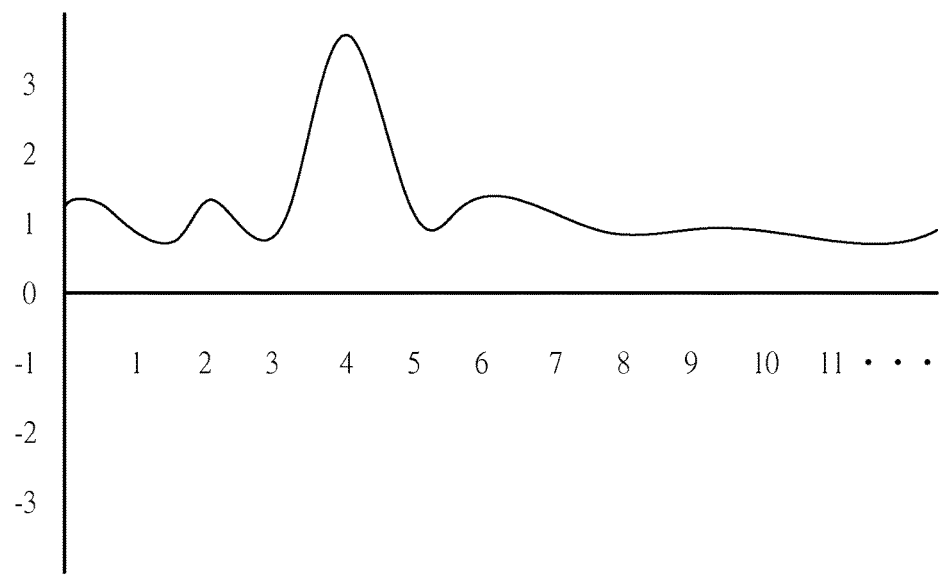
FIGS. 8F to 8J are sensing diagrams illustrating that an external conductive object approaches or touches a touch screen in accordance with a third embodiment of the present invention.
Figure 8G:
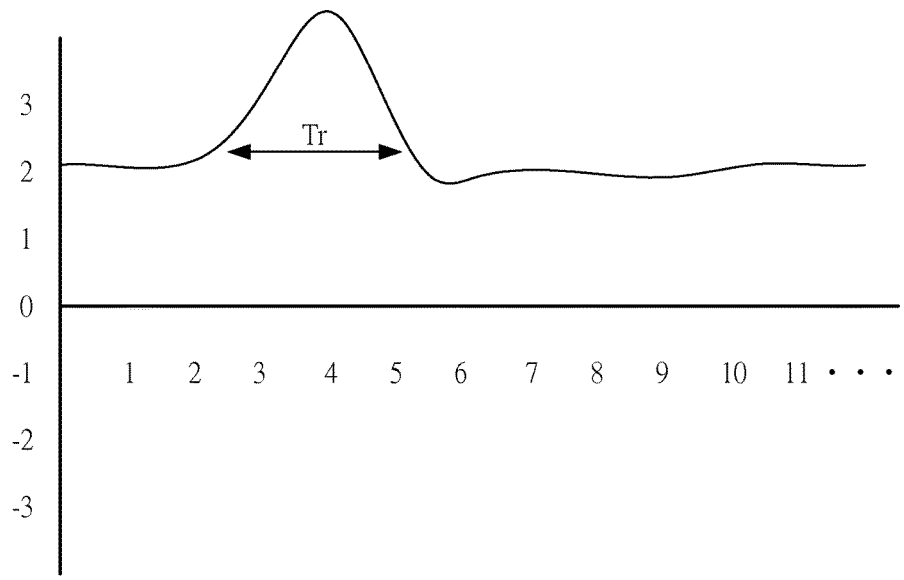

Please refer to 8F, which depicts a sensing diagram of the values of the signals that an external conductive object approaches or touches a touch screen in a second environment according to an embodiment of the present invention. At first, as shown in FIG. 8F, when an external conductive object approaches or touches a touch screen in a second environment, the value at each sensing place (for example, signal values) is defined as a second values. Then, as shown in FIG. 8G, the first value is removed from the second value at each sensing place to obtain the first variation at each sensing place because the second values not only includes the first variations caused by the change between environments but also the value of the peak corresponding to the touch. Thus, after the first values are removed from the second values, the average variation is still removed from the second values to normalize the touch related sensing information. Please refer to FIG. 8H, which depicts a sensing diagram of the second variations when at least one external conductive object approaches or touches a touch screen.

Figure 8H:
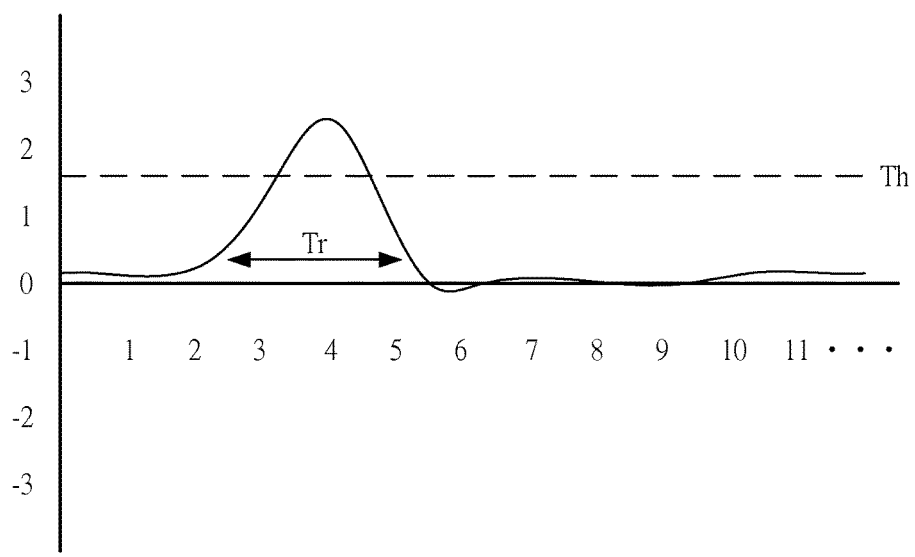

Further, after obtaining the fore-mentioned second variations, it can be determined by a threshold whether there is at least one line piece generated by the proximity or touch of at least one external conductive object. When at least one second variation exceeds the threshold, the touch sensing information represents that at least one external conductive object approaches or touches the touch screen, and thus the range of the line piece could be determined by the above-mentioned line piece segmentation method. At first, the threshold Th is set. As shown in FIG. 8E, all second variations are lower than the threshold Th, and thus it can be determined that no external conductive object approaches or touches the touch screen accordingly. However, as shown in FIG. 8H, at least one second variation exceeds the threshold Th, and thus it can be determined that the touch range Tr is the above-mentioned line piece.

Figure 8I:
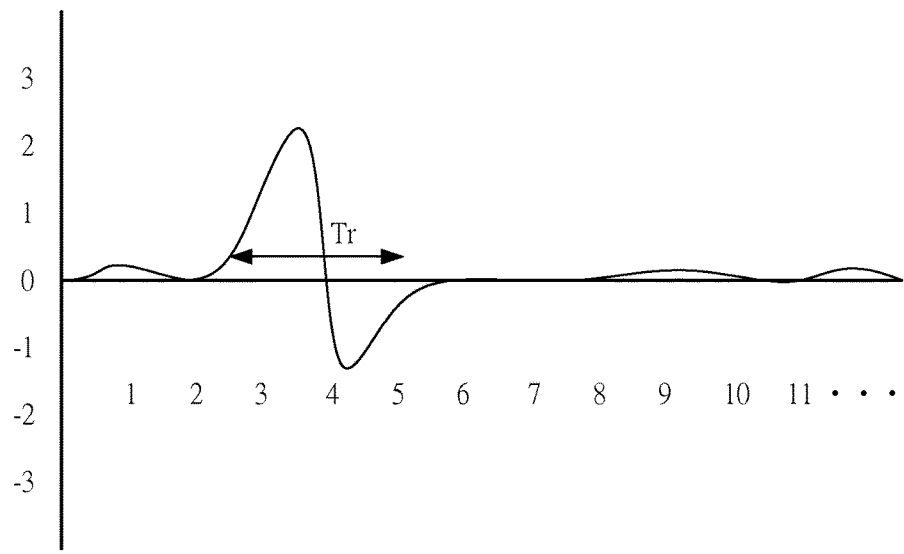
Figure 8J:
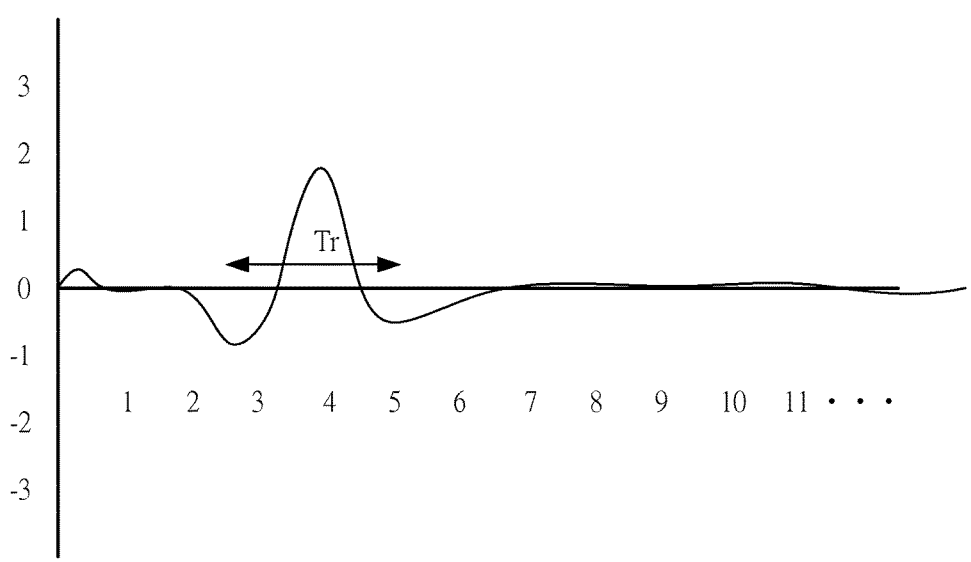

When obtained touch related sensing information consists of signal differences or signal dual differences, all variations also could be obtained based on the above-mentioned method so as to determine whether there is at least one line piece caused by the proximity or touch of at least one external conductive object. Please refer to FIG. 8I and FIG. 8J, which depicts the sensing diagrams of the signal differences and the signal dual differences when an external conductive object approaches or touches a touch screen.

Accordingly, the invention discloses a touch sensing method for avoiding the foregoing misjudgment. Please refer to FIG. 9A, at first, in step 910, a 1D sensing information are continuously obtained, wherein the 1D sensing information comprises a plurality of values.

Then, a base sensing information is determined, wherein the base sensing information is determined based on the 1D sensing information when the 1D sensing information represents no proximity or touch of any external conductive object. First, in step 920, the base sensing information is determined based on whether there is the proximity or touch of any external conductive object. When the touch system determines no proximity or touch of any external conductive object, in step 930, the obtained 1D sensing information is defined as a first 1D sensing information (or a base sensing information), and the values included in the first 1D sensing information are defined as first values. When the touch system determines the proximity or touch of at least one external conductive object, in step 940, the obtained 1D sensing information is defined as a second 1D sensing information, and the values included in the second 1D sensing information are defined as the second values. The locations of the first values corresponds to the locations of the second values respectively Then, in step 950, a plurality of first variations are determined based on differences between the first values and the corresponding second values at the same locations in the 1D sensing information. According to the best embodiment of the invention, each first value is removed from each corresponding second value at the same location in the 1D sensing information so as to generate a plurality of first variations. Next, in step 960, a first average variation is obtained based on part or all of the first variations, wherein the first average variation is the average of all of the first variations when no external conductive object approaches or touches the touch screen, and the first average variation is the average of part of the first variations except the foregoing touch range Tr when at least one external conductive object approaches or touches the touch screen. In step 962, a plurality of second variations are determined based on differences between the first variations and the first average variation.

In addition, according to another embodiment of the invention, the touch sensing method further comprises the following steps: a second average variation based on part or all of the second variations, wherein the second average variation is the average of all of the first variations when no external conductive object approaches or touches the touch screen, and the second average variation is the average of part of the second variations except the foregoing touch range Tr when at least one external conductive object approaches or touches the touch screen. A plurality of third variations are determined based on differences between the second variations and the second average variation. The influence due to the environmental variation could be decreased more by obtaining the average variation based on the variation more than once and then removing the average variation from the variation.

In step 970, after obtaining the second variation, whether there is the proximity or touch of at least one external conductive object can be determined based on the comparison between the second variations and a threshold. If at least one second variation exceeds a threshold, it is determined that at least one external conductive object approaches or touches the touch screen, in step 980. Then, in step 982, the range of at least one line piece corresponding to the proximity or touch of at least one external conductive object could be determined by the line piece segmentation method. If no second variation exceeds the threshold, no touch event is determined, in step 990.

Figure 9A:
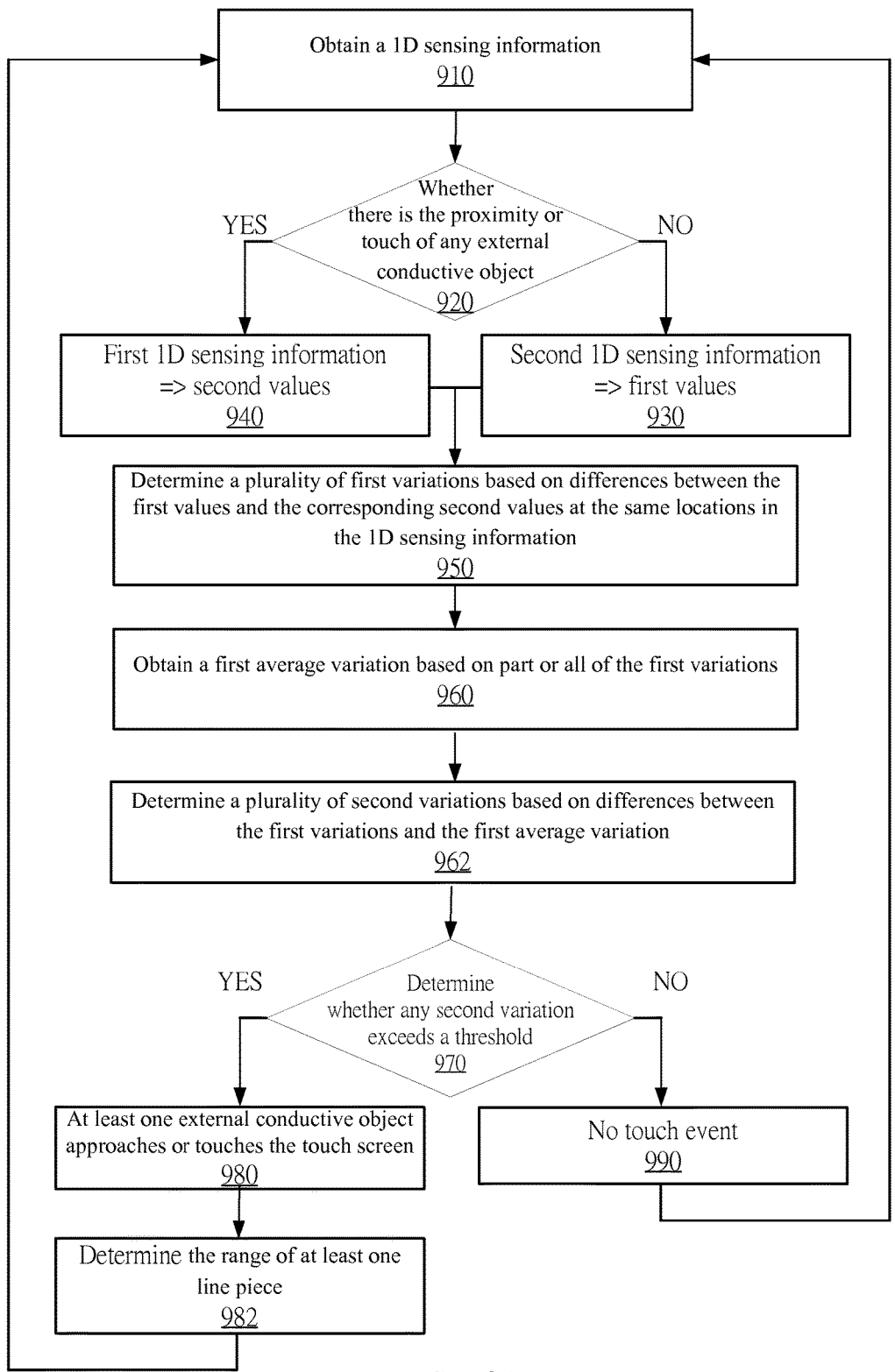
FIGS. 9A and 9B are flowchart diagrams of the touch sensing method in accordance with a fourth embodiment of the present invention.
Figure 9B:
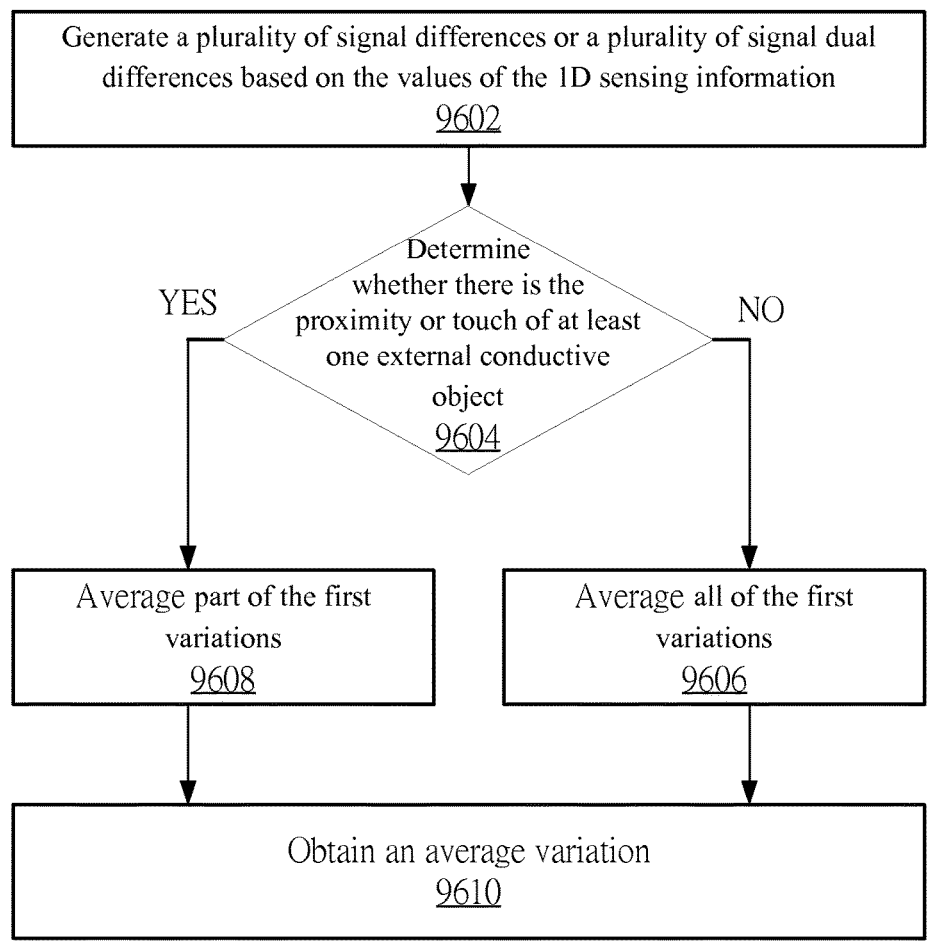

According to the foregoing position analysis, the proximity or touch of the external conductive object could be determined based on signal values, signal differences or signal dual differences. Thus, if the values included in the 1D sensing information are signal values, the step 920 of the touch sensing method of the invention further comprises the following steps, as shown in FIG. 9B. If the values included in the 1D sensing information are signal values, a plurality of signal differences or a plurality of signal dual differences are generated based on the values, in step 9602. Next, in step 9604, whether there is the proximity or touch of at least one external conductive object could be determined based on the signal differences or the signal dual differences. If no external conductive object approaches or touches the touch screen, all first variations are averaged, in step 9606. Then, the average variation is determined based on all first variations, in step 9610. On the contrary, part of the first variations representing no proximity or touch of any external conductive object are averaged, in step 9608. Finally, an average variation is obtained based on the part of the first variations, in step 9610.

Similarly, if the values included in the 1D sensing information are signal differences, whether there is the proximity or touch of at least one external conductive object could be determined based on the values or the signal dual differences from the values. When the second values represents that at least one external conductive object approaches or touches the touch screen, the second values representing the proximity or touch of at least one external conductive object are determined, and the average variation is obtained based on the part of the second values except the second values representing the proximity or touch of at least one external conductive object. When the second values represents no proximity or touch of any external conductive object, the average variation is determined based on all second values.

Figure 10A:
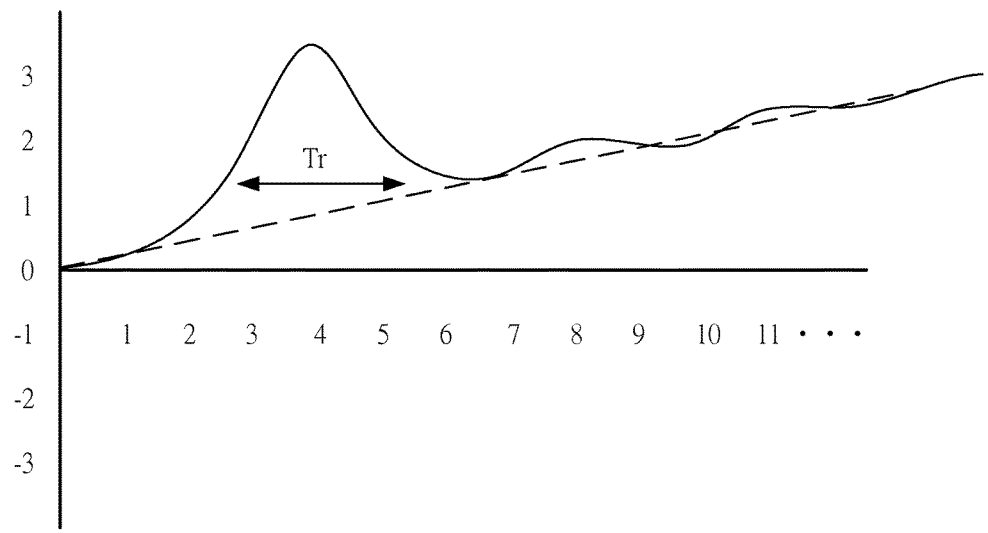
FIG. 10A is a sensing diagram that the signal differences are transformed into the signal values in accordance with a fifth embodiment of the present invention.
Figure 10B:
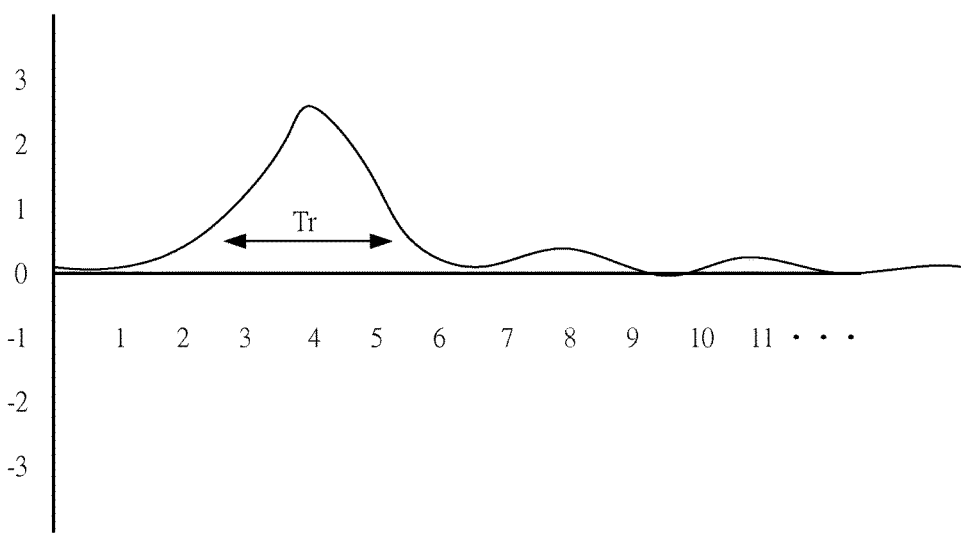
FIG. 10B is a sensing diagram after correcting the signal values based on the slope in accordance with the present invention.

Please refer to FIG. 10A, which depicts a sensing diagram that the signal differences are transformed into the signal values according to an embodiment of the invention. If the touch system obtains the signal values directly, each signal difference still could include noises. When the touch system transforms the signal differences into the signal values, noises are accumulated continuously such that the transformed signal values increase progressively. Thus, at least one slope is determined based on the transformed signal values, and then all signal values are corrected by the slope. At first, a plurality of non-touch signal values are generated based on the second values generating the average variation. In other words, the non-touch signal values (signal values) are transformed from the second values (signal differences) outside the touch range Tr representing no proximity or touch of any external conductive object. Next, the transformed signal values are corrected based on at least one slope generated from the non-touch signal values. Please refer to FIG. 10B, which depicts a sensing diagram after correcting the signal values based on the slope according to an embodiment of the invention.

Similarly, if the values included in the 1D sensing information are signal dual differences, whether there is the proximity or touch of at least one external conductive object could be determined based on the values or the signal differences from the values. When the second values represents that at least one external conductive object approaches or touches the touch screen, the second values representing the proximity or touch of at least one external conductive object are determined, and the average variation is obtained based on the part of the second values except the second values representing the proximity or touch of at least one external conductive object. When the second values represents no proximity or touch of any external conductive object, the average variation is determined based on all second values.

Figure 10C:
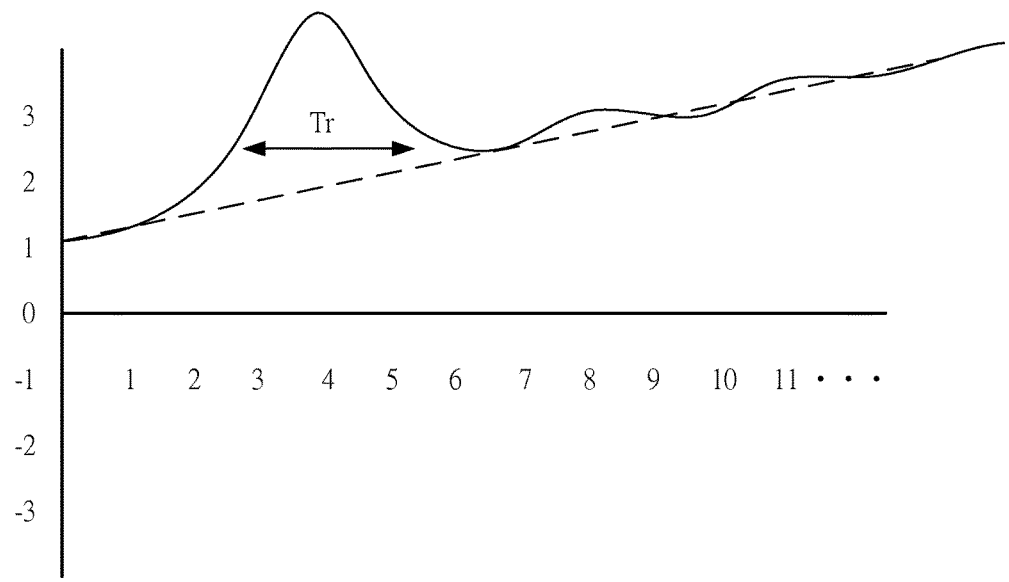
FIG. 10C is a sensing diagram that the signal dual differences are transformed into the signal values in accordance with the present invention.
Figure 10D:
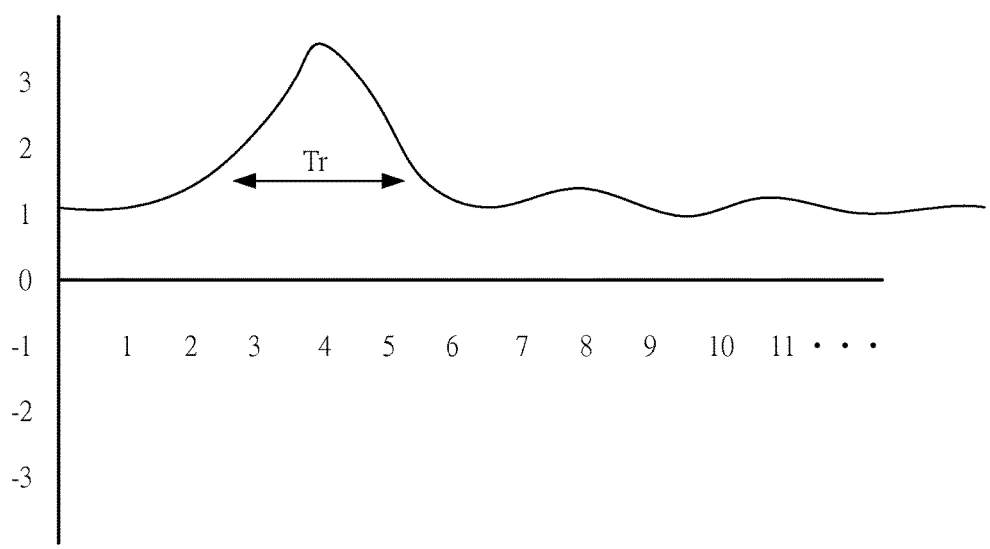
FIG. 10D is a sensing diagram after correcting the signal values based on the slope in accordance with the present invention.

Please refer to FIG. 10C, which depicts a sensing diagram that the signal dual differences are transformed into the signal values according to an embodiment of the invention. If the touch system obtains the signal dual values directly, each signal dual difference still could include noises. When the touch system transforms the signal dual differences into the signal values, noises are continuously accumulated twice such that the transformed signal values shift to the positive direction and increase progressively. Thus, at least one slope is determined based on the transformed signal values, and then all signal values are corrected by the slope and the foregoing values. At first, a plurality of non-touch signal values are generated based on the second values generating the average variation. In other words, the non-touch signal values (signal values) are transformed from the second values (signal dual differences) outside the touch range Tr representing no proximity or touch of any external conductive object. Next, the transformed signal values are corrected based on at least one slope generated from the non-touch signal values. Please refer to FIG. 10D, which depicts a sensing diagram after correcting the signal values based on the slope according to an embodiment of the invention.

The foregoing slope is determined based on a difference between two non-touch signal values, wherein the two non-touch signal values are located respectively at two terminals of the non-touch signal values generating the slope. In addition, the foregoing slope is determined based on a regression curve generated based on the non-touch signal values generating the slope. Further, the foregoing slope is determined based on an average of a plurality of individual slopes, wherein the individual slopes are generated based on difference between each pair of adjacent non-touch signal values.

Figure 11:
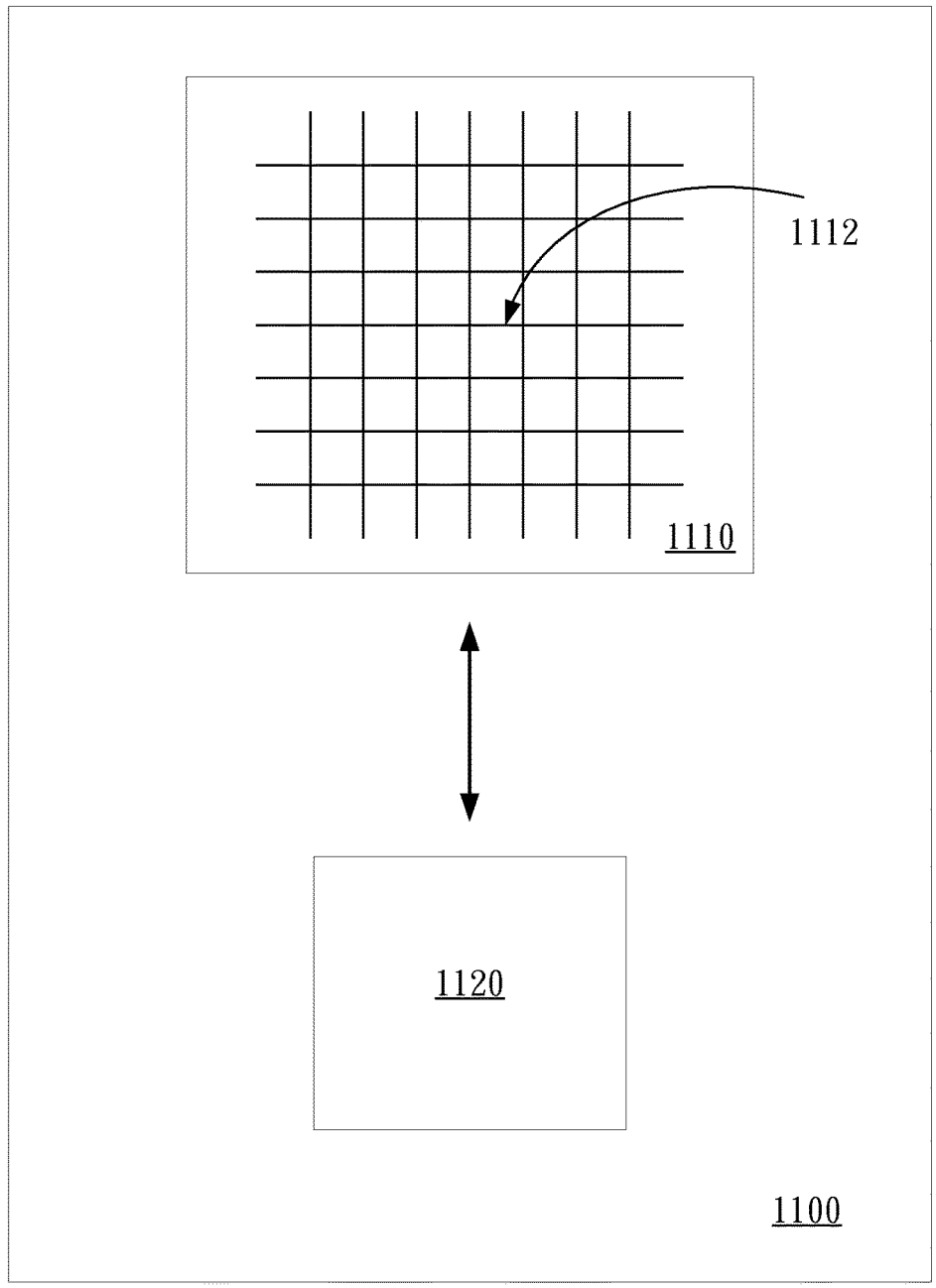
FIG. 11 is a diagram of a touch sensing system in accordance with the present invention.

Accordingly, the invention further discloses a touch system, as shown in FIG. 11. The touch system 1100 comprises a touch screen 1110 and a touch processor 1120 (i.e. the above-mentioned processor 161). The touch screen 1110 could comprise the foregoing position detecting device 100 for continuously obtaining the 1D sensing information of one of a plurality of electrodes, wherein the 1D sensing information comprises a plurality of values. The touch processor 1120 is connected to the touch screen 1110 so as to determine whether at least one external conductive object approaches or touches the touch screen 1110 based on the 1D sensing information. When the touch processor 1120 determines the 1D sensing information representing no external conductive object approaches or touches the touch screen 1110, the touch processor 1120 determines a base sensing information based on the 1D sensing information, and defines the values included in the 1D sensing information as the base sensing information. When the values are as the base sensing information, the touch processor 1120 defines the values as a plurality of first values. When the touch processor 1120 determines the 1D sensing information representing that at least one external conductive object approaches or touches the touch screen 1110, the touch processor 1120 defines the values included in the 1D sensing information not as the base sensing information, and defines the values as a plurality of second values.

Next, the touch processor 1120 obtains a plurality of first variations based on differences between the first values and the second values at the same locations of the 1D sensing information, and obtains an average variation based on part or all of the first variations. Then, the touch processor 1120 obtains a plurality of second variations based on differences between the first variations and the average variation. Finally, the touch processor 1120 determines whether there is at least one line piece caused by the proximity or the touch of at least one external conductive object based on the second variations, wherein the range of the at least one line piece is determined if at least one second variation exceeds a threshold.

Accordingly, the invention further discloses a touch processor 1120, applied to a touch system 1100 including a touch screen 1110 which obtains a first 1D information and a second 1D sensing information of an electrode. The first 1D information comprises a plurality of first values, and the second 1D sensing information comprises a plurality of second values. The touch processor 1120 performs the following steps. At first, in step 950 as shown in FIG. 9A, the touch processor 1120 determines a plurality of first variations based on differences between the first values and the corresponding second values, wherein the locations of the first values corresponds to the locations of the second values respectively, and the first 1D sensing information represents no proximity or touch of any external conductive object. Next, in step 960, the touch processor 1120 determines an average variation based on part or all of the first variations. In step 962, the touch processor 1120 determines a plurality of second variations based on differences between the first variations and the average variation.

Then, in step 970, after obtaining the second variations, the touch processor 1120 determines whether there is the proximity or touch of at least one external conductive object based on the comparison between the second variations and a threshold. If at least one second variation exceeds a threshold, the touch processor 1120 determines that at least one external conductive object approaches or touches the touch screen, in step 980. Then, in step 982, the touch processor 1120 determines the range of at least one line piece corresponding to the proximity or touch of at least one external conductive object by the line piece segmentation method. If no second variation exceeds the threshold, the touch processor 1120 determines no touch event, in step 990.

As above-mentioned, the obtained 1D sensing information could comprises signal values, signal differences or signal dual differences. When the obtained 1D sensing information comprises signal values, the touch processor 1120 could transform the signal values into signal differences or signal dual differences so as to determine whether the 1D sensing information represents the proximity or touch of at least one external conductive object. When the obtained 1D sensing information comprises signal differences, the touch processor 1120 could transform the signal differences into signal dual differences so as to determine whether the 1D sensing information represents the proximity or touch of at least one external conductive object. When the obtained 1D sensing information comprises signal dual differences, the touch processor 1120 could transform the signal dual differences into signal differences so as to determine whether the 1D sensing information represents the proximity or touch of at least one external conductive object. When the 1D sensing information represents the proximity or touch of at least one external conductive object, the touch processor 1120 averages the first variations representing no proximity or touch of any external conductive object so as to obtain the average variation. Other details of the present invention have already been disclosed hereinabove, and will not be further illustrated.

Figure 2:
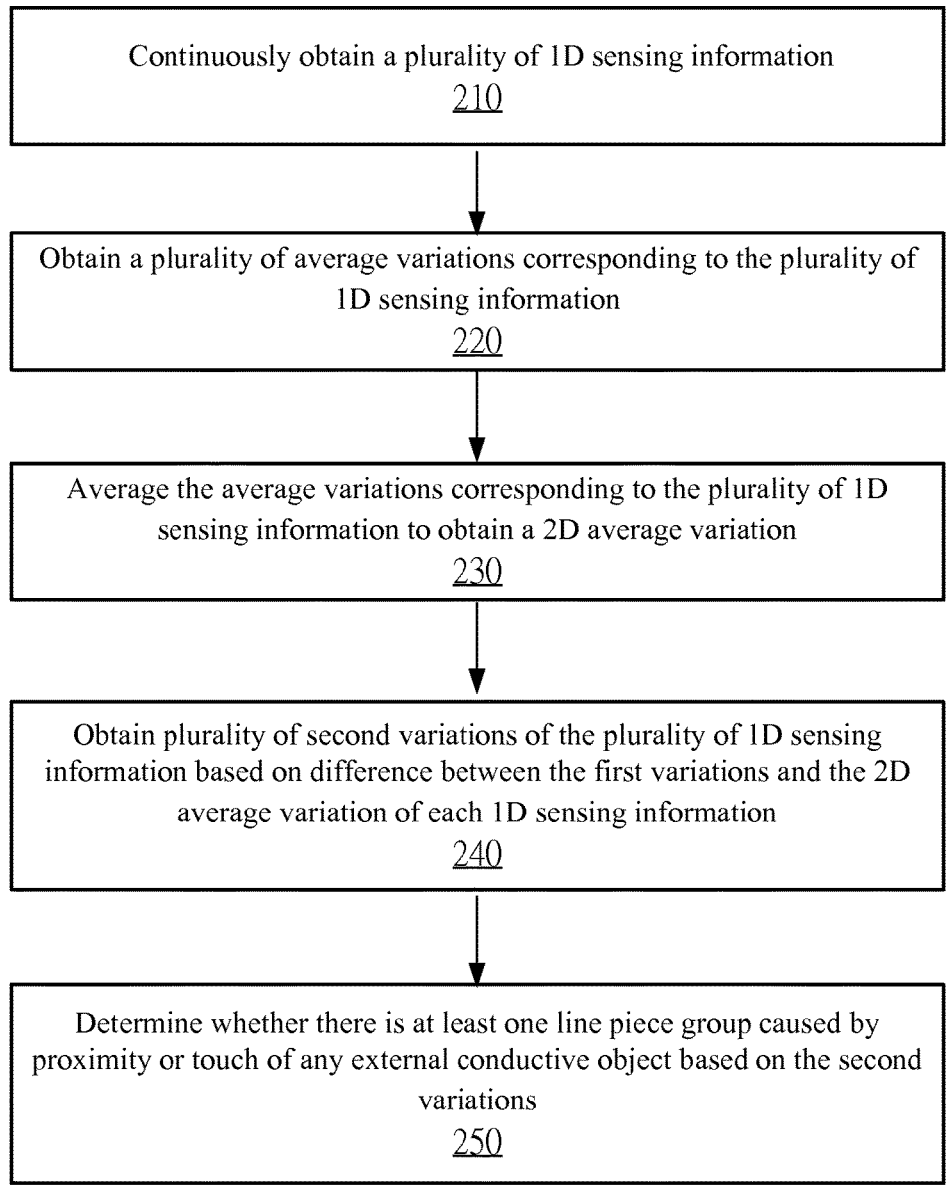
FIG. 2 is a flowchart diagrams of a touch sensing method in accordance with the present invention.

Because 2D sensing information consists of a plurality of 1D sensing information, a plurality of 1D sensing information must be obtained for obtaining the 2D sensing information. Thus, the invention further discloses another touch sensing method, as shown in FIG. 2. At first, in step 210, a plurality of 1D sensing information are continuously obtained. In other words, the 1D sensing information of each of a plurality of electrodes is obtained. Then, in step 220, a plurality of average variations corresponding to the plurality of 1D sensing information are obtained. In other words, a plurality of average variations are obtained, wherein each average variation corresponds to a 1D sensing information respectively, and an average variation of each 1D sensing information is obtained according to the steps as shown in FIG. 9A. After obtaining an average variation of each 1D sensing information, in step 230, the average variations corresponding to the plurality of 1D sensing information are averaged to obtain a 2D average variation. Next, in step 240, a plurality of second variations of the plurality of 1D sensing information are obtained based on difference between the first variations and the 2D average variation of each 1D sensing information so as to constitute at least one 2D touch image. Finally, in step 250, whether there is at least one line piece group caused by proximity or touch of any external conductive object could be determined based on the second variations, wherein the line piece group could be determined by the line piece segmentation method.

Accordingly, the invention further discloses a touch system, as shown in FIG. 11 again. The touch system 1100 comprises a touch screen 1110 and a touch processor 1120. The touch screen 1110 could comprise the foregoing position detecting device 100 for continuously obtaining the 1D sensing information of each of a plurality of electrodes 1112, wherein the 1D sensing information comprises a plurality of values. The touch processor 1120 is connected to the touch screen 1110 to obtain a plurality of average variations corresponding to each 1D sensing information.

The touch processor 1120 obtains an average variation of each 1D sensing information according to the above-mentioned method. At first, when the touch screen 1110 obtains the 1D sensing information of an electrode continuously, the touch processor 1120 determines whether at least one external conductive object approaches or touches the touch screen 1110 based on the 1D sensing information, wherein the 1D sensing information comprises a plurality of values. When the touch processor 1120 determines the 1D sensing information representing no proximity or touch of any external conductive object, the touch processor 1120 determines a base sensing information based on the 1D sensing information, wherein when the touch processor 1120 determines the values as the base sensing information, the values are a plurality of first values, and when the values are not as the base sensing information, the values are a plurality of second values. Next, the touch processor 1120 obtains a plurality of first variations based on differences between the first values and the second values at the same locations of the 1D sensing information, and obtains an average variation based on part or all of the first variations. The touch processor 1120 averages the average variations of all 1D sensing information so as to obtain a 2D average variation.

Finally, the touch processor 1120 obtains a plurality of second variations of the plurality of 1D sensing information based on differences between the first variations and the 2D average variation of each 1D sensing information, and determines whether there is at least one line piece group caused by proximity or touch of any external conductive object based on the second variations.

Accordingly, the invention discloses a touch processor 1120, applied to a touch system 1100 including a touch screen 1110 which obtains the 1D information of each of a plurality of electrodes 1112. The touch processor 1120 performs the following steps. At first, the touch processor 1120 is connected to the touch screen 1110 so as to obtain a plurality of average variations and a plurality of second variations corresponding to the 1D sensing information, wherein the touch processor 1120 obtains a plurality of second variations and an average variation of each 1D sensing information based on the following steps.

The touch processor 1120 determines whether there is proximity or touch of any external conductive object based on the 1D sensing information of an electrode which are continuously obtained by the touch screen 1110. The touch processor 1120 determines a base sensing information based on the 1D sensing information which represents no proximity or touch of any external conductive object, wherein the values are a plurality of first values when the values are as the base sensing information, and the values are a plurality of second values when the values are not as the base sensing information. Then, the touch processor 1120 obtains a plurality of first variations based on differences between the first values and the second values at the same locations of the 1D sensing information, and obtains an average variation corresponding to the 1D sensing information based on part or all of the first variations. Next, the touch processor 1120 averages the average variations corresponding to the plurality of 1D sensing information to obtain a 2D average variation, and obtains a plurality of second variations of the plurality of 1D sensing information based on differences between the first variations and the 2D average variation of each 1D sensing information. Finally, the touch processor 1120 determines whether there is at least one line piece group caused by the proximity or the touch of at least one external conductive object.

Figure 3A:
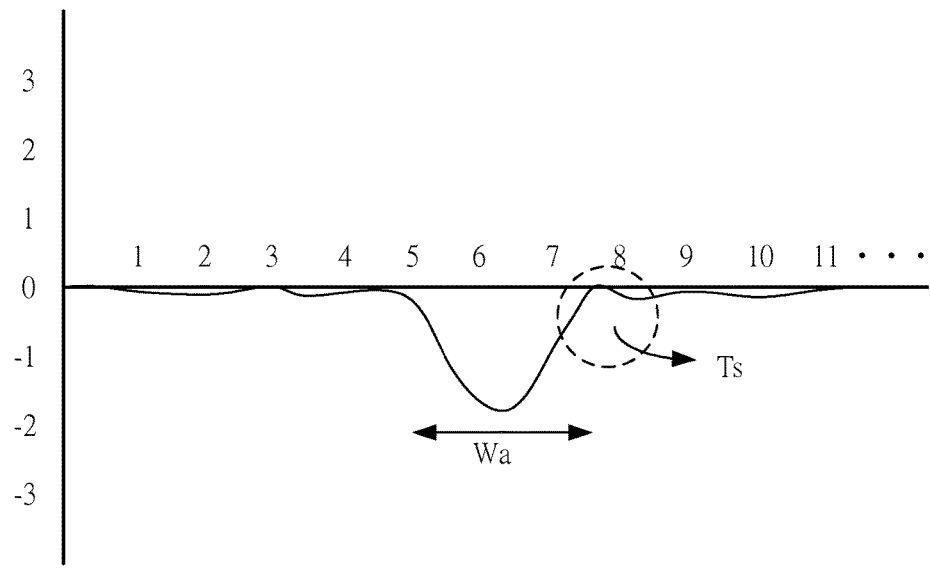
FIGS. 3A and 3B are sensing diagrams illustrating that the water drops are on the touch screen in accordance with the present invention.

After removing the signal influence caused by the environmental noises, the touch system would still be interfered by other sources. For example, when a water drop is on the touch screen, part of the sensors are interfered by the water drop to cause the touch misjudgment. Please refer to FIG. 3A, which depicts a sensing diagram that at least one water drop is on the touch system according to an embodiment of the invention. When the sensing places of the 1D sensing information are covered by the water drop, the obtained signal values will be negative, as shown in the place of the water drop in FIG. 3A. Because whether there is any touch event is determined based on partial values by the line piece segmentation method, the turning section Ts, which transforms from negative values into positive values (or zero value) as shown in FIG. 3A, would be misjudged as a line piece.

For avoiding the foregoing misjudgment, all line pieces in a 1D sensing information must be searched, and thus exclude the line pieces which are not caused by the proximity or touch of at least one external conductive object. Please refer to FIG. 3B, which depicts a sensing diagram of signal values of a line piece set according to an embodiment of the invention. At first, all line pieces Tr1, Tr2, Tr3, Tr4 in a 1D sensing information are searched, wherein a line piece group consists of all line pieces Tr1, Tr2, Tr3, Tr4. The line pieces Tr1, Tr3, Tr4 are generated due to the proximity or touch of external conductive objects, wherein the peaks of line pieces Tr1, Tr4 are higher because the locations approached or touched by external conductive objects are close to the line pieces Tr1, Tr4, and the peak of line piece Tr3 is lower because the location approached or touched by the external conductive object is far from the line pieces Tr3. In addition, the water drops on the touch screen causes the negative values at the locations Wa1, Wa2 of the water drops, wherein the line piece Tr4 overlaps part of the location Wa2 of the water drop because the location approached or touched by the external conductive object is close to the location Wa2 of the water drop.

Figure 3B:
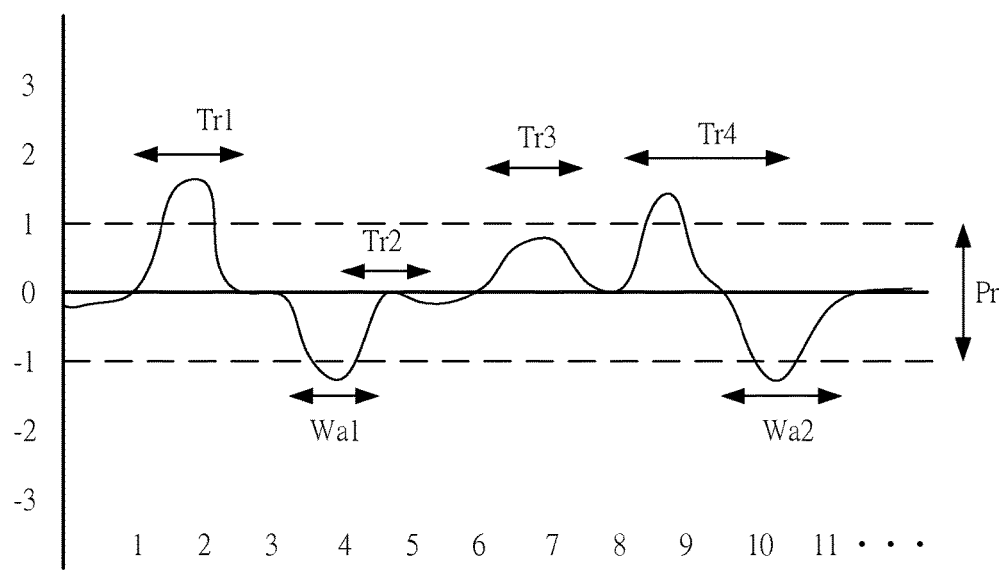

According to the best embodiment of the invention, the line pieces which are higher than a preset range Pr are searched, and then the line pieces are kept in the line piece group for excluding the line piece caused by the water drops or noises. Next, the line pieces, which don't comprise the values higher than the preset range Pr but comprise the values lower than the preset range Pr, are searched so as to excluded the line pieces from the line piece group. As shown in FIG. 3B, line pieces Tr1, Tr4 comprise the values which are higher than the preset range Pr, and thus the line pieces Tr1, Tr4 are kept in the line piece group. Because the line piece Tr2 don't comprise the values which are higher than the preset range Pr, but comprise the value which is lower than the preset range Pr, the line piece Tr2 is excluded from the line piece group. Finally, according to the embodiment, the line piece Tr2 is excluded, and the line pieces Tr1, Tr3, Tr4 are kept in the line piece group. It is worth noting that even if the line piece Tr4 comprises the value which is lower than the preset range Pr, the line piece Tr4 still comprises the values which are higher than the preset range Pr. The line piece Tr4 is generated due to the proximity or touch of the external conductive object, and thus the line piece Tr4 must be kept in the line piece group.

According to another embodiment of the invention, the line pieces, which comprise the values lower than the preset range Pr but don't comprise the values higher than the preset range Pr, are searched, and the line pieces are excluded from the line piece group so as to keep the line pieces corresponding to the proximity or touch of external conductive objects. As shown in FIG. 3B, the line pieces Tr2, Tr4 comprise the values which are lower than the preset range Pr, wherein the line piece Tr4 comprises the value which is higher than the preset range Pr, and the line piece Tr2 does not comprises the value which is higher than the preset range Pr. Accordingly, the line piece Tr2 is excluded.

According to the still another embodiment of the invention, the line pieces comprising the values which are higher than the preset range Pr and the line pieces whose all values are within the preset range Pr are searched. Thus, the searched line pieces are kept in the line piece group, and other line pieces are excluded. As shown in FIG. 3B, the line pieces Tr1, Tr4 comprise the values which are higher than the preset range Pr, and thus keep the line pieces Tr1, Tr4. All values of the line piece Tr3 are within the preset range Pr, and thus keep the line piece Tr3. Because the line piece Tr2 does not comprise the value which is higher than the preset range Pr, and the values of the line piece Tr2 are not within the preset range Pr, the line piece Tr2 is excluded.

As shown in FIG. 3B, the preset range Pr could comprise a positive threshold Pt and a negative threshold Nt. When at least one line piece (line piece Tr2) of the 1D sensing information comprises the value which is lower than the negative threshold Nt, the positive threshold Pt of the preset range Pr is increased. When at least one line piece of the 1D sensing information comprises the value which is lower than the negative threshold Nt, the 1D sensing information is interfered by the water drop or noises, and thus the sensitivity of the touch screen is decreased by increasing the positive threshold Pt.

Accordingly, the invention discloses another touch sensing method for excluding the line piece caused by the water drops or noises from the 1D sensing information. Please refer to FIG. 12, which depicts a flowchart diagram of the touch sensing method according to an embodiment of the invention. At first, in step 1210, all line pieces included in a line piece group of a 1D sensing information are searched, wherein the 1D sensing information comprises a plurality of values, and each line piece comprises part of the values. Then, in step 1220, whether there is at least one line piece comprising the values which are higher than a preset range is determined. A line piece of all line pieces is kept in the line piece group if at least one value of the line piece is higher than the preset range, wherein the line piece could be defined as a first line piece, in step 1230. If no values of a line piece are higher than the preset range, whether the line piece comprises the values which are lower than the preset range must be determined, in step 1240. The line piece is excluded from the line piece group if no values of the line piece are higher than the preset range, but at least one value of the line piece is lower than the preset range, in step 1250. In addition, if the line piece is excluded from the line piece group, the signal interfered by the water drops or noises is determined as the signal which is not caused by the proximity or touch of the external conductive object.

Further, the touch sensing method of the invention could perform the following steps based on the above-mentioned line piece segmentation method for obtaining the touch group caused by the proximity or touch of the external conductive object in a 2D sensing information. At first, at least one touch group is determined based on the overlapping relationships between two line piece groups of two adjacent parallel 1D sensing information, wherein each line piece in the line piece group and at least one other line piece in the touch group are in adjacent 1D sensing information respectively, and the touch group reaches at least one of the following conditions: the ratio of overlapping between the line piece and the at least one other line piece in the same touch group exceeds a ratio threshold; the number of values that are overlapped by the line piece and the at least one other line piece in the same touch group exceeds a threshold; or the distance between the centroid locations of the line pieces is within a distance threshold. Next, the touch group is kept if at least one value of at least one line piece of the touch group is higher than the preset range. On the contrary, the touch group is excluded if no value of any line piece of the touch group is higher than the preset range.

Figure 12:
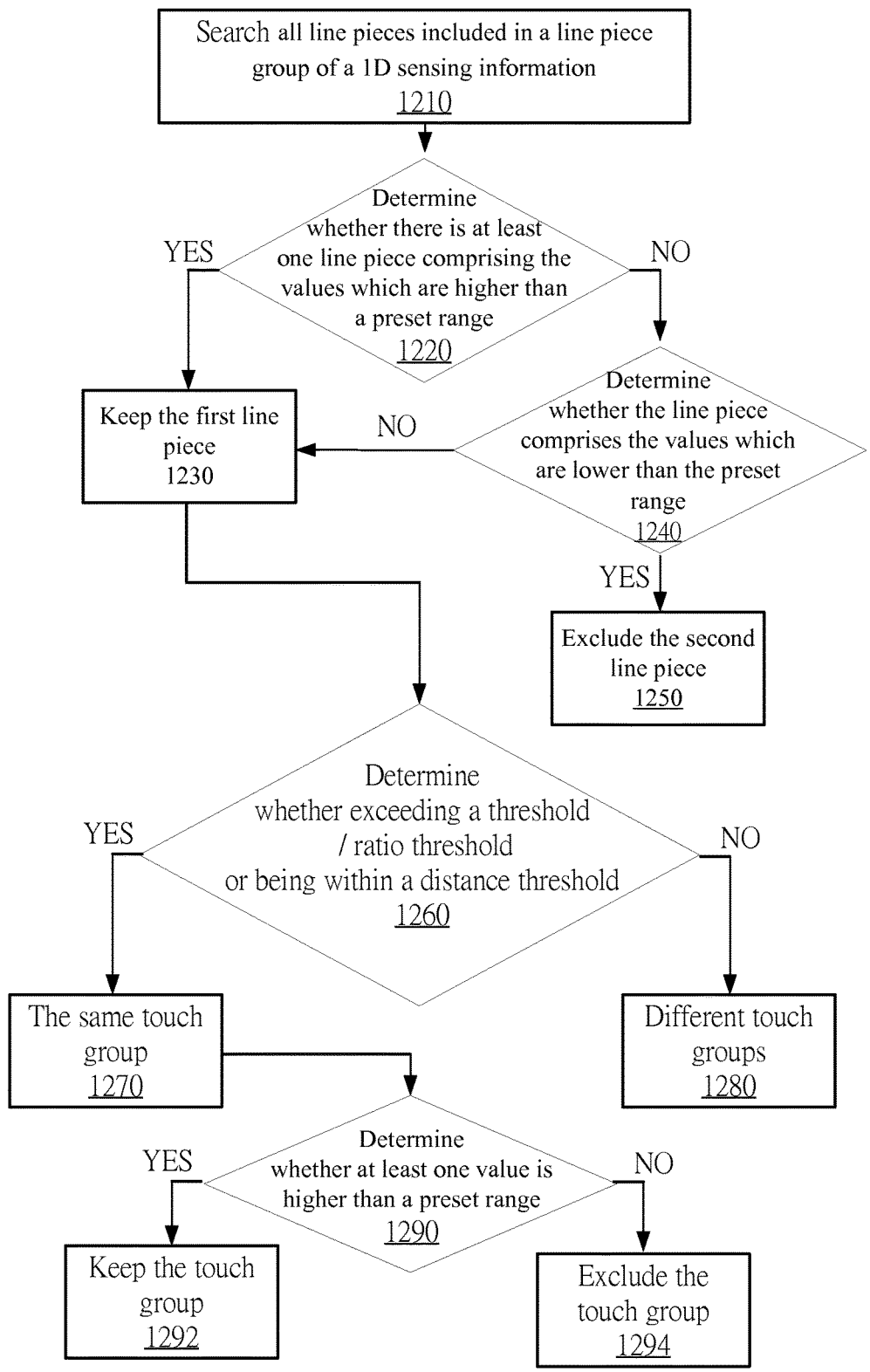
FIG. 12 is a flowchart of a touch sensing method in accordance with the present invention.

As shown in step 1260 of FIG. 12, whether the ratio of overlapping between the line piece and the at least one other line piece in the same touch group exceeds a ratio threshold is determined; whether the number of values that are overlapped by the line piece and the at least one other line piece in the same touch group exceeds a threshold is determined; or whether the distance between the centroid locations of the line pieces is within a distance threshold is determined. If the ratio of overlapping between the line piece and the at least one other line piece in the same touch group exceeds a ratio threshold; if the number of values that are overlapped by the line piece and the at least one other line piece in the same touch group exceeds a threshold; or if the distance between the centroid locations of the line pieces is within a distance threshold, both adjacent line pieces in the same touch group are determined. On the contrary, if the foregoing condition is not reached, it is determined that the both line pieces are not in the same touch group, in step 1280. Finally, in step 1290, whether at least one value of at least one line piece of the touch group is higher than the preset range is determined. The touch group is kept if at least one value of at least one line piece of the touch group is higher than the preset range, in step 1292. On the contrary, if no value of any line piece of the touch group comprises the value which is higher than the preset range, the touch group is excluded, in step 1294. After performing the above-mentioned steps, the line pieces of a plurality of parallel adjacent 1D sensing information in the same touch group could be determined so as to obtain the complete information of the touch group.

Accordingly, the invention discloses a touch system, as shown in FIG. 11 again. The touch system 1100 comprises a touch screen 1110 and a touch processor 1120, wherein the touch screen 1110 obtains the 1D sensing information of at least one of a plurality of electrodes 1112, and the touch processor 1120 is connected to the touch screen 1110 to search all line pieces of a touch set in the 1D sensing information.

The 1D sensing information comprises a plurality of values, and each line piece comprises part of all values. The touch processor 1120 keeps a first line piece of all line pieces in the line piece group if at least one value of the first line piece is higher than a preset range. The touch processor 1120 excludes a second line piece of all line pieces from the line piece group if no values of the second line piece are higher than the preset range, but at least one value of the second line piece is lower than the preset range.

Accordingly, the invention further discloses a touch processor, as shown in FIG. 11 again. The touch processor 1120 is applied to a touch system 1100 including a touch screen 1110, wherein the touch screen obtains 1D sensing information of at least one of a plurality of electrodes 1112. The touch processor 1120 is connected to the touch screen 1110 so as to search all line pieces included in a line piece group of a 1D sensing information, wherein the 1D sensing information comprises a plurality of values, and each line piece comprises part of the values. The touch processor 1120 keeps a first line piece of all line pieces in the line piece group if at least one value of the first line piece is higher than a preset range. The touch processor 1120 excludes a second line piece of all line pieces from the line piece group if no values of the second line piece are higher than the preset range, but at least one value of the second line piece is lower than the preset range. The touch processor 1120 could performs the foregoing steps repeatedly. After repeatedly performing the above-mentioned steps, the touch processor 1120 could determine the line pieces of a plurality of parallel adjacent 1D sensing information in the same touch group so as to obtain the complete information of the touch group.

The preset range could comprise a first threshold and a second threshold, wherein the first threshold is a positive value, and the second threshold is a negative value. The touch processor 1120 increases the first threshold of the preset range for decreasing the sensitivity of the touch screen 1110 when the 1D sensing information comprises at least one third line piece, and at least one value of the at least one third line piece is lower than the preset range.

Further, the touch processor 1120 of the invention could perform the following steps based on the above-mentioned line piece segmentation method for obtaining the touch group caused by the proximity or touch of the external conductive object in a 2D sensing information. At first, the touch processor 1120 determines at least one touch group based on the overlapping relationships between two line piece groups of two adjacent parallel 1D sensing information, wherein each line piece in the line piece group and at least one other line piece in the touch group are in adjacent 1D sensing information respectively, and the touch group reaches at least one of the following conditions: the ratio of overlapping between the line piece and the at least one other line piece in the same touch group exceeds a ratio threshold;

the number of values that are overlapped by the line piece and the at least one other line piece in the same touch group exceeds a threshold; or the distance between the centroid locations of the line pieces is within a distance threshold. Next, the touch processor 1120 keeps the touch group if at least one value of at least one line piece of the touch group is higher than the preset range. On the contrary, the touch processor 1120 excluded the touch group if no value of any line piece of the touch group is higher than the preset range.

Based on the fore-mentioned embodiment, the touch screen 1110 must update stray values continuously for avoiding the misjudgment caused by the environmental noises. While at least one external conductive object approaches or touches the touch screen 1110, the location corresponding to the touch can not be updated, otherwise the touch event will be misjudged at the location after the external conductive object leaves the touch screen 1110. However, when the water drop is on the touch screen, the stray values of the location of the water drop must be updated for excluding the signals caused by the water drop. Thus, during updating the stray values of the 1D sensing information except the touch group, the stray values of the 1D sensing information except the line piece group are updated, or the stray values of the 1D sensing information are maintained, namely the stray values are not updated when at least one line piece comprising the values which are lower than the preset range is determined. In addition, when the line piece group comprises at least one thirst line piece, and the at least one third line piece comprises the values which are lower than the preset range, the stray values of the 1D sensing information except the line piece set are updated.

Further, according to the above-mentioned embodiment, the determining of each line piece corresponding to touch or proximity of an external conductive object in each 1D sensing information includes extending forward and backward from a value greater than a positive threshold to at least one negative value, or extending forward and backward from a value less than a negative threshold to at least one positive value, and each line piece is determined based on one or any combination of the following group: values of the 1D sensing information, wherein each 1D sensing information is obtained by mutual-capacitive detection, and when at least one adjacent first conductive strip in a plurality of first conductive strips arranged along the first axis is provided with a driving signal, each 1D sensing information is generated based on the plurality of second conductive strips arranged along the second axis; differential values of the values of the 1D sensing information, wherein each differential value is generated based on two adjacent second conductive strips, and each line piece is a combination of a set of at least one positive value or continuous positive values and an adjacent set of at least one negative value or continuous negative values, wherein at least one positive value in the continuous positive values is greater than the positive threshold, and at least one negative value in the continuous negative values is greater than the negative threshold; or dual differential values of the values of the 1D sensing information, wherein each dual differential value is generated based on three adjacent second conductive strips, and each line piece is a combination of continuous adjacent at least one negative value, at least one positive value, and at least one negative value, respectively, or continuous adjacent at least one positive value, at least one negative value, and at least one positive value, respectively.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:
1. A touch sensing method, comprising:
obtaining a first 1D sensing information by a touch screen, wherein the first 1D sensing information comprises a plurality of first values comprising the values at all sensing places;
obtaining a second 1D sensing information by the touch screen, wherein the second 1D sensing information comprises a plurality of second values comprising the values at all sensing places, wherein the locations of the first values corresponds to the locations of the second values respectively, and the first 1D sensing information represents no proximity or touch of any external conductive object;
simultaneously determining a plurality of first variations by a touch processor based on differences between all of the first values and all of the corresponding second values;
determining an average variation by the touch processor based on part or all of the first variations; and
determining a plurality of second variations by the touch processor based on differences between the first variations and the average variation.

2. The method of claim 1, further comprising the step of determining whether there is at least one line piece which is a continuous part of the plurality of second values caused by the proximity or the touch of at least one external conductive object based on the second variations, wherein the range of the at least one line piece is determined if at least one second variation exceeds a threshold.

3. The method of claim 2, further comprising:
determining the second values representing the proximity or touch of any external conductive object if part of all second values represents the proximity or touch of any external conductive object; and
wherein the average variation is obtained based on the second values except the second values representing the proximity or touch of any external conductive object.

4. The method of claim 3, further comprising:
generating a plurality of non-touch signal values based on the second values generating the average variation; and
correcting the signal values transformed from all second values based on at least one slope generated from the non-touch signal values, wherein the slope is obtained based on one or the combination of the following group:
a difference between two non-touch signal values, wherein the two non-touch signal values are located respectively at two terminals of the non-touch signal values generating the slope;
a regression curve generated based on the non-touch signal values generating the slope; and
an average of a plurality of individual slopes, wherein the individual slopes are generated based on difference between each pair of adjacent non-touch signal values.

5. The method of claim 1, further comprising:
averaging the first variations which are not effected by proximity or touch of any external conductive object so as to obtain the average variation.

6. The method of claim 1, further comprising:
obtaining a second average variation based on part or all of the second variations, wherein the average variation is a first variation; and
obtaining a plurality of third variations based on differences between all second variations and the second average variation.

7. A touch sensing method, comprising:
continuously obtaining a plurality of 1D sensing information by a touch screen;
obtaining a plurality of average variations corresponding to the plurality of 1D sensing information, wherein an average variation corresponding to each 1D sensing information is obtained by a touch processor based on the following steps:
 continuously obtaining a 1D sensing information, wherein the 1D sensing information comprises a plurality of values comprising the values at all sensing places;
 determining a base sensing information, wherein the base sensing information is determined based on the 1D sensing information when the 1D sensing information represents no proximity or touch of any external conductive object, wherein the values of the base sensing information are a plurality of first values, and the values of the 1D sensing information which are not as the base sensing information are a plurality of second values comprising the values at all sensing places;
 simultaneously obtaining a plurality of first variations based on differences between all of the first values and all of the second values at the same locations of the 1D sensing information; and
 obtaining an average variation corresponding to the 1D sensing information based on part or all of the first variations;
averaging the average variations corresponding to the plurality of 1D sensing information to obtain a 2D average variation; and
obtaining a plurality of second variations of the plurality of 1D sensing information based on difference between the first variations and the 2D average variation of each 1D sensing information.

8. The method of claim 7, further comprising:
determining whether there is at least one line piece group caused by proximity or touch of any external conductive object based on the second variations, wherein the line piece group includes a plurality of line pieces, and each line piece is a continuous part of the plurality of second values caused by the proximity or the touch of the at least one external conductive object.

9. A touch processor, applied to a touch system including a touch screen which obtains a first 1D information and a second 1D sensing information of an electrode, wherein the first 1D information comprises a plurality of first values comprising the values at all sensing places, and the second 1D sensing information comprises a plurality of second values comprising the values at all sensing places, wherein the touch processor performs the following steps:
 simultaneously determining a plurality of first variations based on differences between all of the first values and all of the corresponding second values, wherein the locations of the first values corresponds to the locations of the second values respectively, and the first 1D sensing information represents no proximity or touch of any external conductive object;
 determining an average variation based on part or all of the first variations; and
 determining a plurality of second variations based on differences between the first variations and the average variation.

10. The touch processor of claim 9, further performing the following step of determining whether or not there is at least one line piece which is a continuous part of the plurality of second values caused by the proximity or the touch of at least one external conductive object based on the second variations, wherein the range of the at least one line piece is determined if at least one second variation exceeds a threshold.

11. The touch processor of claim 10, further performing the following steps:
 determining the second values representing the proximity or touch of any external conductive object if part of all second values represents the proximity or touch of any external conductive object; and
 wherein the average variation is obtained based on the second values except the second values representing the proximity or touch of any external conductive object.

12. The touch processor of claim 11, further performing the following steps:
 generating a plurality of non-touch signal values based on the second values generating the average variation; and
 correcting the signal values transformed from all second values based on at least one slope generated from the non-touch signal values, wherein the slope is obtained based on one or the combination of the following group:
  a difference between two non-touch signal values, wherein the two non-touch signal values are located respectively at two terminals of the non-touch signal values generating the slope;
  a regression curve generated based on the non-touch signal values generating the slope; and
  an average of a plurality of individual slopes, wherein the individual slopes are generated based on difference between each pair of adjacent non-touch signal values.

13. The touch processor of claim 9, further performing the following steps:
 averaging the first variations which are not effected by proximity or touch of any external conductive object so as to obtain the average variation.

14. The touch processor of claim 9, further performing the following steps:
 obtaining a second average variation based on part or all of the second variations, wherein the average variation is a first variation; and
 obtaining a plurality of third variations based on differences between all second variations and the second average variation.

15. A touch processor, applied to a touch system including a touch screen, wherein the touch screen continuously obtains 1D sensing information of each of a plurality of electrodes, and the touch processor performs the following steps:
 connecting to the touch screen so as to obtain a plurality of average variations and a plurality of second variations corresponding to the 1D sensing information, wherein the touch processor obtains a plurality of second variations and an average variation of each 1D sensing information based on the following steps:

determining whether there is proximity or touch of any external conductive object based on the 1D sensing information of an electrode which are continuously obtained by the touch screen, wherein the 1D sensing information comprises a plurality of values;

determining a base sensing information based on the 1D sensing information which represents no proximity or touch of any external conductive object, wherein the values of the base sensing information are a plurality of first values comprising the values at all sensing places, and the values of the 1D sensing information which are not as the base sensing information are a plurality of second values comprising the values at all sensing places;

simultaneously obtaining a plurality of first variations based on differences between all of the first values and all of the second values at the same locations of the 1D sensing information; and obtaining an average variation corresponding to the 1D sensing information based on part or all of the first variations;

averaging the average variations corresponding to the plurality of 1D sensing information to obtain a 2D average variation; and obtaining a plurality of second variations of the plurality of 1D sensing information based on differences between the first variations and the 2D average variation of each 1D sensing information.

16. The touch processor of claim 15, further performing the following step of determining whether there is at least one line piece group caused by the proximity or the touch of at least one external conductive object, wherein the line piece group includes a plurality of line pieces, and each line piece is a continuous part of the plurality of second values caused by the proximity or the touch of the at least one external conductive object.

17. A touch system, comprising:

a touch screen, obtaining a first 1D sensing information and a second 1D sensing information of an electrode, wherein the first 1D sensing information comprises a plurality of first values comprising the values at all sensing places, and the second 1D sensing information comprises a plurality of second values comprising the values at all sensing places, wherein the locations of the first values respectively corresponds to the locations of the second values, and the first 1D sensing information represents no proximity and touch of any external conductive object; and a touch processor, connecting to the touch screen so as to perform the following steps:

simultaneously obtaining a plurality of first variations based on a difference between each first value and the second value corresponding to the first value; and obtaining an average variation based on part or all of the first variations;

obtaining a plurality of second variations based on differences between the first variations and the average variation.

18. A touch system, comprising:

a touch screen, continuously obtaining 1D sensing information of each of a plurality of electrodes;

a touch processor, connecting to the touch screen so as to obtain a plurality of average variations and a plurality of second variations corresponding to the 1D sensing information, wherein the touch processor obtains a plurality of second variations and an average variation of each 1D sensing information based on the following steps:

determining whether there is proximity or touch of any external conductive object based on the 1D sensing information of an electrode which are continuously obtained by the touch screen, wherein the 1D sensing information comprises a plurality of values;

simultaneously determining a base sensing information based on the 1D sensing information which represents no proximity or touch of any external conductive object, wherein the values of the base sensing information are a plurality of first values comprising the values at all sensing places, and the values of the 1D sensing information which are not as the base sensing information are a plurality of second values comprising the values at all sensing places;

obtaining a plurality of first variations based on differences between all of the first values and all of the second values at the same locations of the 1D sensing information; and obtaining an average variation corresponding to the 1D sensing information based on part or all of the first variations;

averaging the average variations corresponding to the plurality of 1D sensing information to obtain a 2D average variation; and obtaining a plurality of second variations of the plurality of 1D sensing information based on differences between the first variations and the 2D average variation of each 1D sensing information.

* * * * *